(12) United States Patent
Kropivny

(10) Patent No.: US 7,765,266 B2
(45) Date of Patent: Jul. 27, 2010

(54) METHOD, APPARATUS, SYSTEM, MEDIUM, AND SIGNALS FOR PUBLISHING CONTENT CREATED DURING A COMMUNICATION

(75) Inventor: Alexander Kropivny, Burnaby (CA)

(73) Assignee: Uranus International Limited, Mahe (SC)

( * ) Notice: Subject to any disclaimer, the term of this patent is extended or adjusted under 35 U.S.C. 154(b) by 445 days.

(21) Appl. No.: 11/694,883

(22) Filed: Mar. 30, 2007

(65) Prior Publication Data

US 2008/0244013 A1  Oct. 2, 2008

(51) Int. Cl.
G06F 15/16 (2006.01)
(52) U.S. Cl. .................. 709/206; 709/204; 709/207; 709/219; 709/237; 370/261; 370/352; 707/3
(58) Field of Classification Search .................. 709/204, 709/206, 207, 219, 237; 370/261, 352; 707/3
See application file for complete search history.

(56) References Cited

U.S. PATENT DOCUMENTS

| | | | |
|---|---|---|---|
| 5,176,520 | A | 1/1993 | Hamilton |
| 5,493,692 | A | 2/1996 | Theimer et al. |
| 5,544,321 | A | 8/1996 | Theimer et al. |
| 5,553,123 | A | 9/1996 | Chan et al. |
| 5,555,376 | A | 9/1996 | Theimer et al. |
| 5,563,630 | A | 10/1996 | Tsakiris et al. |
| 5,603,054 | A | 2/1997 | Theimer et al. |
| 5,608,872 | A | 3/1997 | Schwartz et al. |
| 5,611,050 | A | 3/1997 | Theimer et al. |
| 5,687,096 | A | 11/1997 | Lappen et al. |
| 5,704,042 | A | 12/1997 | Hester et al. |
| 5,717,856 | A | 2/1998 | Carleton et al. |
| 5,727,155 | A | 3/1998 | Dawson |
| 5,748,189 | A | 5/1998 | Trueblood |
| 5,761,419 | A | 6/1998 | Schwartz et al. |
| 5,781,727 | A | 7/1998 | Carleton et al. |
| 5,812,785 | A | 9/1998 | Lappen et al. |

(Continued)

FOREIGN PATENT DOCUMENTS

EP  0 898 756  5/2000

(Continued)

OTHER PUBLICATIONS

Jeffay, et al., "Transport and Display Mechanisms for Multimedia Conferencing Across Packet-Switched Networks", University of North Carolina at Chapel Hill, Computer Networks and ISDN Systems, vol. 26, No. 10, pp. 1281-1304, Sep. 1993.

(Continued)

Primary Examiner—Jinsong Hu
(74) Attorney, Agent, or Firm—Fish & Richardson P.C.

(57) ABSTRACT

Systems, apparatus and methods related to multiple-party communications conducted between client computers in a computer network. For example, a method and apparatus for publishing content created during a previous communication hosted by a server are disclosed. The content is represented by a first plurality of saved messages saved in a persistent memory on the server, the server being in communication with a computer network. The method involves receiving a request from a first computer in the computer network to view the content, the request including an identifier identifying the first plurality of saved messages. The method further involves reading the first plurality of saved messages associated with the identifier from the persistent memory, producing first output messages representing the content in respective saved messages in the first plurality of saved messages, and transmitting the first output messages to the first computer.

42 Claims, 37 Drawing Sheets

U.S. PATENT DOCUMENTS

| | | | |
|---|---|---|---|
| 5,812,865 A | 9/1998 | Theimer et al. | |
| 5,819,038 A | 10/1998 | Carleton et al. | |
| 5,835,713 A | 11/1998 | FitzPatrick et al. | |
| 5,838,914 A | 11/1998 | Carleton et al. | |
| 5,850,340 A | 12/1998 | York | |
| 5,859,623 A | 1/1999 | Meyn et al. | |
| 5,870,547 A | 2/1999 | Pommier et al. | |
| 5,872,923 A | 2/1999 | Schwartz et al. | |
| 5,889,946 A | 3/1999 | FitzPatrick et al. | |
| 5,907,704 A | 5/1999 | Gudmundson et al. | |
| 5,917,472 A | 6/1999 | Perala | |
| 5,920,694 A | 7/1999 | Carleton et al. | |
| 5,923,844 A | 7/1999 | Pommier et al. | |
| 5,926,168 A | 7/1999 | Fan | |
| 5,938,724 A | 8/1999 | Pommier et al. | |
| 5,944,785 A | 8/1999 | Pommier et al. | |
| 5,948,022 A | 9/1999 | Carleton et al. | |
| 5,986,644 A | 11/1999 | Herder et al. | |
| 6,008,777 A | 12/1999 | Yiu | |
| 6,008,804 A | 12/1999 | Pommier et al. | |
| 6,047,314 A | 4/2000 | Pommier et al. | |
| 6,061,717 A | 5/2000 | Carleton et al. | |
| 6,073,119 A | 6/2000 | Bornemisza-Wahr et al. | |
| 6,085,247 A | 7/2000 | Parsons, Jr. et al. | |
| 6,199,099 B1 | 3/2001 | Gershman et al. | |
| 6,243,076 B1 | 6/2001 | Hatfield | |
| 6,260,160 B1 | 7/2001 | Beyda et al. | |
| 6,325,756 B1 | 12/2001 | Webb et al. | |
| 6,335,739 B1 | 1/2002 | Matsukura et al. | |
| 6,349,337 B1 | 2/2002 | Parsons, Jr. et al. | |
| 6,367,934 B1 | 4/2002 | Salesky et al. | |
| 6,377,861 B1 | 4/2002 | York | |
| 6,401,085 B1 | 6/2002 | Gershman et al. | |
| 6,430,604 B1 | 8/2002 | Ogle et al. | |
| 6,473,794 B1 | 10/2002 | Guheen et al. | |
| 6,536,037 B1 | 3/2003 | Barrese et al. | |
| 6,577,622 B1 * | 6/2003 | Schuster et al. | 370/352 |
| 6,584,493 B1 | 6/2003 | Butler | |
| 6,594,406 B1 | 7/2003 | Hecht | |
| 6,594,616 B2 | 7/2003 | Zhang et al. | |
| 6,594,693 B1 * | 7/2003 | Borwankar | 709/219 |
| 6,601,129 B1 | 7/2003 | Arakeri et al. | |
| 6,606,744 B1 | 8/2003 | Mikurak | |
| 6,615,166 B1 | 9/2003 | Guheen et al. | |
| 6,629,081 B1 | 9/2003 | Cornelius et al. | |
| 6,633,905 B1 | 10/2003 | Anderson et al. | |
| 6,654,790 B2 | 11/2003 | Ogle et al. | |
| 6,662,210 B1 | 12/2003 | Carleton et al. | |
| 6,665,870 B1 | 12/2003 | Finseth et al. | |
| 6,671,818 B1 | 12/2003 | Mikurak | |
| 6,691,155 B2 * | 2/2004 | Gottfried | 709/204 |
| 6,710,790 B1 | 3/2004 | Fagioli | |
| 6,721,713 B1 | 4/2004 | Guheen et al. | |
| 6,724,399 B1 | 4/2004 | Katchour et al. | |
| 6,742,184 B1 | 5/2004 | Finseth et al. | |
| 6,754,906 B1 | 6/2004 | Finseth et al. | |
| 6,763,226 B1 | 7/2004 | McZeal, Jr. | |
| 6,781,962 B1 | 8/2004 | Williams et al. | |
| 6,791,531 B1 | 9/2004 | Johnston et al. | |
| 6,813,775 B1 | 11/2004 | Finseth et al. | |
| 6,859,821 B1 | 2/2005 | Ozzie et al. | |
| 6,868,140 B2 | 3/2005 | Myers et al. | |
| 6,925,650 B1 | 8/2005 | Arsenault et al. | |
| 6,988,132 B2 | 1/2006 | Horvitz | |
| 6,990,513 B2 | 1/2006 | Belfiore et al. | |
| 7,003,728 B2 | 2/2006 | Berque | |
| 7,010,470 B2 | 3/2006 | Kodosky et al. | |
| 7,010,613 B2 | 3/2006 | Connor | |
| 7,017,174 B1 | 3/2006 | Sheedy | |
| 7,020,893 B2 | 3/2006 | Connelly | |
| 7,039,061 B2 | 5/2006 | Connor et al. | |
| 7,047,248 B1 | 5/2006 | Tycast | |
| 7,055,165 B2 | 5/2006 | Connelly | |
| 7,509,388 B2 * | 3/2009 | Allen et al. | 709/207 |
| 7,519,730 B2 * | 4/2009 | Bailey et al. | 709/237 |
| 2001/0000666 A1 | 5/2001 | Wood et al. | |
| 2001/0000811 A1 | 5/2001 | May et al. | |
| 2001/0004254 A1 | 6/2001 | Okahara et al. | |
| 2001/0030668 A1 | 10/2001 | Erten et al. | |
| 2001/0042214 A1 | 11/2001 | Radatti et al. | |
| 2001/0044725 A1 | 11/2001 | Matsuda et al. | |
| 2001/0044826 A1 | 11/2001 | Ludwig et al. | |
| 2001/0049087 A1 | 12/2001 | Hale | |
| 2001/0052108 A1 | 12/2001 | Bowman-Amuah | |
| 2001/0055039 A1 | 12/2001 | Matsuda | |
| 2001/0056401 A1 | 12/2001 | Tompkins | |
| 2002/0008692 A1 | 1/2002 | Omura et al. | |
| 2002/0021307 A1 | 2/2002 | Glenn et al. | |
| 2002/0055788 A1 | 5/2002 | Petrie et al. | |
| 2002/0055891 A1 | 5/2002 | Yang | |
| 2002/0065912 A1 | 5/2002 | Catchpole et al. | |
| 2002/0065926 A1 | 5/2002 | Hackney et al. | |
| 2002/0072980 A1 | 6/2002 | Dutta | |
| 2002/0087649 A1 | 7/2002 | Horvitz | |
| 2002/0101445 A1 | 8/2002 | Berque | |
| 2002/0120935 A1 | 8/2002 | Huber et al. | |
| 2002/0124051 A1 | 9/2002 | Ludwig et al. | |
| 2002/0130850 A1 | 9/2002 | Kobayashi et al. | |
| 2002/0143591 A1 | 10/2002 | Connelly | |
| 2002/0143876 A1 | 10/2002 | Boyer et al. | |
| 2002/0144269 A1 | 10/2002 | Connelly | |
| 2002/0147645 A1 | 10/2002 | Alao et al. | |
| 2002/0149617 A1 | 10/2002 | Becker | |
| 2002/0154210 A1 | 10/2002 | Ludwig et al. | |
| 2002/0161862 A1 | 10/2002 | Horvitz | |
| 2002/0163572 A1 | 11/2002 | Center, Jr. et al. | |
| 2002/0167947 A1 | 11/2002 | Hallford et al. | |
| 2002/0188443 A1 | 12/2002 | Reddy et al. | |
| 2002/0193066 A1 | 12/2002 | Connelly | |
| 2002/0193997 A1 | 12/2002 | Fitzpatrick et al. | |
| 2002/0194083 A1 | 12/2002 | Balabhadrapatruni et al. | |
| 2002/0194585 A1 | 12/2002 | Connelly | |
| 2002/0194603 A1 | 12/2002 | Connelly | |
| 2003/0005301 A1 | 1/2003 | Jutzi et al. | |
| 2003/0005451 A1 | 1/2003 | Connelly | |
| 2003/0005465 A1 | 1/2003 | Connelly | |
| 2003/0018719 A1 | 1/2003 | Ruths et al. | |
| 2003/0018725 A1 | 1/2003 | Turner et al. | |
| 2003/0023440 A1 | 1/2003 | Chu | |
| 2003/0028451 A1 | 2/2003 | Ananian | |
| 2003/0028901 A1 | 2/2003 | Shae et al. | |
| 2003/0043815 A1 | 3/2003 | Tinsley et al. | |
| 2003/0050834 A1 | 3/2003 | Caplan | |
| 2003/0058275 A1 | 3/2003 | Pilu et al. | |
| 2003/0058878 A1 | 3/2003 | Minnick et al. | |
| 2003/0066090 A1 | 4/2003 | Traw et al. | |
| 2003/0103647 A1 | 6/2003 | Rui et al. | |
| 2003/0108002 A1 * | 6/2003 | Chaney et al. | 370/261 |
| 2003/0110485 A1 | 6/2003 | Lu et al. | |
| 2003/0120751 A1 | 6/2003 | Husain et al. | |
| 2003/0124502 A1 | 7/2003 | Chou | |
| 2003/0130973 A1 | 7/2003 | Sumner, II et al. | |
| 2003/0131073 A1 | 7/2003 | Lucovsky et al. | |
| 2003/0137536 A1 | 7/2003 | Hugh | |
| 2003/0158901 A1 | 8/2003 | Ludwig et al. | |
| 2003/0185232 A1 | 10/2003 | Moore et al. | |
| 2003/0185359 A1 | 10/2003 | Moore et al. | |
| 2003/0185360 A1 | 10/2003 | Moore et al. | |
| 2003/0187641 A1 | 10/2003 | Moore et al. | |
| 2003/0187650 A1 | 10/2003 | Moore et al. | |
| 2003/0187800 A1 | 10/2003 | Moore et al. | |
| 2003/0187940 A1 | 10/2003 | Ludwig et al. | |
| 2003/0191676 A1 | 10/2003 | Templeton | |
| 2003/0193961 A1 | 10/2003 | Moore et al. | |

| | | |
|---|---|---|
| 2003/0203347 A1 | 10/2003 | Notomi |
| 2003/0206203 A1 | 11/2003 | Ly |
| 2003/0215078 A1 | 11/2003 | Brahm et al. |
| 2003/0217096 A1 | 11/2003 | McKelvic et al. |
| 2003/0217123 A1 | 11/2003 | Anderson et al. |
| 2003/0220971 A1 | 11/2003 | Kressin |
| 2003/0220973 A1 | 11/2003 | Zhu et al. |
| 2003/0221196 A1 | 11/2003 | Connelly |
| 2003/0225832 A1 | 12/2003 | Ludwig |
| 2003/0227487 A1 | 12/2003 | Hugh |
| 2003/0229900 A1 | 12/2003 | Reisman |
| 2004/0001043 A1 | 1/2004 | Lin |
| 2004/0001044 A1 | 1/2004 | Luciani, Jr. et al. |
| 2004/0001082 A1 | 1/2004 | Said |
| 2004/0002049 A1 | 1/2004 | Beavers et al. |
| 2004/0002838 A1 | 1/2004 | Oliver et al. |
| 2004/0002958 A1 | 1/2004 | Seshadri et al. |
| 2004/0002972 A1 | 1/2004 | Pather et al. |
| 2004/0002988 A1 | 1/2004 | Seshadri et al. |
| 2004/0003041 A1 | 1/2004 | Moore et al. |
| 2004/0008635 A1 | 1/2004 | Nelson et al. |
| 2004/0021645 A1 | 2/2004 | Kobayashi et al. |
| 2004/0024820 A1 | 2/2004 | Ozzie et al. |
| 2004/0030750 A1 | 2/2004 | Moore et al. |
| 2004/0030753 A1 | 2/2004 | Horvitz |
| 2004/0031058 A1 | 2/2004 | Reisman |
| 2004/0039630 A1 | 2/2004 | Begole et al. |
| 2004/0061716 A1 | 4/2004 | Cheung et al. |
| 2004/0064351 A1 | 4/2004 | Mikurak |
| 2004/0080504 A1 | 4/2004 | Salesky et al. |
| 2004/0086100 A1 | 5/2004 | Moore et al. |
| 2004/0090424 A1 | 5/2004 | Hurley et al. |
| 2004/0098458 A1 | 5/2004 | Husain et al. |
| 2004/0098462 A1 | 5/2004 | Horvitz et al. |
| 2004/0098717 A1 | 5/2004 | Husain et al. |
| 2004/0098728 A1 | 5/2004 | Husain et al. |
| 2004/0098729 A1 | 5/2004 | Husain et al. |
| 2004/0103152 A1 | 5/2004 | Ludwig et al. |
| 2004/0104927 A1 | 6/2004 | Husain et al. |
| 2004/0107125 A1 | 6/2004 | Guheen et al. |
| 2004/0107253 A1 | 6/2004 | Ludwig et al. |
| 2004/0107254 A1 | 6/2004 | Ludwig et al. |
| 2004/0107255 A1 | 6/2004 | Ludwig et al. |
| 2004/0107420 A1 | 6/2004 | Husain et al. |
| 2004/0128350 A1 | 7/2004 | Topfl et al. |
| 2004/0128359 A1 | 7/2004 | Horvitz et al. |
| 2004/0143636 A1 | 7/2004 | Horvitz et al. |
| 2004/0143763 A1 | 7/2004 | Radatti |
| 2004/0146048 A1 | 7/2004 | Cotte |
| 2004/0148083 A1 | 7/2004 | Arakawa et al. |
| 2004/0148340 A1 | 7/2004 | Cotte |
| 2004/0148341 A1 | 7/2004 | Cotte |
| 2004/0148342 A1 | 7/2004 | Cotte |
| 2004/0148351 A1 | 7/2004 | Cotte |
| 2004/0148392 A1 | 7/2004 | Cotte |
| 2004/0148419 A1 | 7/2004 | Chen et al. |
| 2004/0150625 A1 | 8/2004 | Shih et al. |
| 2004/0158857 A1 | 8/2004 | Finseth et al. |
| 2004/0162144 A1 | 8/2004 | Loose et al. |
| 2004/0168121 A1 | 8/2004 | Matz |
| 2004/0172447 A1 | 9/2004 | Miller |
| 2004/0177048 A1 | 9/2004 | Klug |
| 2004/0179025 A1 | 9/2004 | Samra et al. |
| 2004/0179036 A1 | 9/2004 | Teplov et al. |
| 2004/0181577 A1 | 9/2004 | Skurikhin et al. |
| 2004/0181579 A1 | 9/2004 | Huck et al. |
| 2004/0181796 A1 | 9/2004 | Fedotov et al. |
| 2004/0186888 A1 | 9/2004 | Samn |
| 2004/0194136 A1 | 9/2004 | Finseth et al. |
| 2004/0201620 A9 | 10/2004 | Berque |
| 2004/0201628 A1 | 10/2004 | Johanson et al. |
| 2004/0205775 A1 | 10/2004 | Heikes et al. |
| 2004/0205818 A1 | 10/2004 | Saruhashi et al. |
| 2004/0215742 A1 | 10/2004 | Cook et al. |
| 2004/0215743 A1 | 10/2004 | Cook et al. |
| 2004/0216044 A1 | 10/2004 | Martin et al. |
| 2004/0216045 A1 | 10/2004 | Martin et al. |
| 2004/0221009 A1 | 11/2004 | Cook et al. |
| 2004/0221010 A1 | 11/2004 | Butler |
| 2004/0221145 A1 | 11/2004 | Bolen et al. |
| 2004/0221256 A1 | 11/2004 | Martin et al. |
| 2004/0221260 A1 | 11/2004 | Martin et al. |
| 2004/0228531 A1 | 11/2004 | Fernadez et al. |
| 2004/0230536 A1 | 11/2004 | Fung et al. |
| 2004/0230572 A1 | 11/2004 | Omoigui |
| 2004/0233168 A1 | 11/2004 | Christenson |
| 2004/0236830 A1 | 11/2004 | Nelson et al. |
| 2004/0252679 A1 | 12/2004 | Williams et al. |
| 2004/0254998 A1 | 12/2004 | Horvitz |
| 2004/0263636 A1 | 12/2004 | Cutler et al. |
| 2004/0266460 A1 | 12/2004 | Reynolds |
| 2004/0267694 A1 | 12/2004 | Sakai et al. |
| 2005/0004881 A1 | 1/2005 | Klug |
| 2005/0005247 A1 | 1/2005 | Kamachi et al. |
| 2005/0007344 A1 | 1/2005 | Cook et al. |
| 2005/0027539 A1 | 2/2005 | Weber et al. |
| 2005/0028207 A1 | 2/2005 | Finseth et al. |
| 2005/0031106 A1 | 2/2005 | Henderson |
| 2005/0034079 A1 | 2/2005 | Gunasekar et al. |
| 2005/0044089 A1 | 2/2005 | Wu et al. |
| 2005/0049993 A1 | 3/2005 | Nori et al. |
| 2005/0049994 A1 | 3/2005 | Thompson et al. |
| 2005/0050053 A1 | 3/2005 | Thompson |
| 2005/0050054 A1 | 3/2005 | Clark et al. |
| 2005/0050537 A1 | 3/2005 | Thompson et al. |
| 2005/0055354 A1 | 3/2005 | Thompson et al. |
| 2005/0055380 A1 | 3/2005 | Thompson et al. |
| 2005/0055632 A1 | 3/2005 | Schwartz et al. |
| 2005/0059491 A1 | 3/2005 | Oh |
| 2005/0060211 A1 | 3/2005 | Xiao et al. |
| 2005/0060411 A1 | 3/2005 | Coulombe et al. |
| 2005/0060432 A1 | 3/2005 | Husain et al. |
| 2005/0071430 A1 | 3/2005 | Kobayashi et al. |
| 2005/0074101 A1 | 4/2005 | Moore et al. |
| 2005/0080849 A1 | 4/2005 | Wee et al. |
| 2005/0081160 A1 | 4/2005 | Wee et al. |
| 2005/0083851 A1 | 4/2005 | Fotsch |
| 2005/0084082 A1 | 4/2005 | Horvitz et al. |
| 2005/0084100 A1 | 4/2005 | Spies et al. |
| 2005/0091184 A1 | 4/2005 | Seshadri et al. |
| 2005/0091269 A1 | 4/2005 | Gerber et al. |
| 2005/0091272 A1 | 4/2005 | Smith et al. |
| 2005/0091297 A1 | 4/2005 | Sato et al. |
| 2005/0091671 A1 | 4/2005 | Deem et al. |
| 2005/0091674 A1 | 4/2005 | Knight et al. |
| 2005/0093868 A1 | 5/2005 | Hinckley |
| 2005/0102364 A1 | 5/2005 | Ozzie et al. |
| 2005/0104864 A1 | 5/2005 | Zhang et al. |
| 2005/0104892 A1 | 5/2005 | Covington et al. |
| 2005/0108451 A1 | 5/2005 | Covington et al. |
| 2005/0108614 A1 | 5/2005 | Huntly-Playle et al. |
| 2005/0114528 A1 | 5/2005 | Suito |
| 2005/0117729 A1 | 6/2005 | Reding et al. |
| 2005/0125083 A1 | 6/2005 | Kiko |
| 2005/0125717 A1 | 6/2005 | Segal et al. |
| 2005/0129278 A1 | 6/2005 | Rui et al. |
| 2005/0132408 A1 | 6/2005 | Dahley et al. |
| 2005/0138552 A1 | 6/2005 | Venolia |
| 2005/0147278 A1 | 7/2005 | Rui et al. |
| 2005/0149630 A1 | 7/2005 | Smolinski et al. |
| 2005/0155031 A1 | 7/2005 | Wang et al. |

| | | |
|---|---|---|
| 2005/0165545 A1 | 7/2005 | Obradovich et al. |
| 2005/0166151 A1 | 7/2005 | Isozaki et al. |
| 2005/0177868 A1 | 8/2005 | Kwan |
| 2005/0180548 A1 | 8/2005 | Moore |
| 2005/0182824 A1 | 8/2005 | Cotte |
| 2005/0182852 A1 | 8/2005 | Tinsley et al. |
| 2005/0183143 A1 | 8/2005 | Anderholm et al. |
| 2005/0193062 A1 | 9/2005 | Komine et al. |
| 2005/0193102 A1 | 9/2005 | Horvitz |
| 2005/0198040 A1 | 9/2005 | Cohen et al. |
| 2005/0202388 A1 | 9/2005 | Zuhl et al. |
| 2005/0204309 A1 | 9/2005 | Szeto |
| 2005/0210103 A1 | 9/2005 | Rui et al. |
| 2005/0210394 A1 | 9/2005 | Crandall et al. |
| 2005/0219204 A1 | 10/2005 | Huddleston et al. |
| 2005/0223027 A1 | 10/2005 | Lawrence et al. |
| 2005/0235215 A1 | 10/2005 | Dunn et al. |
| 2005/0237380 A1 | 10/2005 | Kakii et al. |
| 2005/0240960 A1 | 10/2005 | Nagtzaam |
| 2005/0246415 A1 | 11/2005 | Belfiore et al. |
| 2005/0261062 A1 | 11/2005 | Lewin et al. |
| 2005/0261999 A1 | 11/2005 | Rowady, Jr. |
| 2005/0276444 A1 | 12/2005 | Zhou et al. |
| 2005/0285878 A1 | 12/2005 | Singh et al. |
| 2005/0288078 A1 | 12/2005 | Cheok et al. |
| 2005/0289092 A1 | 12/2005 | Sumner et al. |
| 2005/0289453 A1 | 12/2005 | Segal et al. |
| 2005/0289590 A1 | 12/2005 | Cheok et al. |
| 2006/0004608 A1 | 1/2006 | Rovinelli et al. |
| 2006/0010206 A1 | 1/2006 | Apacible et al. |
| 2006/0014132 A1 | 1/2006 | Hamilton |
| 2006/0015598 A1 | 1/2006 | Olsen et al. |
| 2006/0022955 A1 | 2/2006 | Kennedy |
| 2006/0026067 A1 | 2/2006 | Nicholas et al. |
| 2006/0026254 A1 | 2/2006 | Kessen et al. |
| 2006/0028457 A1 | 2/2006 | Burns |
| 2006/0029092 A1 | 2/2006 | Luo et al. |
| 2006/0031291 A1 | 2/2006 | Beckemeyer |
| 2006/0041616 A1 | 2/2006 | Ludwig et al. |
| 2006/0041617 A1 | 2/2006 | Ludwig et al. |
| 2006/0041648 A1 | 2/2006 | Horvitz |
| 2006/0041752 A1 | 2/2006 | Tuvell et al. |
| 2006/0041848 A1 | 2/2006 | Lira |
| 2006/0045029 A1 | 3/2006 | Ethier et al. |
| 2006/0045030 A1 | 3/2006 | Bieselin |
| 2006/0047557 A1 | 3/2006 | Bieselin et al. |
| 2006/0047770 A1 | 3/2006 | Marappan et al. |
| 2006/0048061 A1 | 3/2006 | Forlenza et al. |
| 2006/0059253 A1 | 3/2006 | Goodman et al. |
| 2006/0059266 A1 | 3/2006 | Ludwig et al. |
| 2006/0064461 A1 | 3/2006 | Ludwig et al. |
| 2006/0075055 A1 | 4/2006 | Littlefield |
| 2006/0075121 A1 | 4/2006 | Ludwig et al. |
| 2006/0080432 A1 | 4/2006 | Spataro et al. |
| 2006/0080702 A1 | 4/2006 | Diez et al. |
| 2006/0080710 A1 | 4/2006 | Carthern |
| 2006/0092178 A1 | 5/2006 | Tanguay, Jr. et al. |
| 2006/0092268 A1 | 5/2006 | Ahn et al. |
| 2006/0094467 A1 | 5/2006 | Kim et al. |
| 2006/0095401 A1 | 5/2006 | Krikorian et al. |
| 2006/0095471 A1 | 5/2006 | Krikorian et al. |
| 2006/0095472 A1 | 5/2006 | Krikorian et al. |
| 2006/0099941 A1 | 5/2006 | Kim et al. |
| 2006/0101116 A1 | 5/2006 | Rittman et al. |
| 2006/0101119 A1 | 5/2006 | Qureshi et al. |
| 2006/0107226 A1 | 5/2006 | Matthews et al. |
| 2006/0107231 A1 | 5/2006 | Matthews et al. |
| 2006/0114920 A1 | 6/2006 | Jung et al. |
| 2006/0117371 A1 | 6/2006 | Margulis |
| 2006/0123353 A1 | 6/2006 | Matthews et al. |
| 2006/0126806 A1 | 6/2006 | Trandal et al. |
| 2006/0135258 A1 | 6/2006 | Maheshwari et al. |
| 2006/0136191 A1 | 6/2006 | Irons |
| 2006/0136964 A1 | 6/2006 | Diez et al. |
| 2006/0139330 A1 | 6/2006 | Kutch et al. |
| 2006/0142012 A1 | 6/2006 | Kirchhoff et al. |
| 2006/0143714 A1 | 6/2006 | Peterson et al. |
| 2006/0161981 A1 | 7/2006 | Sheth et al. |
| 2008/0109406 A1* | 5/2008 | Krishnasamy et al. ......... 707/3 |

FOREIGN PATENT DOCUMENTS

| | | |
|---|---|---|
| EP | 1 460 876 | 9/2004 |
| EP | 1 484 892 | 12/2004 |
| EP | 1 633 119 | 3/2006 |
| WO | WO 99/48011 | 9/1999 |
| WO | WO 01/25940 | 4/2001 |
| WO | WO 01/95126 | 12/2001 |
| WO | WO 02/073439 | 9/2002 |
| WO | WO 2005/022397 A1 | 3/2005 |

OTHER PUBLICATIONS

Bly et al., "Commune: A Shared Drawing Surface", Xerox Palo Alto Research Center & Center for Design Research, Stanford University, 1990.

Gajewska, et al., "Argo: A System for Distributed Collaboration", Systems Research Center-Digitial Equipment Corporation, Palo Alto, CA.

Mauve et al., "A generic proxy system for networked computer games", Proceedings of the 1st workshop on Network and system support for games, 2002, pp. 25-28.

Dodds, "Collaberative Interaction in a Virtual Environment", 2004.

Dyck et al., "High-Performance Telepointers", Proc. ACM CSCW, 2004.

Bernier, "Latency Compensating Methods in Client/Server In-game Protocol Design and Optimization".

Dyck, "A Survey of Appplication Layer Networking Techniques for Real-time Distributed Groupware", University of Saskatchewan, 2006.

Bonham et al., "Quake: An Example Multi-User Network Application—Problems and Solutions in Distributed Interactive Simulations", University of Washington Seattle, WA 98195, May 31, 2000.

Funkhouser, "Network topologies for scalable multi-user virtual environments", Proc. Of the Virtual Reality Annual International Symposium, pp. 222-228, 1996.

Marsic, "Real-Time Collaboration in Heterogeneous Computing Environments", Proc. ITCC 2000, pp. 222-227.

Phillips, "Architectures for Synchronous Groupware. Technical Report", 1999—425. Department of Computing and Information science, Queen's University, Kingston, Ontario, Canada, 1999.

Benford et al., "User Embodiment in Collaborative Virtual Environments", Proc. ACM CHI 1995, 242-249.

Bier et al., "MMM: a User Interface Architecture for Shared Editors on a Single Screen" Proc. ACM UIST 1991, 79-86.

Greenberg et al., "GroupSketch: A Multi-User Sketchpad for Geographically-Distributed Small Groups". Proc. Graphics Interface, 1991, 207-215.

Gutwin et al., "Improving Interpretation of Remote Gestures with Telepointer Traces", Proc. CSCW 2002, 49-57.

Written Opinion dated Jun. 1, 2009 for PCT/CA2007/000589 published as W02008119149 on Oct. 9, 2008, and entitled "Method, Apparatus, System, And Medium For Supporting Multiple-Party Communications" (16 pages).

International Search Report and Written Opinion dated Dec. 18, 2007 for PCT/CA2007/000589 published as W02008119149 on Oct. 9, 2008, and entitled "Method, Apparatus, System, And Medium For Supporting Multiple-Party Communications" (34 pages).

International Preliminary Report on Patentability dated Aug. 3, 2009 for PCT/CA2007/000589 published as W02008119149 on Oct. 9, 2008, and entitled "Method, Apparatus, System, And Medium For Supporting Multiple-Party Communications" (14 pages).

U.S. Appl. No. 11/694,872, filed Mar. 30, 2007 published as US-2008-0244615-A1 on Oct. 2, 2008 and entitled "Method, Apparatus, System, Medium, and Signals for Supporting a Multiple-Party Communication on a Plurality of Computer Servers".

U.S. Appl. No. 11/694,817, filed Mar. 30, 2007 published as US-2008-0244461-A1 on Oct. 2, 2008 and entitled "Method, Apparatus, System, Medium, and Signals For Supporting Pointer Display In A Multiple-Party Communication".

U.S. Appl. No. 11/694,865, filed Mar. 30, 2007 published as US-2008-0244702-Al on Oct. 2, 2008 and entitled "Method, Apparatus, System, Medium, and Signals for Intercepting a Multiple-Party Communication".

U.S. Appl. No. 11/694,853, filed Mar. 30, 2007 published as US-2008-0242422-A1 on Oct. 2, 2008 and entitled Method, Apparatus, System, Medium, and Signals for Supporting Game Piece Movement in a Multiple-Party Communication.

* cited by examiner

Communication Table Entry Format /‾ 180

| | | |
|---|---|---|
| 182 ~ CID | Communication Identifier |
| 184 ~ CommunicationName | Entered by originating client |
| 186 ~ CommunicationPassword | Optional, entered by originating client |
| 188 ~ KeepRunningIdleFlag | Flag indicating whether communication should continue when last client disconnects from the server |
| 190 ~ StartPointer | Points to the first inserted message in the Shared Buffer |
| 192 ~ CurrentPointer | Points to the last inserted message in the Shared Buffer |
| 194 ~ List of Pages | List of pages, created in the communication |
| 196 ~ Current Page | Currently loaded page in the communication |
| 198 ~ HiddenFlag | Communication hidden from view |

FIG. 6

Client Table Entry Format /‾ 200

| | |
|---|---|
| 202 ~ UID | Client's User Identifier |
| 204 ~ Client IP Address | Client's public IP |
| 206 ~ Client Port | Client's public TCP or UDP port number |
| 208 ~ CatchUpFlag | When set, Indicates that the client needs to catch up all previous data shared in the communication |
| 210 ~ SentPointer | Points to the last message in the Shared Buffer that was sent to the client computer |
| 212 ~ SilentFlag | Set for designated intercept client computers |

FIG. 7

SERVER:
Message transmission

| Event Name ID | Game Piece Movement 6 | Game Piece Action 7 |
|---|---|---|
| Byte:1 | MsgID | MsgID |
| 2 | MsgID | MsgID |
| 3 | UID | UID |
| 4 | UID | UID |
| 5 | Xold | Owner UID |
| 6 | Xold | Owner UID |
| 7 | Yold | Identifier |
| 8 | Yold | Identifier |
| 9 | Xnew | Action Type |
| 10 | Xnew | |
| 11 | Ynew | |
| 12 | Ynew | |
| 13 | Owner UID | |
| 14 | Owner UID | |
| 15 | Identifier | |
| 16 | Identifier | |
| . . | | |
| 27 | | |
| 28 | | |
| 29 | | |
| 30 | #0 | #0 |
| | ← Persistent → | |

FIG. 24

METHOD, APPARATUS, SYSTEM, MEDIUM, AND SIGNALS FOR PUBLISHING CONTENT CREATED DURING A COMMUNICATION

CROSS REFERENCE TO OTHER APPLICATIONS

This application is related to the US Patent applications entitled:

Method, Apparatus, System, and Medium for Supporting Multiple-Party Communications (U.S. patent application Ser. No. 11/694,770, now published as US-2008-0243994-A1 and pending);

Method, Apparatus, System, Medium, and Signals for Supporting Pointer Display in a Multiple-Party Communication (U.S. patent application Ser. No. 11/694,817, now published as US-2008-0244461-A1 and pending);

Method, Apparatus, System, Medium, and Signals for Intercepting a Multiple-Party Communication (U.S. patent application Ser. No. 11/694,865, now published as US-2008-0244702-A1 and pending);

Method, Apparatus, System, Medium, and Signals for Supporting a Multiple-Party Communication on a Plurality of Computer Servers (U.S. patent application Ser. No. 11/694,872, now published as US-2008-0244615-A1 and pending); and Method, Apparatus, System, Medium, and Signals for Supporting Game Piece Movement in a Multiple-Party Communication; all by Alexander Kropivny and all filed concurrently herewith (U.S. patent application Ser. No. 11/694,853, now published as US-2008-0242422-A1 and pending).

The disclosure of each of the above patent applications is incorporated by reference as part of the specification of this application.

BACKGROUND

The specification of this application relates generally to network communications, and more particularly to multiple-party communications conducted between client computers in a computer network.

High bandwidth internet connections enjoyed by many computer users have facilitated new forms of online collaboration, allowing users to conduct multiple-party communications over an internet connection by sharing a common view of a displayed page in an internet browser window, for example. Users may post comments on the displayed page, which may be transmitted to all users, thus facilitating online discussion.

However, such communications suffer from a common problem due to delays in transmitting posted comments and other information between the parties. In some cases these delays reduce the usefulness of an online communication since the parties do not feel a presence of other participants in the communication.

Accordingly, there remains a need for communication systems and methods that improve a user's experience of such multiple-party communications in a computer network.

SUMMARY

In accordance with one aspect of the invention there is provided a method for publishing content created during a previous communication hosted by a server, the content being represented by a first plurality of saved messages saved in a persistent memory on the server, the server being in communication with a computer network. The method involves receiving a request from a first computer in the computer network to view the content, the request including an identifier identifying the first plurality of saved messages. The method further involves reading the first plurality of saved messages associated with the identifier from the persistent memory, producing first output messages representing the content in respective saved messages in the first plurality of saved messages, and transmitting the first output messages to the first computer.

The method may involve transmitting at least one identifier to the first computer, the at least one identifier identifying a plurality of saved messages associated with at least one previous communication.

Transmitting the at least one identifier may involve transmitting one of a filename and a communication name associated with the at least one previous communication.

Transmitting the first output messages may involve creating a communication in response to receiving the request from the first computer, associating a client table with the communication, and storing a client identification of the first computer in the client table, the client identification being operable to cause the server to transmit the first output messages to the first computer.

The method may involve transmitting user interface program codes to the first computer, the program codes being operable to direct a processor circuit of the first computer to display a user interface for viewing the content associated with the first output messages.

The method may involve receiving a request from a second computer in the computer network to view the content, the request including an identifier identifying the first plurality of saved messages, and storing a client identification of the second computer in the client table, the client identification being operable to cause the server to transmit the first output messages to the second computer.

The method may involve causing the communication to be discontinued after transmitting the first output messages to the first computer.

Transmitting the first output messages may involve transmitting an output message identifying a link to one of content represented by a second plurality of saved messages associated with the previous communication and saved in the persistent memory on the server, and content on another server in the computer network, and the output message may be operable to cause the link to be displayed on the first computer.

The method may involve receiving a request from the first computer to view the content represented by the second plurality of saved messages in response to a user of the first computer actuating the link, the request including an identifier identifying the second plurality of saved messages, producing second output messages representing the content in respective saved messages in the second plurality of saved messages, and transmitting the second output messages to the first computer.

Producing the first output messages may involve copying each respective saved message in the first plurality of saved messages into a transmit buffer associated with the first computer to facilitate the transmitting.

Transmitting the first output messages may involve reading a timestamp associated with each respective saved message in the first plurality of saved messages, and transmitting the first output messages at corresponding transmission time intervals corresponding to respective time intervals between transmissions of the respective saved messages during the previous communication.

Transmitting the first output messages at the corresponding transmission time intervals may involve transmitting the first output messages at modified transmission time intervals to cause one of an increased transmission rate and a decreased transmission rate of the first output messages to the first computer.

Transmitting the first output messages may involve determining a message type associated with each respective saved message in the first plurality of saved messages, and transmitting respective first output messages to the first computer when the respective saved message may be associated with a persistent message type.

In accordance with another aspect of the invention there is provided an apparatus for publishing content created during a previous communication hosted by a server, the content being represented by a first plurality of saved messages saved in a persistent memory on the server, the server being in communication with a computer network. The apparatus includes provisions for receiving a request from a first computer in the computer network to view the content, the request including an identifier identifying the first plurality of saved messages. The apparatus also includes provisions for reading the first plurality of saved messages associated with the identifier from the persistent memory, provisions for producing first output messages representing the content in respective saved messages in the first plurality of saved messages, and provisions for transmitting the first output messages to the first computer.

The apparatus may include provisions for transmitting at least one identifier to the first computer, the at least one identifier identifying a plurality of saved messages associated with at least one previous communication.

The provisions for transmitting the at least one identifier may include provisions for transmitting one of a filename and a communication name associated with the at least one previous communication.

The provisions for transmitting the first output messages may include provisions for creating a communication in response to receiving the request from the first computer, provisions for associating a client table with the communication, and provisions for storing a client identification of the first computer in the client table, the client identification being operable to cause the server to transmit the first output messages to the first computer.

The apparatus may include provisions for transmitting user interface program codes to the first computer, the program codes being operable to direct a processor circuit of the first computer to display a user interface for viewing the content associated with the first output messages.

The apparatus may include provisions for receiving a request from a second computer in the computer network to view the content, the request including an identifier identifying the first plurality of saved messages, and provisions for storing a client identification of the second computer in the client table, the client identification being operable to cause the server to transmit the first output messages to the second computer.

The apparatus may include provisions for causing the communication to be discontinued after transmitting the first output messages to the first computer.

The provisions for transmitting the first output messages may include provisions for transmitting an output message identifying a link to one of content represented by a second plurality of saved messages associated with the previous communication and saved in the persistent memory on the server, and content on another server in the computer network, and the output message may be operable to cause the link to be displayed on the first computer.

The apparatus may include provisions for receiving a request from the first computer to view the content represented by the second plurality of saved messages in response to a user of the first computer actuating the link, the request including an identifier identifying the second plurality of saved messages, provisions for producing second output messages representing the content in respective saved messages in the second plurality of saved messages, and provisions for transmitting the second output messages to the first computer.

The provisions for producing the first output messages may include provisions for copying each respective saved message in the first plurality of saved messages into a transmit buffer associated with the first computer to facilitate the transmitting.

The provisions for transmitting the first output messages may include provisions for reading a timestamp associated with each respective saved message in the first plurality of saved messages, and provisions for transmitting the first output messages at corresponding transmission time intervals corresponding to respective time intervals between transmissions of the respective saved messages during the previous communication.

The provisions for transmitting the first output messages at the corresponding transmission time intervals may include provisions for transmitting the first output messages at modified transmission time intervals to cause one of an increased transmission rate and a decreased transmission rate of the first output messages to the first computer.

The provisions for transmitting the first output messages may include provisions for determining a message type associated with each respective saved message in the first plurality of saved messages, and provisions for transmitting respective first output messages to the first computer when the respective saved message may be associated with a persistent message type.

In accordance with another aspect of the invention there is provided an apparatus for publishing content created during a previous communication hosted by a server, the content being represented by a first plurality of saved messages saved in a persistent memory on the server, the server being in communication with a computer network. The apparatus includes a processor circuit operably configured to receive a request from a first computer in the computer network to view the content, the request including an identifier identifying the first plurality of saved messages. The processor circuit is also operably configured to read the first plurality of saved messages associated with the identifier from the persistent memory, produce first output messages representing the content in respective saved messages in the first plurality of saved messages, and transmit the first output messages to the first computer.

The processor circuit may be operably configured to transmit at least one identifier to the first computer, the at least one identifier identifying a plurality of saved messages associated with at least one previous communication.

The processor circuit may be operably configured to transmit one of a filename and a communication name associated with the at least one previous communication.

The processor circuit may be operably configured to transmit the first output messages by creating a communication in response to receiving the request from the first computer, associating a client table with the communication, and storing a client identification of the first computer in the client table, the client identification being operable to cause the server to transmit the first output messages to the first computer.

The processor circuit may be operably configured to transmit user interface program codes to the first computer, the program codes being operable to direct a processor circuit of the first computer to display a user interface for viewing the content associated with the first output messages.

The processor circuit may be operably configured to receive a request from a second computer in the computer network to view the content, the request including an identifier identifying the first plurality of saved messages, and store a client identification of the second computer in the client table, the client identification being operable to cause the server to transmit the first output messages to the second computer.

The processor circuit may be operably configured to cause the communication to be discontinued after transmitting the first output messages to the first computer.

The processor circuit may be operably configured to transmit the first output messages by transmitting an output message identifying a link to one of content represented by a second plurality of saved messages associated with the previous communication and saved in the persistent memory on the server, and content on another server in the computer network, and the output message being operable to cause the link to be displayed on the first computer.

The processor circuit may be operably configured to receive a request from the first computer to view the content represented by the second plurality of saved messages in response to a user of the first computer actuating the link, the request including an identifier identifying the second plurality of saved messages, produce second output messages representing the content in respective saved messages in the second plurality of saved messages, and transmit the second output messages to the first computer.

The processor circuit may be operably configured to produce the first output messages by copying each respective saved message in the first plurality of saved messages into a transmit buffer associated with the first computer to facilitate the transmitting.

The processor circuit may be operably configured to transmit the first output messages by reading a timestamp associated with each respective saved message in the first plurality of saved messages, and transmitting the first output messages at corresponding transmission time intervals corresponding to respective time intervals between transmissions of the respective saved messages during the previous communication.

The processor circuit may be operably configured to transmit the first output messages at modified transmission time intervals to cause one of an increased transmission rate and a decreased transmission rate of the first output messages to the first computer.

The processor circuit may be operably configured to transmit the first output messages by determining a message type associated with each respective saved message in the first plurality of saved messages, and transmitting respective first output messages to the first computer when the respective saved message is associated with a persistent message type.

In accordance with another aspect of the invention there is provided a computer readable medium encoded with codes for directing a processor circuit to publish content created during a previous communication hosted by a server, the content being represented by a first plurality of saved messages saved in a persistent memory on the server, the server being in communication with a computer network. The codes direct the processor circuit to receive a request from a first computer in the computer network to view the content, the request including an identifier identifying the first plurality of saved messages. The codes also direct the processor circuit to read the first plurality of saved messages associated with the identifier from the persistent memory, produce first output messages representing the content in respective saved messages in the first plurality of saved messages, and transmit the first output messages to the first computer.

In accordance with another aspect of the invention there is provided a computer readable signal encoded with codes for directing a processor circuit to publish content created during a previous communication hosted by a server, the content being represented by a first plurality of saved messages saved in a persistent memory on the server, the server being in communication with a computer network. The codes direct the processor circuit to receive a request from a first computer in the computer network to view the content, the request including an identifier identifying the first plurality of saved messages. The codes also direct the processor circuit to read the first plurality of saved messages associated with the identifier from the persistent memory, produce first output messages representing the content in respective saved messages in the first plurality of saved messages, and transmit the first output messages to the first computer.

In accordance with another aspect of the invention there is provided a system for publishing content created during a previous communication hosted by a server, the content being represented by a first plurality of saved messages saved in a persistent memory on the server, the server being in communication with a computer network. The system includes a server processor circuit operably configured to receive a request from a first computer in the computer network to view the content, the request including an identifier identifying the first plurality of saved messages, read the first plurality of saved messages associated with the identifier from the persistent memory, produce first output messages representing the content in respective saved messages in the first plurality of saved messages, transmit the first output messages to the first computer. The system also includes a first computer processor circuit operably configured to receive the first output messages, and display a user interface for viewing content associated with the first output messages.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings, which illustrate embodiments of the invention;

FIG. 6 is a schematic representation of a communication table entry in a communication table maintained by the sever processor circuit shown in FIG. 2;

FIG. 7 is a schematic representation of a client table entry in a client table maintained by the sever processor circuit shown in FIG. 2;

FIG. 24 is a game piece movement message format used in the system shown in FIG. 1;

DETAILED DESCRIPTION

System Overview

Figure 1:
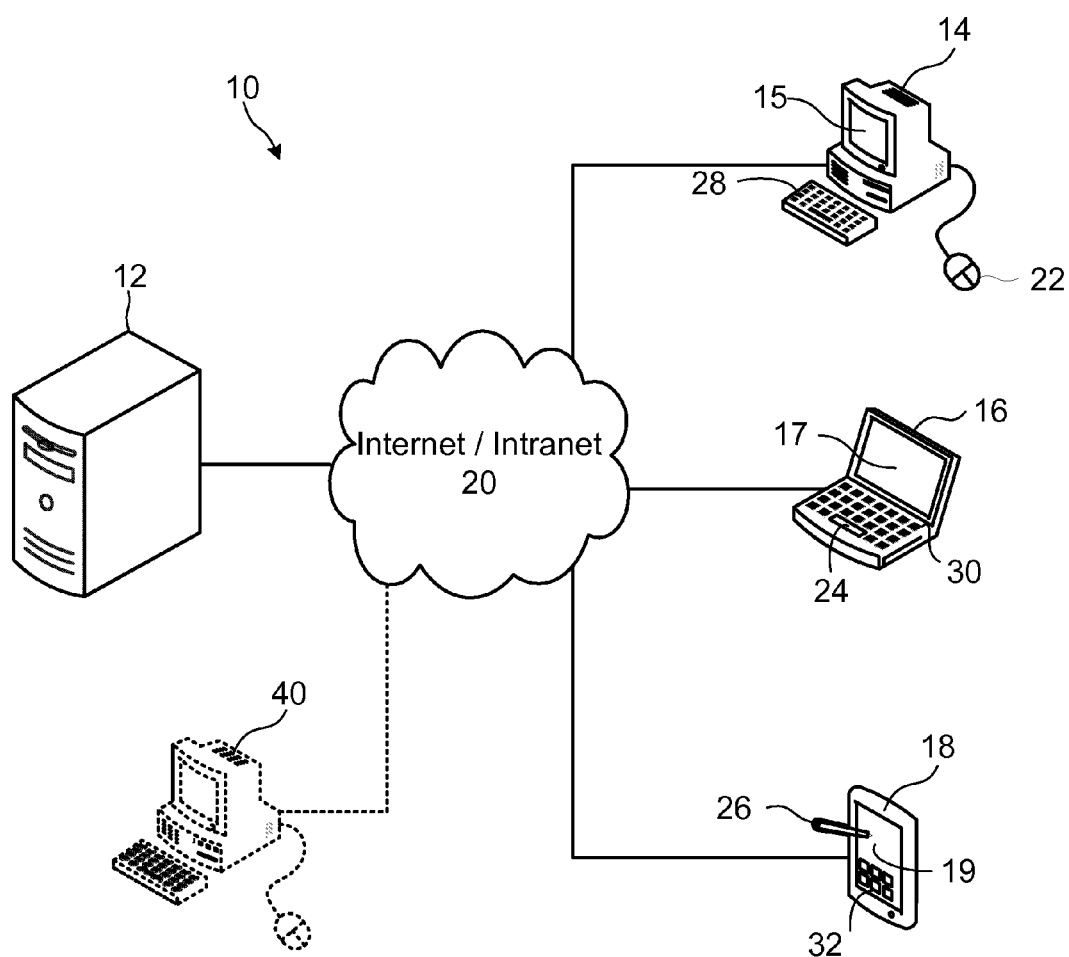
FIG. 1 is a schematic view of a system for supporting multiple-party communications in accordance with a first embodiment of the invention.

Referring to FIG. 1, a system for supporting multiple-party communications in accordance with a first embodiment of the invention is shown generally at 10. The system 10 includes a server 12 and a plurality of client computers 14, 16, and 18. In this embodiment the client computer 14 is a conventional desktop computer, the client computer 16 is a laptop computer, and the client computer 18 is a handheld computer. Each of the client computers 14, 16, and 18 communicates with the server 12 through a network 20 such as the internet or an intranet, for example.

Each of the client computers 14, 16, and 18 has a display 15, 17, and 19 respectively for displaying text, characters, and/or graphics on a display area thereof. Each of the client computers 14, 16, and 18 also has a pointing device 22, 24, and 26 respectively. In this embodiment the pointing device 22 is a conventional hand-held pointing device such as a computer mouse, the pointing device 24 is a touchpad, and the pointing device 26 is a stylus for providing user input on a touch sensitive display 19. The pointing devices 22, 24, and 26 generally produce user input signals for moving a cursor on the respective displays 15, 17, or 19, and may additionally provide actuator buttons for producing actuator button signals for performing various other user input functions.

In addition, each of the client computers 14, 16, and 18 has a character input device shown generally at 28, 30, and 32 respectively for receiving user input signals representing characters and for controlling certain operations of the client computer. The character input devices 28 and 30 are both conventional keyboard input devices. The character input device 32 may include areas on the touch sensitive display 19 that are mapped to characters, or may alternatively include a handwriting recognition engine for converting the user's handwriting motions of the pointing device 26 on the touch sensitive display 19 into character representations.

Thus, both the pointing devices 22, 24, and 26 and the character input devices 28, 30 and 32 are operable to produce user input signals that facilitate user input to the respective client computers 14, 16, and 18. Certain user input signals, whether received through the respective pointing device 22, 24, or 26, or through the respective character input device 28, 30, or 32, are formatted into messages by the client computers 14, 16, or 18, and are transmitted through the network 20 to the server 12.

In general the server 12 is configured to receive an input message representing user input received at one of the client computers 14, 16, or 18 and determine a message type associated with the input message. The server 12 then produces an output message representing the user input provided by the input message. The output message is transmitted to each of the client computer 14, 16, and 18 when the input message is associated with a persistent message type. When the input message is associated with a non-persistent message type, the output message is only transmitted to those of the client computers 14, 16, and 18 that meet a criterion.

Messages of the persistent type generally produce persistent changes to content on the display area, while messages of the non-persistent type do not result in persistent changes to the display area.

Thus, for example, movements of the pointing device 22 are represented by non-persistent messages that are produced by the client computer 14 and transmitted to the server 12. The server 12 then produces and transmits an output message back to those of the client computers 14, 16, and 18, to which all previously received messages of the persistent message type have already been transmitted.

A feature of the system 10 is that while user input, such as movements of the pointing device 22 at the client computer 14, for example, are reflected almost immediately on the display 15 as a corresponding change in position of the cursor, the client computer also transmits a cursor message to the server to elicit a pointer message from the server. The cursor message represents a change in a position of the cursor in response to the user input received from the user of the client computer. The client computer 14 receives the pointer message from the server and causes a corresponding change in a position of a pointer associated with the cursor and displayed on the display 15 in response to the message, which represents the change in position of the cursor.

It will be appreciated that there is a latency that occurs due to the round-trip time required for a cursor message transmitted by one of the client computers 14, 16, or 18 to reach the server 12, to be retransmitted by the server, and to be received back from the server at the client computers. Accordingly, the user producing the pointing device movement will see a time lag between the position of their cursor on their display and the position of the pointer associated with the pointer message received back from the server 12.

Similarly, each of the client computers 16, and 18 also receive the pointer message representing the change in position of the cursor of the client computer 14, and cause a corresponding change in a position of a pointer associated with the client computer 14, which is displayed on the respective display areas 17 and 18 of the client computers in response to the pointer message.

Advantageously, users are able to view their own real time cursor and their own and other user's pointers on their respective displays. Each user is thus made aware of other user's actions, thus providing a feeling of a real multiple-party presence in the multiple-party communication. Furthermore, the system 10 facilitates simultaneous user input from all client computers, which is in contrast to some prior art systems that only permit user input from a single designated presenter.

In this application the word "cursor" is used to refer to the client computer cursor on the respective displays 15, 17, and 19. The word "pointer" is used to refer to a secondary pointer, which is also displayed on the respective displays 15, 17, and 19 of the respective client computers 14, 16, or 18.

In one embodiment the system 10 further facilitates public access to published content created during a multiple-party communication and the system 10 may further include a public access computer 40 in communication with the server 12 through the network 20. Publication of multiple-party communication content is described later herein.

Processor Circuit—Server

Figure 2:
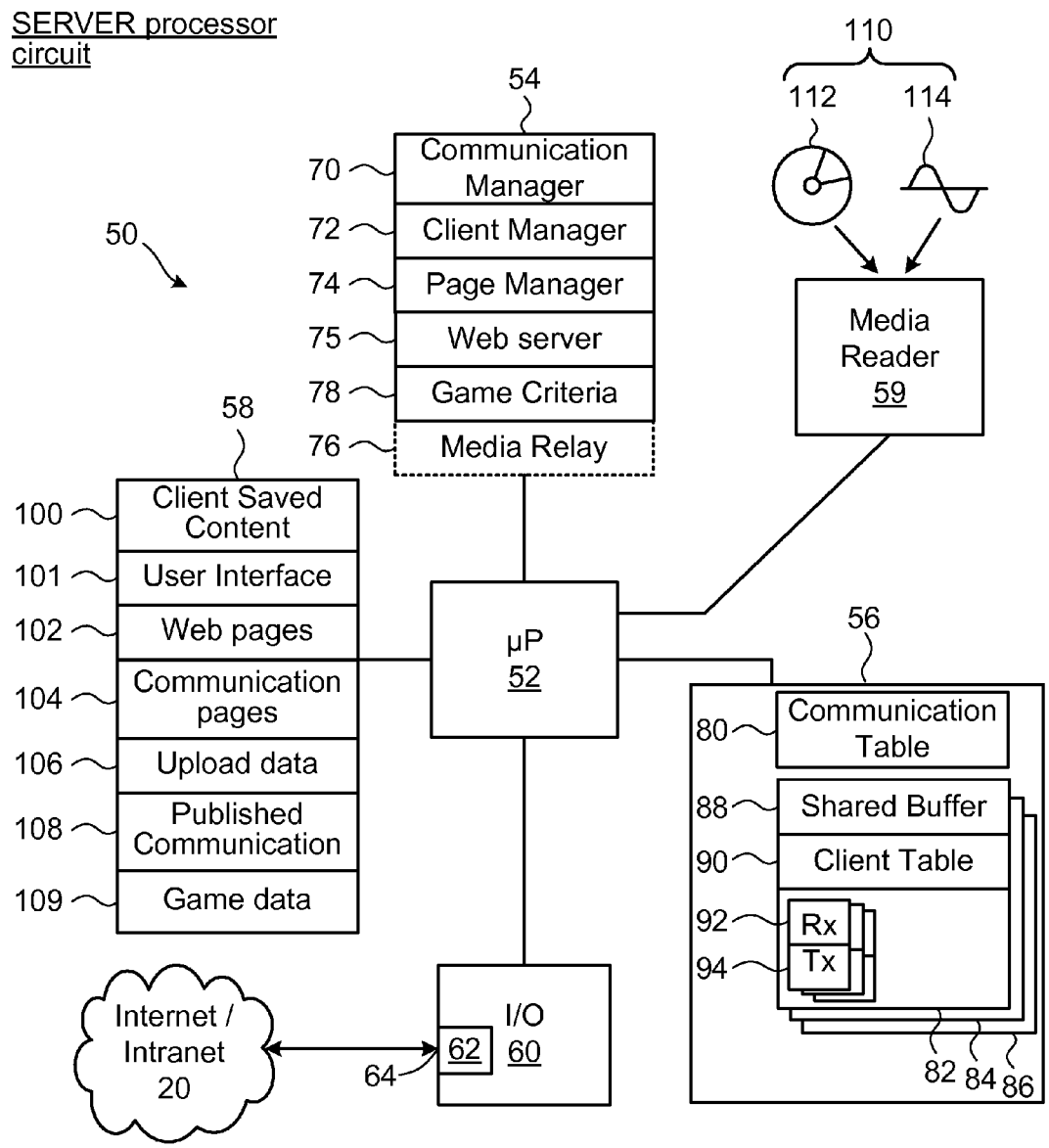
FIG. 2 is a schematic view of a processor circuit for implementing a server shown in FIG. 1.

Referring to FIG. 2, a processor circuit for implementing the server 12 is shown generally at 50. In this embodiment, the server processor circuit 50 includes a microprocessor 52, a program memory 54, a random access memory (RAM) 56, a persistent memory such as a hard drive 58, a media reader 59, and an input output port (I/O) 60, all of which are in communication with the microprocessor.

The I/O port 60 includes a network interface 62, such as a network interface card having an input/output 64 for connection to the network 20, and through which communications are conducted with the client computers 14, 16, and 18, as shown in FIG. 1.

Program codes for directing the microprocessor 52 to effect server functions of the system 10 are stored in the program memory 54, which may be implemented as a random access memory (RAM), and/or a hard disk drive (HDD), or a combination thereof.

The program memory 54 includes a block of codes 70 for directing the processor circuit 50 to effect communication manager functions, a block of codes 72 for directing the processor circuit to effect client manager functions, a block of codes 74 for directing the processor circuit to effect page management functions, a block of codes 75 for directing the processor circuit to effect web server functions, and a block of codes 78 for directing the processor circuit to effect game criteria functions. The program memory 54 may also optionally include a block of codes 76 for directing the processor circuit 50 to effect media relay functions, as will be described later herein.

The hard drive 58 includes a plurality of stores including a client saved content store 100 for storing content displayed during an ongoing communication. The hard drive 58 also includes a user interface store 101 for storing program codes operable to cause a user interface to be displayed on the client computers 14, 16, and 18, when downloaded by the client computers.

The hard drive 58 further includes a web page store 102 for storing data representing one or more web pages to be displayed on the client computers 14, 16, or 18 during the multiple-party communication. The data stored in the web page store 102 may include Hypertext Markup Language (HTML) data, for example.

The hard drive 58 further includes a communication page store 104 for saving pages of content created during multiple-party communications, an upload data store 106 for storing image data and/or other data uploaded by the client computers 14, 16, and 18 to the server 12, a published communication store 108 for storing published multiple-party communication content, and a game data store 109 for storing data associated with a game being played between client computers during the communication.

In other embodiments the hard drive 58 may be substituted by another form of persistent memory, such as a flash memory, for example.

The media reader 59 facilitates loading program codes into the program memory 54 from a computer readable medium 110 such as a CD ROM disk 112. Alternatively the program codes may be provided by a computer readable signal 114, which may be received over a network such as the internet, for example.

The RAM 56 includes a plurality of storage blocks including a communication table storage block 80 for storing a communication table holding information associated with active multiple-party communications being hosted by the server 12.

The RAM 56 also includes a storage block for each active multiple-party communication in the communication table 80. In this embodiment the processor circuit 50 is hosting three active multiple-party communications and accordingly three such storage blocks 82, 84, and 86 are shown.

Each storage block 82, 84, and 86 includes a shared memory buffer 88 for storing messages received from each of the client computers 14, 16 and 18. Each storage block 82, 84, and 86 further includes a client table storage block 90 for storing a client table holding identifications of respective client computers participating in each corresponding multiple-party communication.

Each storage block 82, 84, and 86 also includes a plurality of server side receive (Rx) buffers 92 and a plurality of server side transmit (Tx) buffers 94, including one Rx buffer and one Tx buffer for each client included in the client table 90.

In general, each storage block and/or buffer in the RAM 56 may include a plurality of storage locations implemented in random access memory, for example.

Shared Memory Buffer

Figure 3:
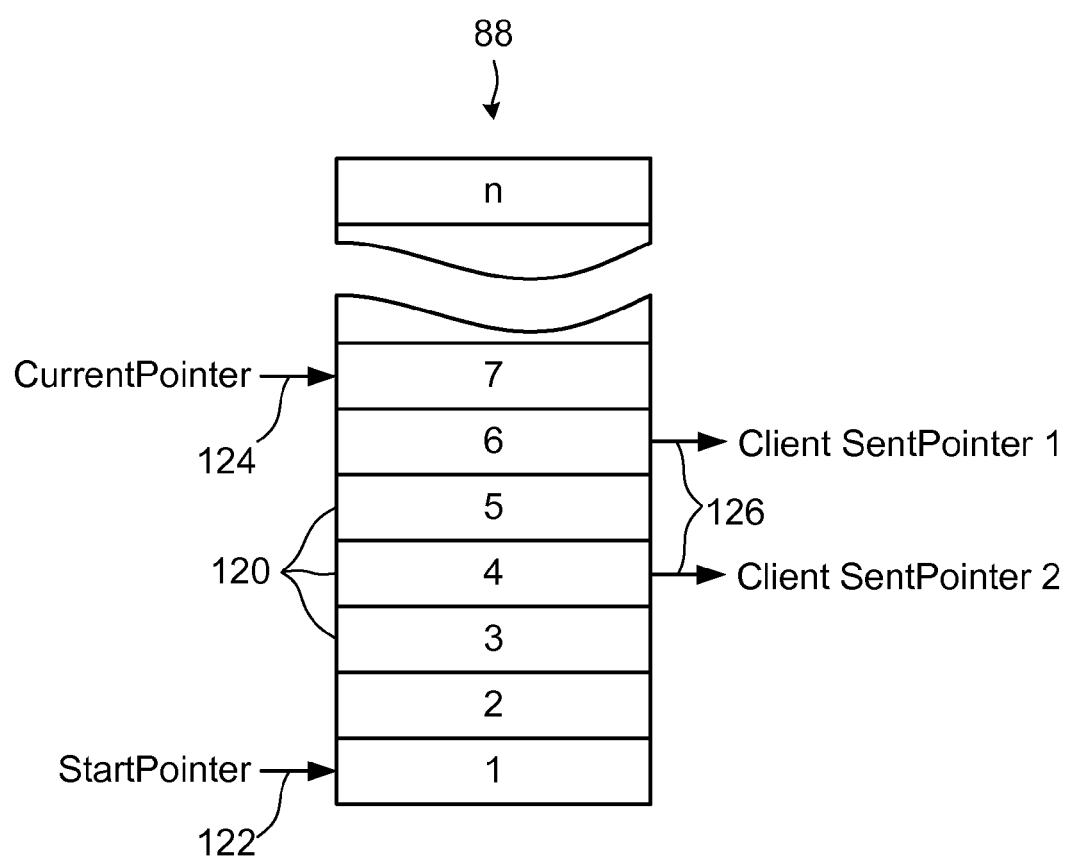
FIG. 3 is a schematic view of a shared buffer implemented in the server processor circuit shown in FIG. 2.

The shared memory buffer 88 is shown in greater detail in FIG. 3. Referring to FIG. 3, the shared buffer 88 includes a plurality of message stores 120 each being of sufficient size to hold one message, which in this embodiment are 30 bytes long. Each message store 120 (which are labeled as 1, 2, . . . n in FIG. 3) has an associated memory address. A "StartPointer" 122 is used to point to one of the message stores 120 to which a first message was written. A "CurrentPointer" 124 is used to point to one of the message stores 120 to which a last message was written. A plurality of client "SentPointer"s 126 are used to point to one of the message stores 120, whose contents were last transmitted to the respective client computer. Each of the client computers 14, 16, or 18 thus has a corresponding "SentPointer" 126.

In general, the data pointers 122 and 124 are variables stored in the communication table 80 and having respective values that reference (or "point" to) a memory address of one of the message stores 120. Similarly the client "SentPointer"s 126 are variables stored in an associated client table 90, having respective values that reference a memory address of one of the message stores 120.

In some embodiments the shared buffer 88 may be implemented as a circular buffer, in which case after a message has been written to the "n$^{th}$" message store 120, the "CurrentPointer" 124 wraps around and is reset to point to the "1$^{st}$" data store, and newly received messages will overwrite older messages in the shared buffer.

Each multiple party communication hosted by the server 12 has a single associated shared buffer 88. The shared buffer 88 is generally operable to store messages received from the client computers 14, 16, and 18 that have joined a multiple party communication. The shared buffer 88 further acts as a memory buffer for storing output messages to be transmitted to the client computers 14, 16, and 18. Advantageously, in this embodiment, output messages are produced by copying the input messages into the shared buffer 88, and accordingly only a single shared buffer 88 is used for each communication. In other embodiments output messages may have different formats and/or payload data to the input messages and in such embodiments an input shared buffer may be used to hold input messages, and output messages may be produced by reading the payload of the input messages and generating a corresponding output message, which may be stored in an output shared buffer.

Web Page

Figure 4:
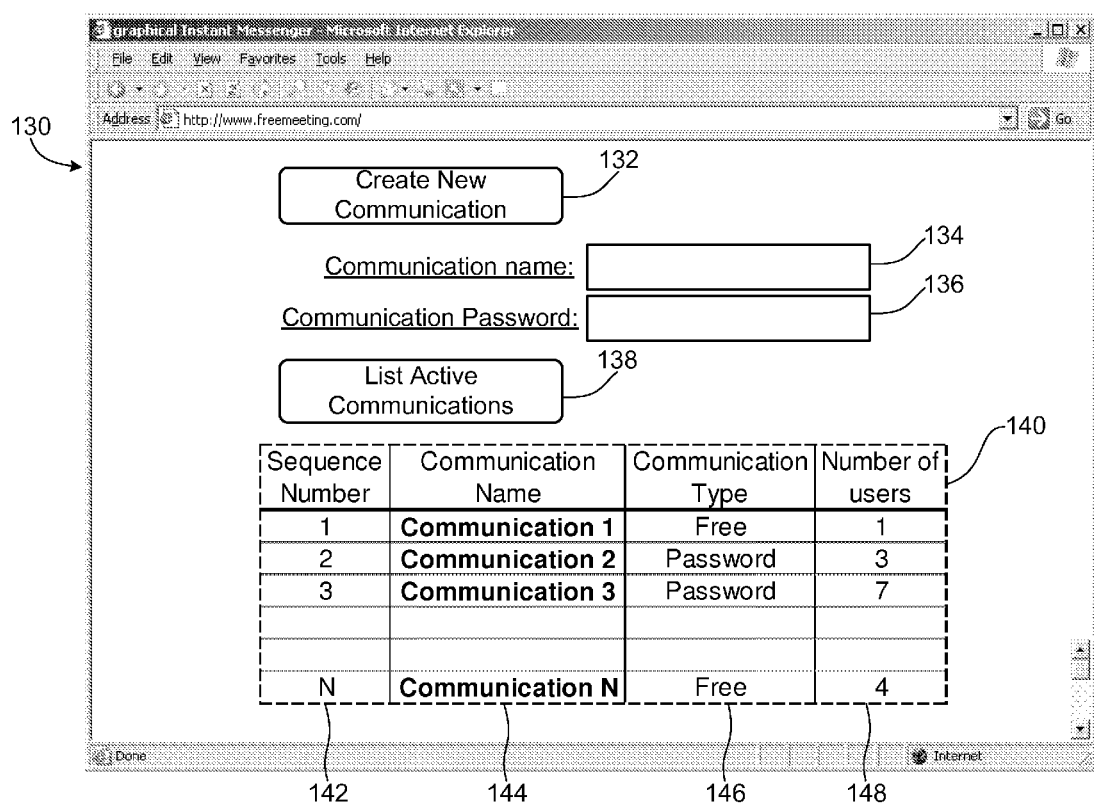
FIG. 4 is a screenshot of a web page displayed on a client computer in the system shown in FIG. 1.

Referring to FIG. 4, a screenshot of a web page displayed on the client computers 14, 16, or 18 when the client computers first connect to the server 12 is shown generally at 130. In general the client computers 14, 16, or 18 connect to the server 12 by directing a hypertext transfer protocol (HTTP) request for the web page 130 to the network interface 62 of the server processor circuit 50. The HTTP request from the client computer 14, 16, or 18 may be generated by a web browser application running on the client computer, for example.

When the HTTP request for the web page 130 is received at the network interface 62, the web server program codes 75 direct the server microprocessor 52 to read data representing the web page 130 from the store 102 on the hard drive 58, and to transmit the data through the network 20 to the client computer. The data representing the web page 130 may be communicated in one or more HTTP messages transmitted using a network transport protocol such as transmission control protocol over internet protocol (TCP/IP), for example.

When the HTTP data is received by the client computer 14, 16, or 18, the web browser application causes the web page 130 to be displayed in a browser window on a respective display 15, 17, or 19 of the client computers.

The web page 130 includes a "create new communication" button 132 and a "CommunicationName" field 134 for the user to enter a communication name. The web page 130 further includes a "CommunicationPassword" field 136 for optionally assigning a password when creating a new communication, such that access to the communication may be limited to users who are in possession of the password. The web page 130 further includes a "list active communications" button 138.

When a user of one of the client computers 14, 16, or 18 (an originating client) enters a communication name in the "CommunicationName" field 134 and clicks on the "create new communication" button 132, the client computer transmits a signal to the network interface 62 of the server processor circuit 50 to request creation a new communication. For example, the transmitted signal may include an HTTP request message including the communication name and password (if provided).

Create New Communication Process

Figure 5:
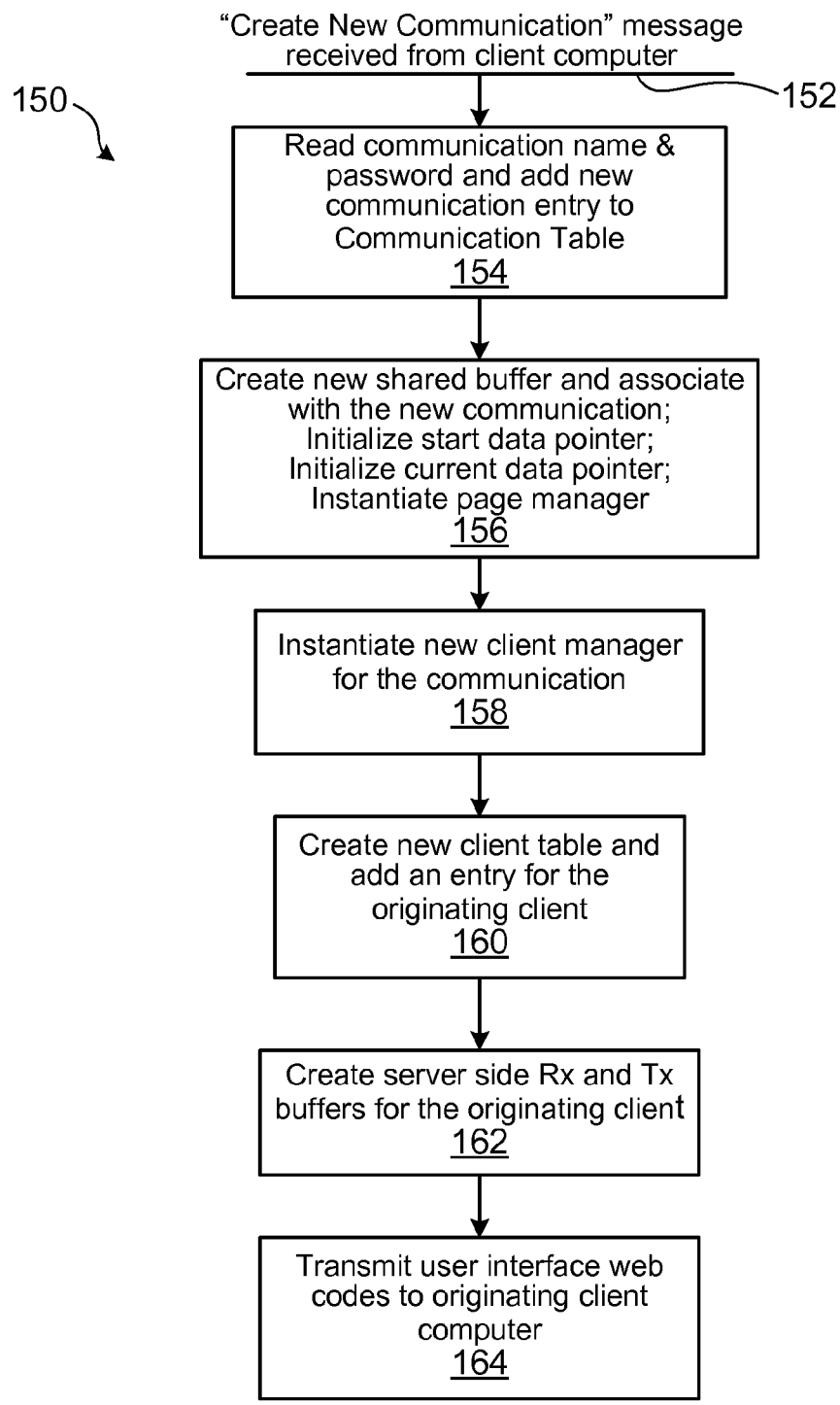
FIG. 5 is a flowchart representing blocks of codes for directing the server processor circuit shown in FIG. 2 to execute a "create new communication process"

Referring to FIG. 5, a flowchart of blocks of code for directing the processor circuit 50 (shown in FIG. 2) to create a new multiple-party communication is shown generally at 150. The blocks generally represent codes read from the program memory 54, for directing the microprocessor 52 to perform various communication manager, client manager, and page manager functions related to creating a new communication. The actual code to implement each block may be written in any suitable programming language, such as Flash™, Java, Delphi®, C, and/or C++, for example.

In general, the communication manager program codes 70 direct the microprocessor 52 to provide communication manager functions for creating the new multiple-party communication, and further direct the microprocessor 52 to cause the page manager program codes 74 and the client manager program codes to be launched in the process of creating the new communication.

The process 150 begins at 152 when a signal, such as an HTTP request message, is received from one of the client computers 14, 16, or 18 at the network interface 62, requesting that a new multiple-party communication be created.

Block 154 then directs the microprocessor 52 to read the communication name provided and the password (if provided) in the HTTP request message received from the client computer. Block 154 further directs the microprocessor 52 to add a new communication entry to the communication table 80 in the RAM 56.

Communication Table Entry

The communication table entry is shown in greater detail in FIG. 6 at 180. Referring to FIG. 6, the communication table entry 180 includes a plurality of fields identifying the communication, which are populated when block 154 (shown in FIG. 5) directs the microprocessor 52 to add the new communication entry to the communication table 80 stored in the RAM 56.

The communication table entry 180 includes a communication identifier ("CID") field 182, which is populated with a unique communication identifier number assigned to the new multiple-party communication.

The communication table entry 180 also includes a "CommunicationName" field 184, which is populated with the communication name assigned by the originating client in the "CommunicationName" field 134 on the web page 130 (shown in FIG. 4). The entry 180 also includes a "CommunicationPassword" field 186, which is optionally assigned by the originating client in the "CommunicationPassword" field 136 on the web page 130. If no communication password is assigned by the originating client, the "CommunicationPassword" field 186 on the communication table entry 180 is left empty.

The communication table entry 180 further includes a "KeepRunningIdleFlag" field 188 for storing a flag indicating whether the communication should be kept running after the last client has disconnected from the server 12.

The communication table entry 180 also includes a "StartPointer" field 190 and a "CurrentPointer" field 192, for storing address values of the "StartPointer" 122 and the "CurrentPointer" 124 respectively, as shown in FIG. 3.

The communication table entry 180 further includes a list of pages field 194 for storing a listing of the pages created during the communication. The entry 180 also includes a current page field 196 for storing a value identifying a currently loaded page in the communication.

The communication table entry 180 may also have an associated "HiddenFlag" field 198 for storing a flag value indicating whether the communication should be hidden. As described later herein, certain multiple-party communications may be created to allow the public access computer 40 (shown in FIG. 1) to access published communication content or to permit lawful intercept authorities to intercept communication content. Advantageously, the client computers 14, 16 and 18 are not made aware of the existence of communications for which the hidden flag is set to active.

Referring back to FIG. 5 the process continues at block 156, which directs the microprocessor 52 to create a new shared buffer 88 and associated the shared buffer with the CID of the multiple-party communication. Block 156 further directs the microprocessor 52 to initialize the "StartPointer" 122 and the "CurrentPointer" to refer to a first store 120 in the shared buffer 88 and to instantiate a page manager for the multiple-party communication by initiating execution of the page manager program codes 74.

Block 158 then directs the microprocessor 52 to instantiate a new client manager for the multiple-party communication by launching the client manager program codes in the store 72.

In this embodiment the communication manager instantiates a separate client manager for each communication included in the communication table 80. The communication manager continues running in parallel with the page manager and the client manager, such that the processor circuit 50 is able continue to provide communication manager functions and/or create other new multiple-party communications.

The remaining blocks of the process 150 directs the microprocessor 52 to perform various client manager functions associated with the newly created multiple-party communication. The process continues at block 160, which directs the microprocessor 52 to generate a new client table 90 in the RAM 56, and to add an identification entry to the client table identifying the originating client computer.

Client Table Entry

The client table entry is shown in greater detail in FIG. 7 at 200. Referring to FIG. 7, the client table entry includes a plurality of fields identifying the associated client computer, which are populated when block 160 (shown in FIG. 5) directs the microprocessor 52 to add the originating client entry to the client table 90 stored in the RAM 56.

The client table entry 200 includes a client computer identifier field ("UID") 202, which is populated with a unique client computer identifier number ("UID") assigned to the client computer.

The client table entry 200 further includes a client IP address field 204, and a client port field 206, which are populated with values obtained from the header of an internet protocol data packet received from the client computer at the server network interface 62.

The client table entry 200 further includes a "CatchUpFlag" field 208, which when set, indicates that the client computer needs to "catch up" with previous data shared during the multiple-party communication. When an originating client computer creates a new multiple-party communication, the "CatchUpFlag" 208 in the client table entry 200 for the client computer is set to not active, as described later herein.

The client table entry 200 also includes a "SentPointer" 210, which holds an address of one of the message stores 120 in the shared buffer 88, corresponding to a message that was last transmitted to the corresponding client computer. The client "SentPointer" field 210 is initially set to "nil" and is subsequently set equal to the "StartPointer" 122 once a first message is transmitted to the client computer by the server 12.

Finally the client table entry 200 may also have an associated "SilentFlag" 212 for holding a flag value, which when set to active, indicates that the user of the client computer corresponding to the client "UID" is an intercept authority. Designated intercept client computers are treated differently by the server than the client computers 14, 16 and 18, as described later herein.

Referring back to FIG. 5 the process 150 continues at block 162, which directs the microprocessor 52 to create a server side Rx buffer 92 and a server side Tx buffer 94 in the RAM 56 for the originating client. The server side Rx buffer 92 is used to temporarily store messages received from the client computer and the server side Tx buffer 94 is used to temporarily store messages to be transmitted to the client computer. Creating the server side Rx buffer 92 and the server side Tx buffer 94 may involve opening a network socket for communications between each one of the client computers 14, 16, and 18 and the server, for example. A network socket is a software function provided by most operating systems that facilitates communications over a computer network. Network socket functions generally allocate Rx and Tx buffers which may be used as the Rx and Tx buffers 92 and 94.

Block 164 then directs the microprocessor 52 to read the user interface codes from the user interface store 101 of the server hard drive 58 and to cause the network interface 62 of the I/O PORT 60 to transmit the user interface codes through the network 20 to client computer that originated the communication.

Join Active Communication Process

Referring back to FIG. 4, when a user of one of the client computers 14, 16, or 18 clicks on the "list active communications" button 138 an HTTP request message is transmitted to the network interface 62 of the server processor circuit 50 requesting a listing of active multiple-party communications currently being hosted by the server 12.

Figure 8:
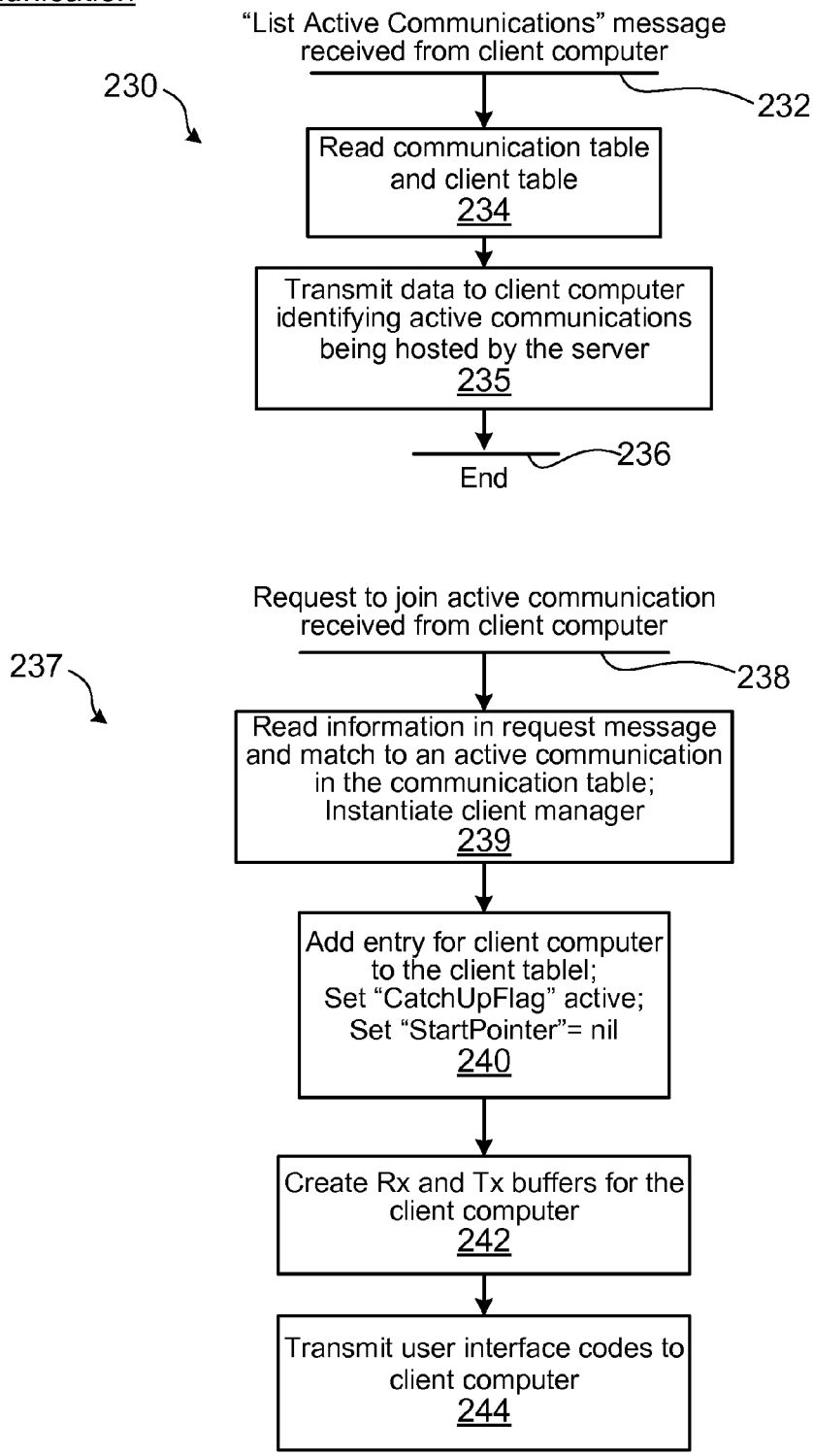
FIG. 8 is a flowchart representing blocks of codes for directing the server processor circuit shown in FIG. 2 to execute a "list active multiple-party communications" process.

Referring to FIG. 8, a flowchart of blocks of code for directing the processor circuit 50 (shown in FIG. 2) to transmit a listing of active multiple-party communications to the client computer is shown generally at 230. The process begins at 232 when the HTTP message requesting an identification of active multiple-party communications is received at the network interface 62.

Block 234 directs the microprocessor 52 to read the communication table entries 180 and the corresponding client table entries 200 (shown in FIGS. 6 and 7 respectively) in the communication table 80 and corresponding client table 90 stored in the RAM 56. Block 235 then directs the microprocessor 52 to transmit data to client computer identifying active communications being hosted by the server. The process 230 then ends at 236.

Referring back to FIG. 4, the client computer receives the data from the server 12 and displays a table identifying active multiple-party communications shown generally at 140.

The table 140 includes a first column 142 listing a sequence number assigned to the multiple-party communication (i.e. 1, 2, 3 . . . for example). The table 140 also includes a second column 144 listing the communication name from the "CommunicationName" field 184, and a third column 146 listing a communication type. The communication type is set to "free" when no password has been assigned by the originating user for the multiple-party communication, and to "password" when a password is required to join the multiple-party communication. The table 140 also includes a fourth column 148, listing a number of client computer users involved in each respective multiple-party communication.

In this embodiment, the table 140 is only displayed after the user activates the "list active communications" button 138, but in other embodiments the "list active communications" button 138 may be omitted and the table 140 may be displayed when the web page 130 is loaded from the server 12 by the client computer 14, 16, or 18.

In general, fields in at least one of the columns in the table 140 have associated hyperlink properties, which facilitate selection of a particular multiple-party communication by clicking on a hyperlink associated with the multiple-party communication. For example, in the embodiment shown in FIG. 4, the communication names listed in bold font in column 144 may include such hyperlink properties.

When the user of one of the client computers 14, 16, or 18 clicks on one of the hyperlinked communication names in column 144, the web browser application program codes 281 (shown in FIG. 9) direct the microprocessor 262 to transmit an HTTP message to the server 12. The HTTP message includes an identifier identifying the multiple-party communication, such as the communication name and/or the communication identifier "CID" for the multiple-party communication.

Still referring to FIG. 8, a flowchart of blocks of code for directing the processor circuit 50 to add the client computer to an active communication is shown generally at 237. The process begins at 238 when the server processor circuit 50 receives an HTTP request message identifying an active communication that the user of the client computer wishes to join.

Block 239 directs the microprocessor 52 to read the information in the HTTP message received from the client computer and to match the information to a multiple-party communication in the communication table 80. For example, if the HTTP message includes a communication identifier, the "CID" is read from the HTTP message and compared with the values in the "CID" field 182 in the communication table entries 180 find the corresponding multiple-party communication. Alternatively, if the HTTP message includes a communication name, the communication name is compared with the values in the "CommunicationName" field 184 in the communication table entry 180 to find the corresponding multiple-party communication.

Block 239 also directs the microprocessor 52 to instantiate a client manager for the client computer. In general, a separate thread of the client manager is instantiated and associated with each client computer in the communication and each client manager thread is associated with the communication.

Referring back to FIG. 8, the remaining blocks 240 to 244 in the process 230 direct the server processor circuit 50 to perform client manager functions.

Block 240 then directs the microprocessor 52 to add a new client table entry 200 identifying the client computer to the corresponding client table 90 for the selected multiple-party communication. Block 240 also directs the microprocessor 52 to populate the fields in the new client table entry, and to set the "CatchUpFlag" 208 in the client table entry 200 to active and to set the client "SentPointer" field 210 to "nil".

When a client computer user joins an already active multiple-party communication, the "CatchUpFlag" 208 is set to active to cause messages in the multiple-party communication that the client computer user may have missed by joining the multiple-party communication late to be transmitted to the client computer. The client "SentPointer" field 210 is set equal to the "StartPointer" 122 once the first message is transmitted to the client computer.

Block 242 then directs the microprocessor 52 create server side Rx and Tx buffers 92 and 94 for the client. Advantageously each client computer 14, 16, and 18 has corresponding server side Rx and Tx buffers, which facilitate transmitting multiple-party communication data that may already have been transmitted to other client computers to client computer users who join a multiple-party communication after the multiple-party communication has started (i.e. all clients other than the originating client for the multiple-party communication).

Block 244 then directs the microprocessor 52 to read the user interface codes from the user interface store 101 and to cause the network interface 62 of the I/O PORT 60 to transmit the user interface codes through the network 20 to the client computer.

Processor Circuit—Client Computer

Figure 9:
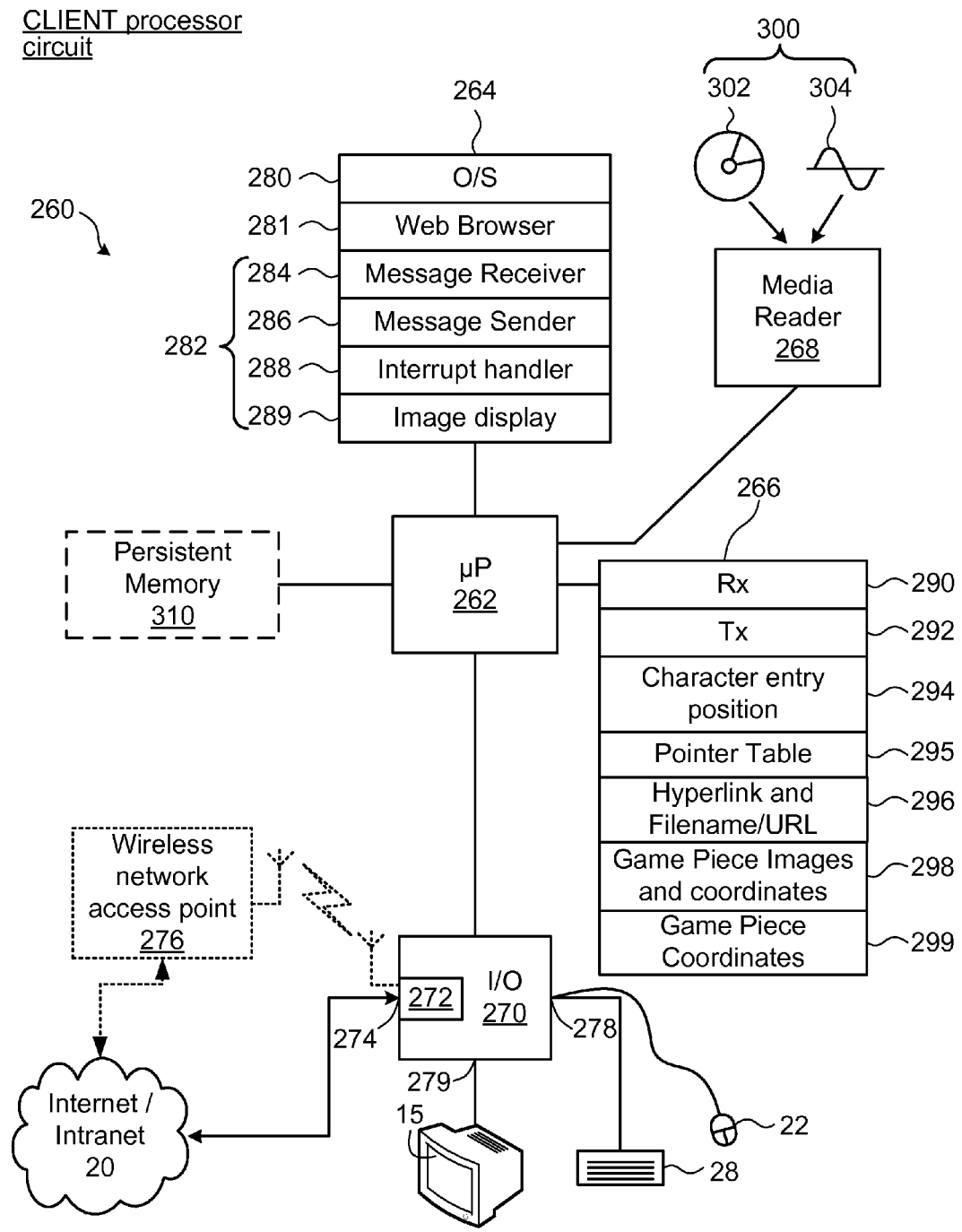
FIG. 9 is a schematic view of a processor circuit for implementing the client computer shown in FIG. 1.

Referring to FIG. 9, a processor circuit of the client computers 14, 16, and/or 18 is shown generally at 260. In this embodiment, the client processor circuit 260 includes a microprocessor 262, a program memory 264, a random access memory (RAM) 266, a media reader 268, and an input/output port (I/O) 270, all of which are in communication with the microprocessor 262.

The I/O port 270 includes an interface 272, such as a network interface card having an input/output 274 in communication with the network 20. The interface 272 facilitates transmitting messages to the server 12 and receiving messages from the server, as shown in FIG. 1. Alternatively the interface 272 may include a wireless interface for connecting to a wireless network access point 276, which facilitates connection to the network 20.

The I/O port 270 further includes an input 278 for receiving user input signals from a character input device (such as the character input device 28 shown in FIG. 1), and from a pointing device (such as the pointing device 22 shown in FIG. 1).

The I/O port 270 further includes an output 279 for producing display signals for causing a client computer display (such as the display 15 shown in FIG. 1) to display images, characters, and cursors, for example.

Program codes for directing the microprocessor 262 to effect client functions of the system 10, shown in FIG. 1, are stored in the program memory 264, which may be implemented as a random access memory (RAM), and/or a hard disk drive (HDD), or a combination thereof. The program memory 264 includes a block of codes 280 for directing the processor circuit to effect operating system (O/S) functions, and a block of codes 281 for directing the processor circuit to provide web browsing functions.

The program memory 264 also includes a block of codes 282 for directing the processor circuit 260 to effect various user interface functions. The block of codes 282 includes a first block of codes 284 for directing the processor circuit 260 to effect a message receiver function, a second block of codes 286 for directing the processor circuit to effect a message sender function, a third block of codes 288 for directing the processor circuit to effect interrupt handler functions, and a fourth block of codes 289 for directing the processor circuit 260 to effect display functions.

In one embodiment the user interface program codes 282 are received at the interface 272 in one or more HTTP messages from the server 12. The program codes are then extracted from the HTTP message payload and loaded into the program memory 264.

Alternatively, the media reader 268 may be used to load user interface program codes from a computer readable medium 300 into the program memory 264. The computer readable medium 300 may be a CD ROM disk 302. Alternatively the program codes may be provided by a computer readable signal 304, which may be received over a network such as the internet, for example.

The RAM 266 includes a plurality of storage blocks including a client side receive (Rx) buffer 290 for temporarily storing messages received from the server 12 and a client side transmit (Tx) buffer 292 for temporarily storing messages to be transmitted back to the server 12. In general, the buffers 290 and 292 include a plurality of storage locations in the RAM 266 and may be implemented by opening a network socket using operating system functions provided by the operating system 280.

The RAM 266 also includes a character entry position store 294 for storing coordinates of a character entry position, a pointer table store 295 for storing a table of pointers, and a hyperlink and filename/URL store 296 for storing coordinates and filenames or internet addresses associated with one or more hyperlinks.

The RAM 266 further includes a game piece image store 298 for storing information associated with a game that may be played during the multiple-party communication. The RAM 266 also includes a game piece coordinate 299 store for storing variables representing coordinates of the game piece images.

The processor circuit 260 may optionally include a persistent data store 310 (such as a hard drive) for persistent storage of data. The persistent data store 310 may be used for persistent storage of program codes, and image files, for example. The persistent data store 310 may also be used for storage of data related to multiple-party communications. However in the embodiments described herein multiple-party communication data is stored on the server hard drive 58 and the system 10 does not directly make use of persistent data store 310 on the client computer processor circuit 260.

Producing Messages—Client Computer

In general, client computers 14, 16, and/or 18 in a multiple-party communication produce messages in response to user input signals and/or combinations of user input signals and function invocations. The user input signals may include character signals representing character input received from the character input device 28, cursor movement signals representing a cursor movement produced in response to user input received at a pointing device 22, and actuator button signals produced in response to user actuation of actuator buttons associated with the pointing device. The messages generated by the client computers 14, 16 and 18 are transmitted to the server 12.

Still referring to FIG. 9, the operating system program codes 280 in the program memory 264 direct the microprocessor 262 to cause the I/O port 270 to monitor signals received at the input 278 from the character input device 28 and the pointing device 22, and to generate interrupt event signals in response to the user input signals. The interrupt event signals produced by the operating system are read by the user interface interrupt handler 288. For example, in the Microsoft Windows® operating system, interrupt event signals are written to a message queue and the interrupt handler 288 is registered to receive or listen to certain event signals in the message queue.

For example, mouse input signals are produced when a button on the pointing device 22 is actuated and released, the mouse is moved (i.e. no buttons actuated), or the mouse is dragged (i.e. moved while pressing a mouse button). The operating system receives these signals and produces interrupt event messages including coordinate positions and other information identifying the input, which are written into the message queue. Similarly, keyboard input signals produce interrupt event messages which are also written into the message queue.

The interrupt handler program codes 288 further direct the microprocessor 262 to provide functions for reading the message queue and for handling the operating system interrupt event messages. For example, in Java programming language, getX and getY functions are provided for returning the X and Y coordinates of a cursor, which has been moved in response to user input from the pointing device. The event "KeyTyped"(KeyEvent e) is invoked following a keyboard interrupt, where the actuated key is represented by a numeric value in a "KeyEvent" object produced by the Java function.

Figure 10:
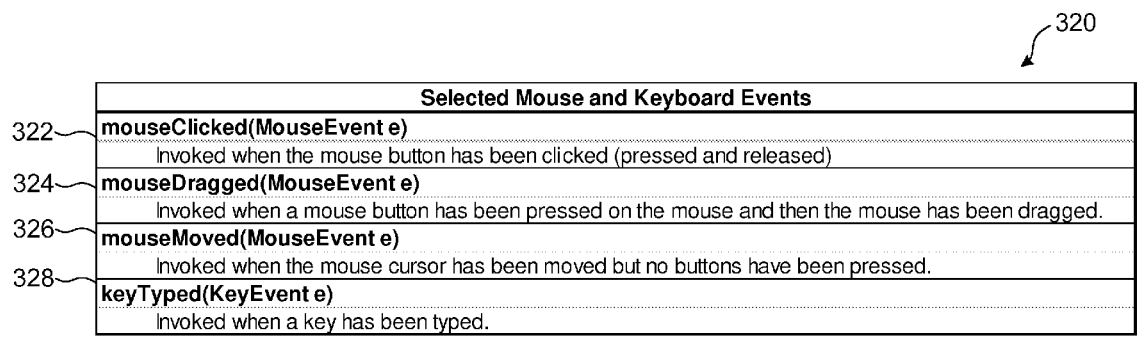
FIG. 10 is a table listing selected mouse and keyboard events implemented in a Java™ programming language.

Referring to FIG. 10, a table listing selected methods for acting on mouse and keyboard interrupts in the Java programming language is shown generally at 320. The methods listed include a mouseClicked(MouseEvent e) 322, which is invoked when the mouse button has been actuated, a mouseDragged(MouseEvent e) 324, which is invoked when a mouse button has been actuated on the mouse and then the mouse has been dragged, a mouseMoved(MouseEvent e)

326, which is invoked when the mouse cursor has been moved but no buttons have been actuated, and a keyTyped(KeyEvent e) 328, which is invoked when a key has been typed.

In some instances two or more of the event signals may be generated essentially simultaneously in response to the user input. For example when the user of the client computer 14, 16 or 18 actuates the mouse button, then drags the mouse while the button is actuated, and then releases the mouse button several event signals are produced. When the mouse button is actuated, none of the events listed in FIG. 10 are produced until the user drags the mouse (a "mousePressed" event is produced, but this event is not used in this embodiment). Generally the mouse drag will produce a plurality of "mouseDragged" event signals while the mouse is being dragged and each individual "mouseDragged" signal or message defines a portion of the movement of the mouse. At the end of the mouse drag, the user releases the mouse button, which causes the "mouseClicked" event signal to be produced (since the button was actuated and then subsequently released). The mouse drag may thus be defined by a plurality of event signals between a location at which the mouse button was actuated and a location at which the mouse button was released.

Other programming languages such as Adobe Flash, C++, and Delphi provide equivalent functionality for handling such events.

User Interface

When a user of one of the client computers 14, 16, or 18 joins a multiple-party communication, either by clicking the "create new communication" button 132 on the web page 130 shown in FIG. 4, or by clicking the "list active communications" button 138 and selecting a multiple-party communication to join from the table 140, the server 12 transmits program codes to the client computer for displaying the user interface 470 (shown in FIG. 11) on the client computer display 15. As described above, the user interface program codes may include Java or Flash program codes for directing the microprocessor 262 to provide user interface functions. The program codes may be downloaded from the server 12 and automatically executed after downloading.

Alternatively, the client computer may launch program codes (not shown) for instantiating a stand-alone user interface program, which causes the user interface 470 to be displayed without being downloaded from the server 12.

Figure 11:
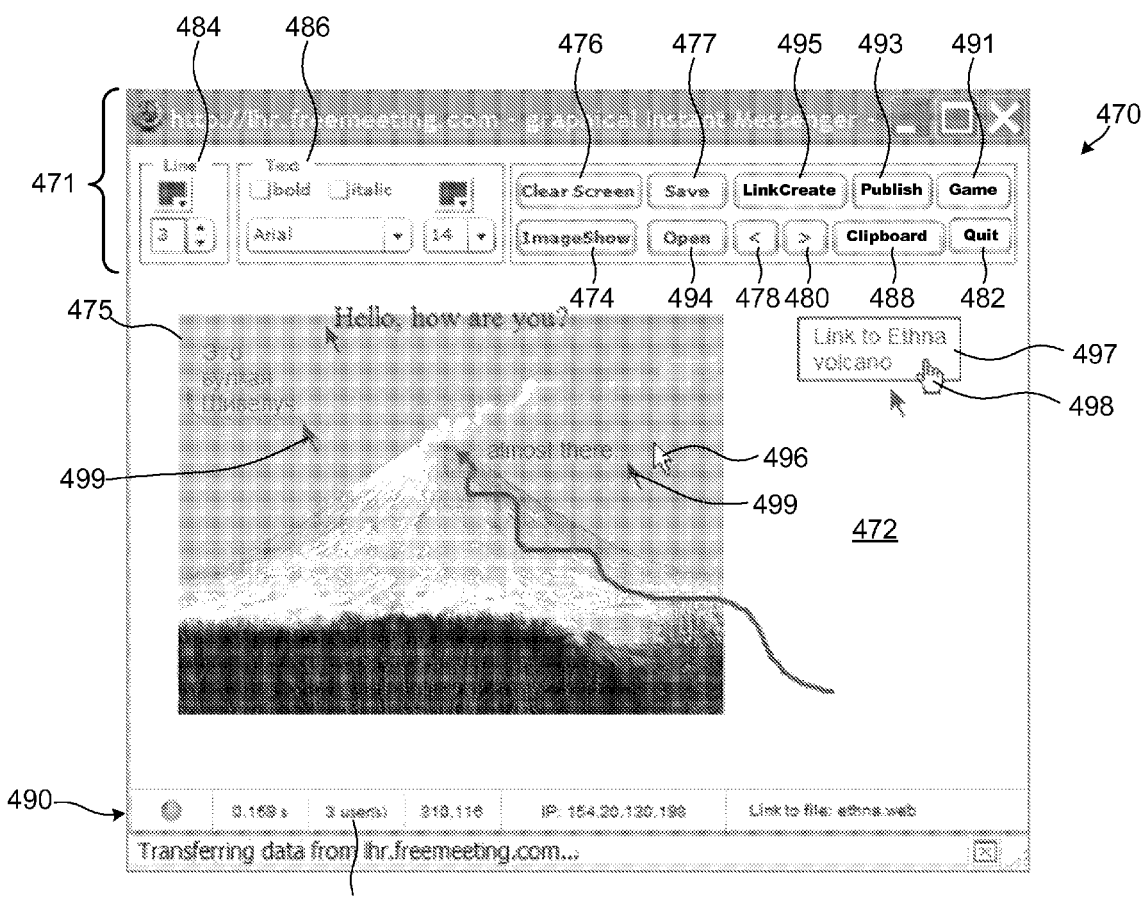
FIG. 11 is a screenshot of a user interface displayed on the client computers shown in FIG. 1.

Referring to FIG. 11, the user interface 470 includes a control panel 471, a display area 472 for displaying multiple-party communication content, and a status bar 490. The control panel 471 includes an "ImageShow" function invocation button 474 for transmitting a message to the server to cause an image 475 to be displayed on the display area 472, a "ClearScreen" function invocation button 476 for transmitting a message to the server to cause the display area to be cleared, a "Save" function invocation button 477 for transmitting a message to cause the server to save presently displayed content, and an "Open" function invocation button 494 for transmitting a message to cause the server to load and transmit messages representing previously saved content. The control panel 471 also includes a "PageBack" function invocation button 478 and "PageForward" function invocation button 480 for transmitting a message to the server for causing messages associated with previous displayed pages to be transmitted to the client computers, a "LinkCreate" function invocation button 495 for transmitting a message to the server identifying a link to a web page or previously saved content on the server, and a "Publish" function invocation button 493 for transmitting a message to the server to cause content to be published. The control panel 471 also includes a "Clipboard" function invocation button 488 for uploading clipboard data to the server and for transmitting a message to the server identifying the upload data, and a "Quit" function invocation button 482 for transmitting a message to the server to cause the client computer to be disconnected when the user of the client computer wishes to leave the multiple-party communication. The control panel 471 further includes a "Game" function invocation button 491 for transmitting as message to the server to cause game piece images to be displayed on the display area 472, as described later herein.

The control panel 471 further includes line formatting controls 484 for selecting a color and width of a line to be drawn on the display area 472, and character formatting controls 486 for selecting a font, color, and size of characters to be displayed on the display area.

In general user interface 470 causes content such as an image 475, a single client computer cursor 496, and a client computer pointer 499 for each client computer in the multiple-party communication, to be displayed in response to messages received from the server 12. In other embodiments, each client computer may display only its own cursor 496 and other client computer pointers 499, in which case the client computer user will not be able to view their own pointer on the display area. When the user interface 470 is displayed on the handheld client computer 18 (shown in FIG. 1) an actual cursor may not be displayed on the display 19 since the tip of the stylus 26 provides a visual indication of the cursor position. In such systems, the stylus 26 acts as the cursor, and although no actual cursor is displayed on the screen, the operating system of such devices receives user input signals in response to movement of the stylus tip in contact with the touch screen display area and produces corresponding interrupt event signals as described above.

The status bar 490 generally display status information associated with the multiple-party communication. In this embodiment the status bar 490 includes a field 492 for displaying the number of client computers that have joined the multiple-party communication, and may include other information such as the duration of the multiple-party communication, communication name etc.

The display area 472 may also have a linked area 497, which links to a file or web page when clicked by the user. In the embodiment shown the link 497 includes an identifier (not shown) identifying a filename of a file on the server hard drive 58 including image data for the Ethna volcano image 475. In other embodiments the link identifier may include a uniform resource locator (URL) identifying image data or an image file elsewhere on the network 20. When the client cursor 496 is moved within the linked area 497, the user interface image display program codes 289 direct the microprocessor 262 to cause the client cursor 496 to change from displaying an arrow to display a hand-shaped cursor 498 (in practice, either the arrow cursor 496 or the hand cursor 498 is visible, not both as shown in FIG. 11 for illustrative purposes only).

In general, the display area 472 may include a plurality of linked areas such as the linked area 497, each linked area having an associated identifier. The coordinates of each linked area 497 and the associated identifier are stored in the store 296 in the RAM 266. In the embodiment shown the linked area 497 comprises a rectangular area of the display area 472 and may be defined by a first pair of X and Y coordinates defining a top left hand corner of the linked area and a second pair of X and Y coordinates defining a bottom right hand corner of the linked area. Alternatively, the linked area 472 may have other geometric shapes having a position and/or shape defined by one or more coordinate pairs.

Message Format

Figure 12:
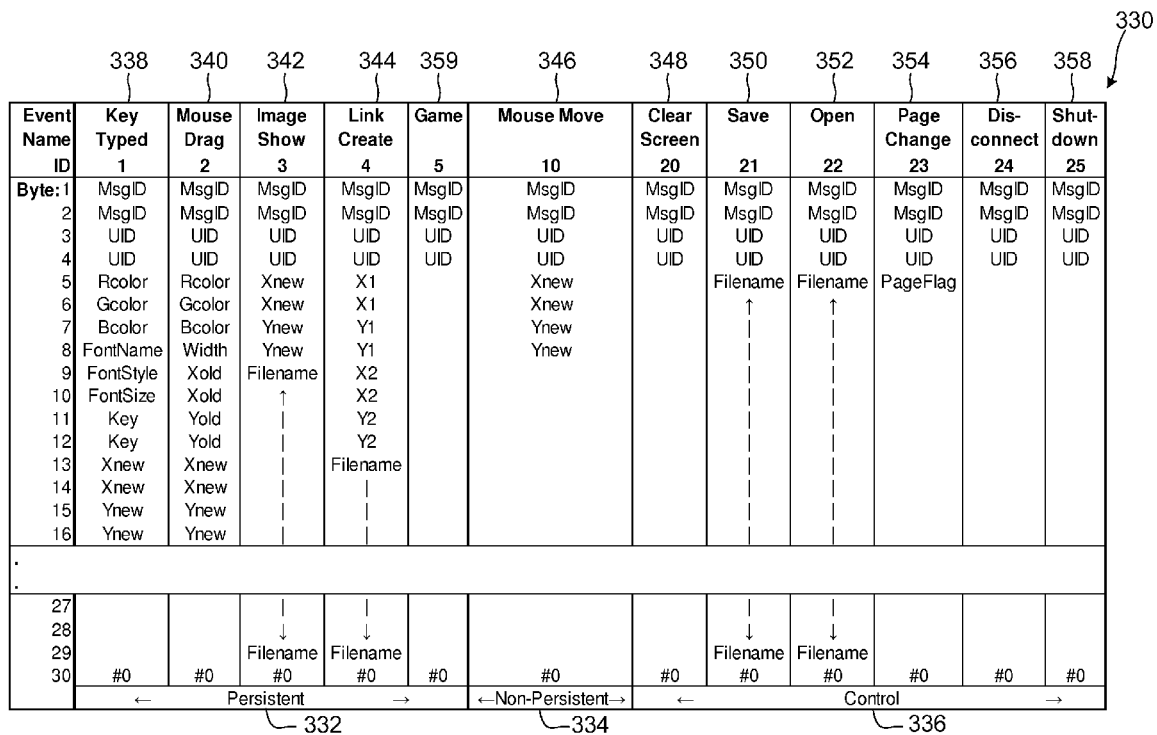
FIG. 12 is a table of message formats used in the system shown in FIG. 1.

Referring to FIG. 12, a table of messages used in the communication system 10 is shown generally at 330. In general, three message types are provided including:

- Persistent messages 332 that produce persistent changes to content on the display area 472;
- Non-persistent messages 334 that do not result in persistent changes to the display area, for example, messages that cause pointers to change position within the display area 472, but do not leave persistent changes on the display area; and
- Control messages 336 that cause a server action to be performed for managing server and/or client activity that also do not cause persistent changes to the content in the display area 472 (except for messages that cause page changes or clearing of the screen).

Each message 330 comprises 30 bytes of information, with the $30^{th}$ byte being the null character, indicating the end of the message. Any unused bytes in the message are padded with zeroes.

Each message 330 includes a message identifier (MsgID) in bytes 1 and 2. In this embodiment message identifiers in the range 1-9 are associated with persistent messages 332, message identifiers in the range 10-19 are associated with non-persistent messages 334, and message identifiers $\geq 20$ are associated with control messages 336. Accordingly, in this embodiment the message identifier also functions as a message type indicator, since the message type may be derived from the message identifier. In other embodiments, the messages 330 may include a separate message type indicator (not shown) indicating a message type associated with each message.

Each message 330 also includes the user identifier (UID) 202 (shown in FIG. 7) in bytes 3 and 4. In other embodiments the messages 330 may be of different byte size, may have variable byte lengths, and/or may comprise an Extensible Markup Language (XML) message format, for example.

Each message 330 represents a particular type of user input and may include addition information, such as coordinate positions, in a message payload. The message identifier field indicates the specific type of user input included in the message payload The persistent messages 332 are generated in response to user input that causes persistent lines to be drawn, characters to be displayed, and/or images to be displayed on the user interface 470.

The persistent messages 332 include a "KeyTyped" message 338 having a message identifier of 1, which represents a user input key (or character). The specific key typed is represented by a numeric value held in bytes 11 and 12. The "KeyTyped" message 338 also includes X and Y coordinates (Xnew, Ynew) held in bytes 13-16 of the message, color display information associated with the character held in the bytes 5-7, a font identifier, style identifier, and a size identifier held in bytes 8-10.

The persistent messages 332 also include a "MouseDrag" message 340 having a message identifier of 2, which represents a line drawn on the display area 472 of the user interface 470. The "MouseDrag" message 340 includes starting X and Y coordinates (Xold, Yold) and ending X and Y coordinates (Xnew, Ynew) held in bytes 9-16 of the message. Color information associated with the line is held in the bytes 5-7, and a width of the line is held in byte 8.

The persistent messages 332 also include an "ImageShow" message 342 having a message identifier of 3, which represents an image location (such as the image 475 shown in FIG. 11) posted by the user on the client computer display area 472 of the user interface 470. The "ImageShow" message 342 also includes X and Y coordinates (Xnew, Ynew) held in bytes 5-8 and an image filename held in bytes 9-29.

The persistent messages 332 also include a "LinkCreate" message 344 having a message identifier of 4, which represents a link created by the user on the client computer display area 472 of the user interface 470 (such as the linked area 497 shown in FIG. 11). The "LinkCreate" message 344 also includes X and Y coordinates (X1, Y1) and (X2, Y2) held in bytes 5-12 and a filename or internet address held in bytes 13-29.

The persistent messages 332 also include a "Game" message 359 having a message identifier of 5, which represents a request by a user of the client computer to display game piece images on the display area 472 of the user interface 470.

In this embodiment the non-persistent messages 334 include only a "MouseMove" message 346 having a message identifier of 10, which represents a mouse movement made by the user that causes the cursor to move without drawing a line on the display area 472. The "MouseMove" message 346 includes ending X and Y coordinates (Xnew, Ynew) held in bytes 5-8. Other embodiments may include further non-persistent messages.

The "MouseMove" message 346 and the "MouseDrag" message 340 represent a change in position of a cursor associated with the display area 472 of the client computer, and when transmitted to the server 12 these messages may be referred to as cursor messages.

The control messages generally cause functions to be performed by the server 12, but generally do not produce new content on the display area 472. The control messages 336 include a "ClearScreen" message 348 having a message identifier of 20, which represents a command to clear a page displayed on the display area 472.

The control messages 336 also include a "Save" message 350 having a message identifier of 21, which represents a request by a client computer user to save content currently displayed on the display area 472 to the client saved content store 100 in the server hard drive 58 (shown in FIG. 2). The "Save" message 350 includes a filename, which is held in bytes 5-29 of the message.

The control messages 336 also include an "Open" message 352 having a message identifier of 22, which represents a request by a user to load content saved in the client saved content store 100 in the server hard drive 58. The "Open" message 352 includes a filename, which is held in bytes 5-29 of the message.

The control messages 336 also include a "PageChange" message 354 having a message identifier of 23, which represents a request by a user to change the current displayed page to a page stored in the communication page store 104. In general the communication page store 104 may store several pages of content and accordingly the "PageChange" message 354 includes a "PageFlag" value held in byte 5 of the message for instructing the server 12 to display a previous page (when the "PageFlag" value is "0"), or to display the next page (when the "PageFlag" is "1").

The control messages 336 also include a "Disconnect" message 356 having a message identifier of 24, which represents a request of the user to disconnect from the multiple-party communication, while the multiple-party communication continues.

The control messages 336 also include a "ShutDown" message 358 having a message identifier of 25, which represents a request by the user to discontinue the multiple-party communication.

Message Sender Process—Client Computer

In general, the message sender process codes stored in the store 286 of the program memory (shown in FIG. 9) direct the microprocessor 262 to produce the persistent messages 332, the non-persistent messages 334, and the control messages 336, in response to user input signals, function button invocations, and combinations thereof.

Figure 13A:
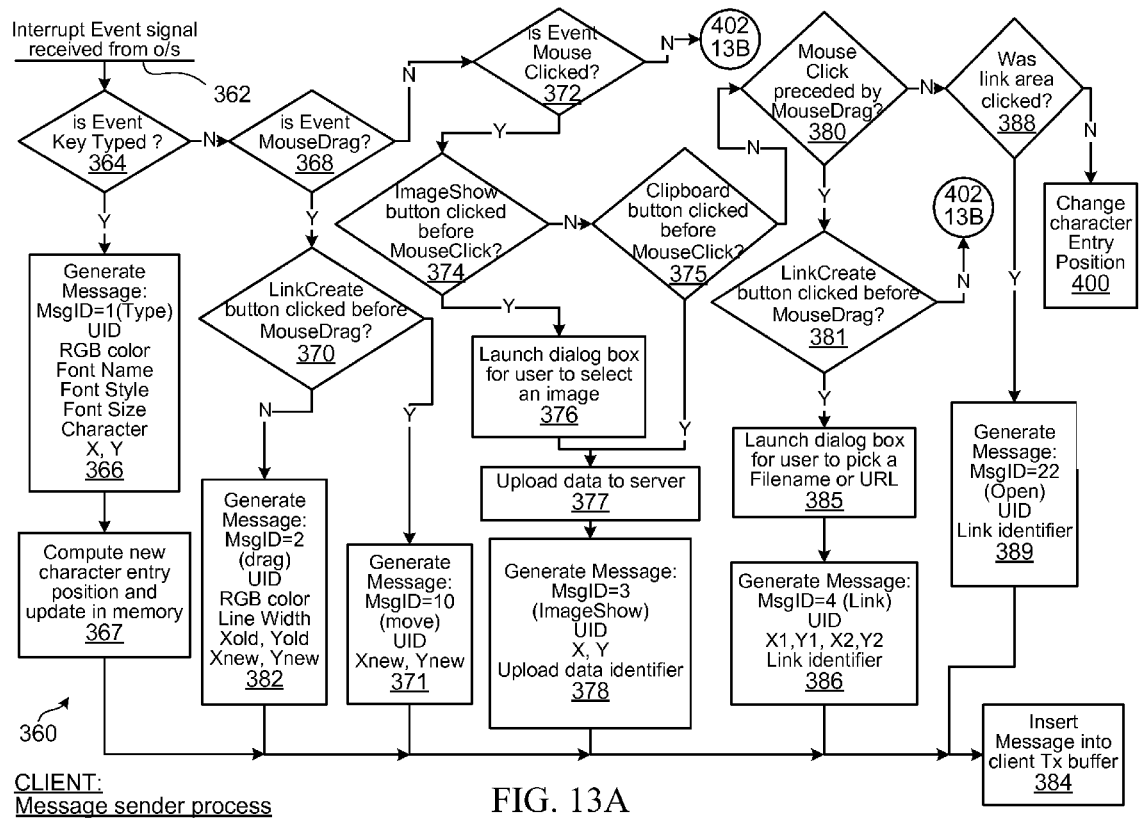
FIGS. 13A-13C are respective portions of a flowchart representing blocks of codes for directing the client computer processor circuit shown in FIG. 9 to produce messages for transmission to the server processor circuit shown in FIG. 2.
Figure 13B:
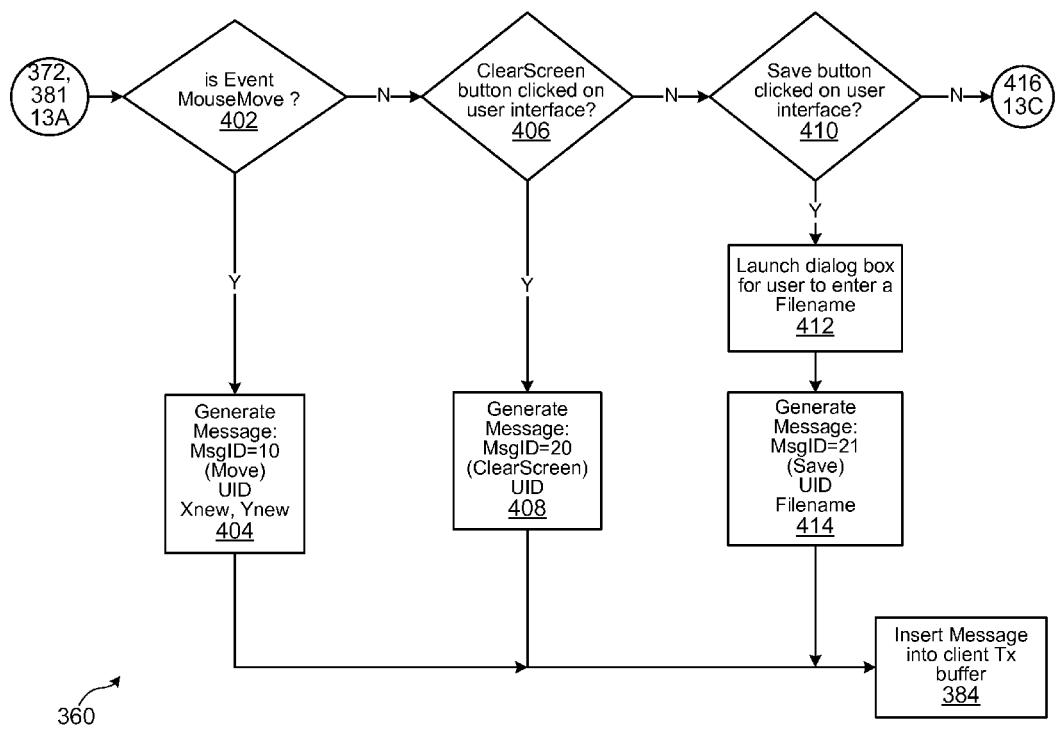
Figure 13C:
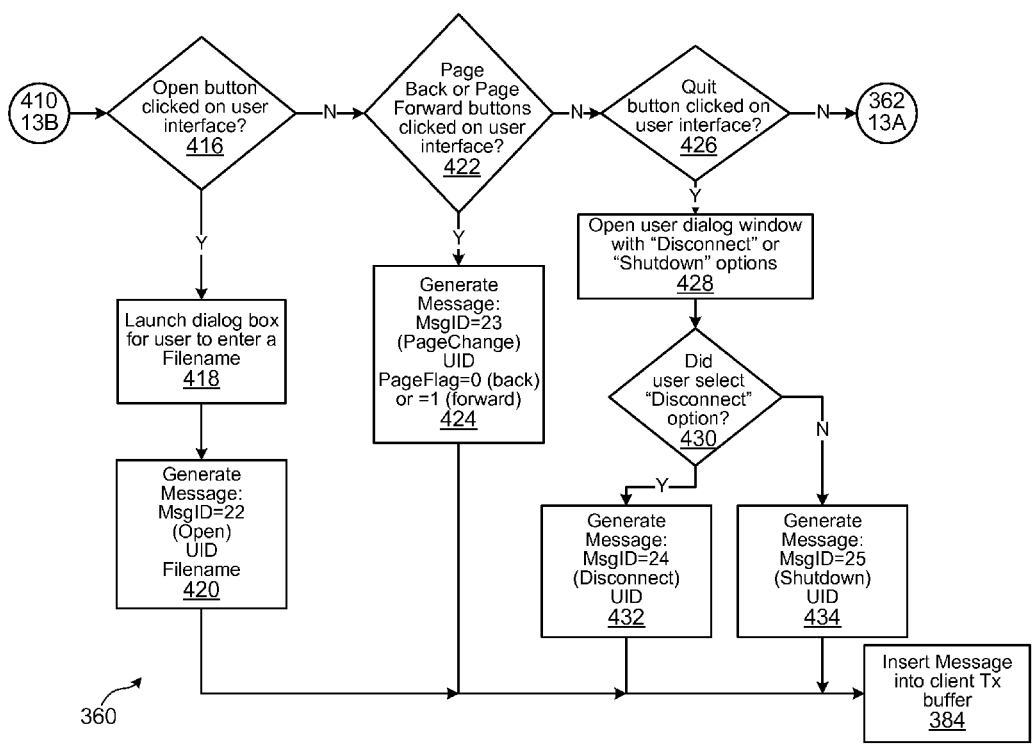

Referring to FIG. 13A to FIG. 13C, a flowchart of blocks of code for directing the client computer processor circuit 260 (shown in FIG. 9) to generate the messages is shown generally at 360.

Referring to FIG. 13A, the process begins at 362 when an interrupt event signal produced by the operating system is received by the interrupt handler 288.

Block 364 directs the microprocessor 262 to determine whether the interrupt event signal corresponds to a "keyTyped" event 328 (shown in FIG. 10), in which case the process continues at block 366, which directs the microprocessor to generate the "KeyTyped" message 338 with a message identifier value of 1, a "UID" 202 corresponding to the user identifier of the client computer from the client table entry 200 (shown in FIG. 7), and color and font values corresponding to a color and font currently selected by the user in the character formatting controls 486 on the user interface. Block 366 also directs the microprocessor to read the X and Y coordinates of the character entry position from the character entry position store 294 in the RAM 266 and to place values of these coordinates in the "KeyTyped" message 338.

In this embodiment when a character is entered by the user, the character is not displayed on the screen until the message is received back from the server, as described later herein. Furthermore, each message includes information identifying only a single typed character. In other embodiments the message may represent more than one character.

The process then continues at block 367, which directs the microprocessor 262 to compute a new character entry position for the next character that will be typed by the user of the client computer. In this embodiment, subsequent characters are assigned X and Y coordinates read from the character entry position store 294, and after each successive character is typed, the X coordinate is incremented (or decremented for in some alphabets) such that the next character typed will be displayed in an appropriate spaced apart relation to the previous character typed. Successive typed characters thus appear in a horizontal line and have the same Y coordinate.

When the user types a character corresponding to an "Enter" or new line control character, then the Y coordinate is incremented (assuming that the display area 472 has an origin at the top left hand corner) such that the next character typed will be displayed on a new line below the previous character or characters in an appropriate spaced apart relation. The X coordinate is also decremented (or incremented in some alphabets) to cause the character entry position to align horizontally with the first character in the previous line. In this embodiment, the X coordinate of the first character in a line is saved in the character entry position store 294 and thus when an "Enter" or new line control character is typed the character entry position X coordinate is set to the X coordinate of the first character in the previous line and the Y coordinate is computed as described above.

Block 367 also directs the microprocessor 262 to update the character entry position stored in the store 294 in accordance with the new computed character entry position.

The process then continues at block 384, which directs the microprocessor 262 to write the message 338 into the client side Tx buffer 292.

If at block 364 the interrupt event signal does not correspond to a "keyTyped" event, then the process continues at block 368. Block 368 directs the microprocessor 262 to determine whether the interrupt event signal corresponds to a "mouseDragged" event 324, in which case the process continues at block 370. Block 370 directs the microprocessor 262 to determine whether the "LinkCreate" function invocation button 495 (shown in FIG. 11) was clicked before the mouse was dragged. If the "LinkCreate" button 495 was clicked, then the process continues at block 371. Block 371 directs the microprocessor 262 to generate the "MouseMove" message 346 with a message identifier value of 10, a "UID" corresponding to the user identifier for the client computer, and X and Y coordinates corresponding to the new cursor location on the display area 472. The process then continues at block 384, which directs the microprocessor 262 to write the message 346 into the client side Tx buffer 292.

If at block 370, the "LinkCreate" function invocation button 495 was not clicked before the mouse was dragged then the process continues at block 382. Block 382 directs the microprocessor to generate the "MouseDrag" message 340 with a message identifier value of 2, a "UID" corresponding to the user identifier for the client computer, and color and width values corresponding to a color and width currently selected in the line formatting controls 484. Block 382 also directs the microprocessor to query the operating system to retrieve starting X and Y coordinates and ending X and Y coordinates corresponding to the cursor motion to place these values in the appropriate bytes of the payload of the message 340. The process then continues at block 384, which directs the microprocessor 262 to write the message 340 into the client side Tx buffer 292.

If at block 368 the interrupt event signal does not correspond to the "mouseDragged" event 324, then the process continues at block 372. Block 372 directs the microprocessor 262 to determine whether the event corresponds to a "mouseClicked" event 322, in which case the process continues at block 374. Block 374 directs the microprocessor 262 to determine whether the "ImageShow" function invocation button 474 (shown in FIG. 11) was clicked before the mouse click was produced. If the "ImageShow" function invocation button 474 was clicked, then the process continues at block 376, which directs the microprocessor to launch a dialog window (not shown) for the user to pick an image to be displayed on the display area 472. The image may be represented by data stored in the persistent data store 310 or the RAM 266 of the processor circuit 260, or the image data may be stored in a location elsewhere on the network 20.

The process then continues at block 377, which directs the microprocessor 262 to upload the image data to the server processor circuit 50. The uploading of the image data may be performed in accordance with a conventional file upload protocol such as file transfer protocol (FTP). Alternatively block 377 may direct the microprocessor 262 to initiate a HTTP POST request for uploading the image data to the server using HTTP protocol, for example. The upload data also includes an associated upload data identifier, such as a filename. Alternatively, block 377 may further direct the microprocessor 262 to generate a unique upload data identifier, for example by combining the client computer UID with a time and date generated by the operating system.

If at block 374 the "ImageShow" function invocation button 474 was not clicked before the mouse click was produced, then the process continues at block 375. Block 375 directs the microprocessor 262 to determine whether the "Clipboard" function invocation button 488 was clicked before the mouse click was produced. If the "Clipboard" button 488 was clicked, then the process continues at block 377 as described above, except that in this case the microprocessor 262 is directed to upload the clipboard data to the server.

Block 378 then directs the microprocessor 262 to generate the "ImageShow" message 342 with a message identifier value of 3, a "UID" corresponding to the user identifier for the client computer, and a upload data identifier corresponding to the upload data identifier associated with the upload data, that was transmitted to the server 12 at block 377. Block 378 also directs the microprocessor 262 to retrieve the X and Y coordinates of the display location where the mouse actuator button was actuated in block 372, which defines the position of the top left hand corner of the image (such as the image 475 shown in FIG. 11). Block 378 further directs the microprocessor 262 to place these values in the appropriate bytes of the "ImageShow" message 342. The process then continues at block 384, which directs the microprocessor 262 to write the message 342 into the client side Tx buffer 292. In other embodiments the information in the "ImageShow" message may be uploaded at block 377, in which case block 378 may be omitted.

Advantageously the upload data may be screenshot image data of a desktop area of the client computer. For example, screenshots may be conveniently produced when using the Microsoft Windows operating system by pressing a "Print Screen" key on the keyboard to copy the entire desktop to clipboard memory, or by pressing "Alt" and "Print Screen" keys to copy the content of an active window to the clipboard memory. Screenshot data is generally in some image data format (for example a bitmap) and may be uploaded directly to the server from the clipboard or converted into a different image format by an image conversion function (not shown).

Alternatively, the data in the clipboard memory may be formatted data copied from a program window (for example Microsoft® Office Word or Excel). Formatted data may include formats, such as Excel spreadsheet formats for example, and such data is generally not suitable for display as an image. Accordingly, when a user of one of the client computers 14, 16, or 18 wishes to upload formatted data, the data may require conversion into a format suitable for display as an image.

Such data conversions are generally performed by conversion functions that are configured to convert particular types of formatted data into image data. In this embodiment the conversion is performed by the server 12 after the data has been uploaded from the client computer to the server. Alternatively, the data conversion may be performed by the client computer prior to uploading at block 377. In another alternative the formatted data may be uploaded to the sever 12 and stored on the server without conversion, and the data conversion may be performed on each of the client computers after the formatted data is downloaded for display on the respective display areas 472.

Whether the data conversion occurs on the client computers or the server, the conversion generally involves determining a formatted data type by reading clipboard parameters associated with the data in the clipboard memory. An appropriate conversion function is then selected from a plurality of conversion functions available and the formatted data is converted into an image format suitable for display in the user interface 470. Advantageously, when the data conversion is performed on the server 12, only the server need be configured to perform such data conversions. In other embodiments where it is desired to offload the data conversion load from the server, conversion functions may be included in the user interface 282 program codes, and launched when performing an upload of formatted data to the server 12 or when downloading formatted data from the server.

Advantageously, the clipboard function invocation facilitates sharing content produced by other software applications during the multiple-party communication. All client computers will display the resulting image and will be able to draw lines and type characters over the image.

If at block 375 the "Clipboard" function invocation button 488 was not clicked before the mouse click was produced, then the process continues at block 380. Block 380 directs the microprocessor 262 to determine whether the "mouseClicked" event (at block 372) was immediately preceded by a "mouseDragged" event 324, in which case the process continues at block 381. Block 381 directs the microprocessor 262 to determine whether the "LinkCreate" function invocation button 495 (shown in FIG. 11) was clicked before the mouse was dragged. If at block 381 the "LinkCreate" button 495 was clicked, then the process continues at block 385. Block 385 directs the microprocessor 262 to launch a dialog box for a user to enter a link identifier to be associated with a linked area 497. For example, the link identifier may include a filename identifying a location and name of a client saved content in the client saved content store 100 on the server hard drive 58 (shown in FIG. 2). Alternatively, the link identifier may be a Uniform Resource Locator (URL) of another web site (for example www.google.com).

The process then continues at block 386, which directs the microprocessor 262 to generate the "LinkCreate" message 344 with a message identifier value of 4, a "UID" corresponding to the user identifier for the client computer, and the link identifier provided by the client computer user. Block 386 also directs the microprocessor 262 to query the operating system to retrieve starting X and Y coordinates corresponding to starting coordinates of the mouse drag, and ending X and Y coordinates corresponding to the ending coordinates of the mouse drag. Block 386 further directs the microprocessor 262 to write the retrieved coordinate values to appropriate bytes of the message 346. The starting X and Y coordinates and ending X and Y coordinates define the linked area 497 on the display area 472 shown in FIG. 11. The process then continues at block 384, which directs the microprocessor 262 to write the message 344 into the client side Tx buffer 292.

If at block 380 the event does not correspond to a "mouseDragged" event 324 then the process continues at block 388. When a "mouseClicked" interrupt event signal has been generated by the operating system at block 372, block 388 directs the microprocessor 262 to determine whether the mouse click was within one of the linked areas 497 defined by information stored in the store 296 of the RAM 266 (shown in FIG. 9). If the click was in a linked area 497 then the process continues at block 389, which directs the microprocessor 262 to generate the "Open" message 352 with a message identifier value of 22, a "UID" corresponding to the user identifier for the client computer, and a link identifier corresponding to a filename or internet address associated with the linked area 497. The process then continues at block 384, which directs the microprocessor 262 to write the message 352 into the client side Tx buffer 292.

If at block 388, a linked area was not clicked the process continues at block 400, which directs the microprocessor 262 to save a coordinate position at which the display area 472 was clicked to the character entry position store 294 in the RAM 266, thus changing the coordinates for the character entry position for the next character that is entered by the user.

The character entry position stored in the store 294 is initially set to a default position for character entry, such as location (10, 10) on the display area 472, for example (i.e. 10 pixels down and 10 pixels to the right from the top left hand corner of the display area 472). When the user of the client computer subsequently clicks on the display area 472 without first pressing the "ImageShow", "Clipboard", or "LinkCreate" function invocation buttons 474, 488, or 495 respectively, then the coordinates where the user clicked are saved in the character entry position store 294 and used as the next character entry position, when the user of the client computer types a character.

Advantageously the character entry position is implemented as a "sticky" position, which causes user input characters to be displayed on the display area 472 at the last character entry position saved in the store 294, or the default position if the user has not set a previous character entry position by clicking on the display area 472 without clicking first on the "ImageShow", "Clipboard", or "LinkCreate" function invocation buttons 474, 488, or 495 respectively.

If at block 372 the event does not correspond to a Mouse-Clicked event, or at block 381 the "LinkCreate" function invocation button was not clicked before the mouse was dragged, then the process continues at block 402 on FIG. 13B.

Referring to FIG. 13B, block 402 directs the microprocessor 262 to determine whether the interrupt event signal corresponds to a "mouseMoved" event 326 (shown in FIG. 10), in which case the process continues at block 404. Block 404 directs the microprocessor 262 to generate the "MouseMove" message 346 with a message identifier value of 10, a "UID" corresponding to the user identifier for the client computer, and X and Y coordinates corresponding to the new cursor location on the display area 472. The process then continues at block 384, which directs the microprocessor 262 to write the message 346 into the client side Tx buffer 292.

The client computer user's pointing device movements may be represented in real time by a cursor displayed by the operating system on the client computer display area 472 or by a stylus tip on a touch screen display area. Advantageously, the "MouseMove" message 346 facilitates transmitting the client computer user's pointing device movements to other client computers, which facilitates display of pointers corresponding to each of a plurality of client computers on the respective display areas 472 of the other client computers who have joined the multiple-party communication. The client computer that generates the "MouseMove" message 346 also receives a copy of the message back from the server, which facilitates display of a local pointer in addition to any cursor that may be displayed by the operating system. Advantageously, display of a cursor and a local pointer permits the client computer user to view the effect of their pointer movements, since while the cursor responds to pointing device movements in near real-time, the pointer only moves once the message representing the movement is received back from the server.

Accordingly, when the pointing device is moved, the pointer generally trails the cursor, providing a useful view of a network latency associated with a round trip from one of the client computers 14, 16, or 18 to the server 12 and back again to the client computer. When the pointing device is not moving, the cursor and the pointer will generally be displayed in the same location on the display area 472. For touch screen displays where a cursor is not displayed, the stylus tip acts as a cursor and the pointer trails the stylus tip, thus providing a similar view of network latency for the user.

If at block 402 the event does not correspond to a "mouse-Moved" interrupt event signal then the process continues at block 406. Block 406 directs the microprocessor 262 to determine whether the user has clicked the "ClearScreen" button 476. If the "ClearScreen" button 476 has been clicked, then block 408 directs the microprocessor 262 to generate the "ClearScreen" message 348 with a message identifier value of 20 and a "UID" corresponding to the user identifier for the client computer. The process then continues at block 384, which directs the microprocessor 262 to write the message 348 into the client side Tx buffer 292.

If at block 406 the "ClearScreen" button 476 has not been clicked then the process continues at block 410. Block 410 directs the microprocessor 262 to determine whether the "Save" button 477 has been clicked, in which case the process continues at block 412. Block 412 directs the microprocessor 262 to launch a dialog box for receiving user input of a filename. Block 414 then directs the microprocessor 262 to generate the "Save" message 350 with a message identifier value of 21, a "UID" corresponding to the user identifier for the client computer, and a filename corresponding to the filename input by the user. The process then continues at block 384, which directs the microprocessor 262 to write the message 350 into the client side Tx buffer 292.

If at block 410 the "Save" button 477 has not been clicked then the process continues at block 416 on FIG. 13C. Referring to FIG. 13C, block 416 directs the microprocessor 262 to determine whether the user has clicked the "Open" button 494. If the "Open" button 494 has been clicked, then block 418 directs the microprocessor 262 to launch a dialog box for receiving user input of a filename. Block 420 then directs the microprocessor to generate the "Open" message 352 with a message identifier value of 22 and a "UID" corresponding to the user identifier for the client computer. The process then continues at block 384, which directs the microprocessor 262 to write the message 352 into the client side Tx buffer 292.

If at block 416 the "Open" button 494 has not been clicked, then the process continues at block 422. Block 422 directs the microprocessor 262 to determine whether either of the "Page-Back" or "PageForward" buttons 478 or 480 has been clicked, in which case the process continues at block 424. Block 424 directs the microprocessor 262 generate the "PageChange" message 354 with a message identifier value of 23, a "UID" corresponding to the user identifier for the client computer, and a "PageFlag" value of "0" where the "PageBack" button was clicked or "1" where the "PageForward" button was clicked. The process then continues at block 384, which directs the microprocessor 262 to write the message 354 into the client side Tx buffer 292.

If at block 422 the "PageBack" button 478 or the "Page-Forward" button 480 have not been clicked then the process continues at block 426. Block 426 directs the microprocessor 262 to determine whether the "Quit" button 482 has been clicked, in which case the process continues at block 428. Block 428 directs the microprocessor 262 to open a dialog window (for example a checkbox dialog form—not shown) to present the user with an option of disconnecting the client while keeping the multiple-party communication running or shutting down the multiple-party communication.

The process then continues at block 430, which directs the microprocessor 262 to determine whether the user has chosen to disconnect, in which case block 432 directs the microprocessor 262 to generate the "Disconnect" message 356 with a message identifier value of 24 and a "UID" corresponding to the user identifier for the client computer. The process then continues at block 384, which directs the microprocessor 262 to write the message 356 into the client side Tx buffer 292.

If at block 430 the user has chosen to shut down the meeting, then the process continues at block 434, which directs the microprocessor 262 to generate the "ShutDown" message 358 with a message identifier value of 25 and a "UID" corresponding to the user identifier for the client computer. As will be described later herein, the request to shut down the communication is only accepted by the server 12 if the user is the last client computer in the communication. The process then continues at block 384, which directs the microprocessor 262 to write the message 358 into the client side Tx buffer 292.

If at block 426 the "Quit" button 482 on the user interface has not been clicked, then the process continues at block 362 on FIG. 13A, which directs the microprocessor 262 to wait for the next interrupt (i.e. the event is ignored).

From the above description, it will be appreciated that when the client computer receives user input signals and/or function invocation signals representing a function invocation at the client computer, the client computer produces a message having a message type associated with one of a plurality of pre-defined combinations of the user input signals and function invocation signals and transmits the message to the server 12. The process 360 shown in FIGS. 13A-13C thus represents a pre-association of certain combinations and/or sequences of user input signals and function invocations that produce messages having one of the persistent, non-persistent and control message type. Other user input signals and combinations such as mouse click events outside the user interface, are ignored by the message sender process.

Message Transmission to the Server

Figure 14:
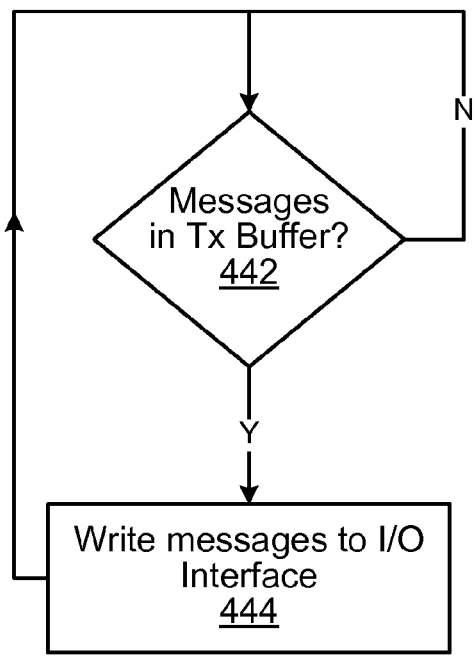
FIG. 14 is a flowchart representing blocks of codes for directing the processor circuit shown in FIG. 9 to transmit the messages to the server processor circuit shown in FIG. 2.

Referring to FIG. 14, a flowchart of blocks of code for directing the processor circuit 262 (shown in FIG. 9) to transmit the messages stored in the client side Tx buffer 292 is shown generally at 440.

In general messages may be transmitted in accordance with any message transmission protocol, such as TCP/IP, user datagram protocol (UDP), or XML, for example.

The process begins at block 442, which directs the microprocessor 262 to determine whether there are any messages in the client side Tx buffer 292, in which case block 444 directs the microprocessor 262 to read the next message in the Tx buffer on a first-in-first-out (FIFO) basis and to write the message to the interface 272. The interface 272 then produces a data signal representing the message at the input/output 274, which is transmitted to the server 12 through the network 20. The process 440 then returns to block 442, repeating blocks 442 and 444 until all messages in the client side Tx buffer are transmitted.

If at block 442, there are no messages in the client side Tx buffer 292, then the microprocessor 262 is directed back to block 442, which again determines whether any messages have been written into the client side Tx buffer 292.

Server Receive Process

Figure 15A:
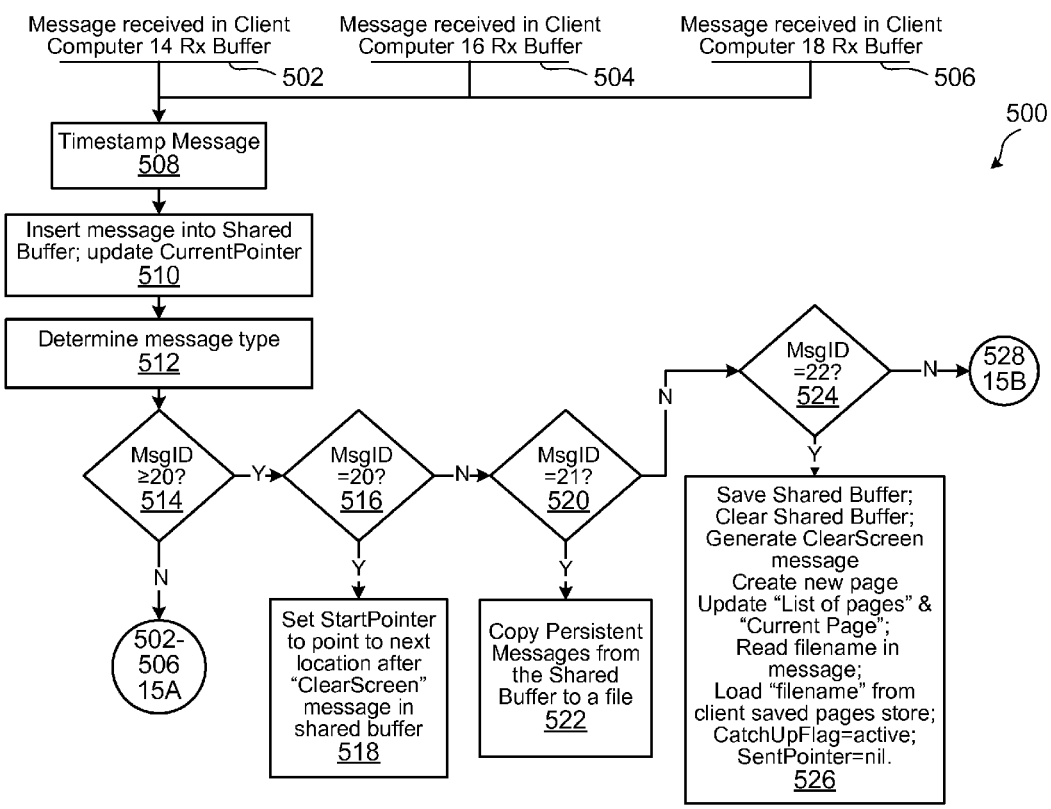
FIGS. 15A-15B are respective portions of a flowchart representing blocks of codes for directing the processor circuit shown in FIG. 2 to receive messages from the client computer processor circuit shown in FIG. 9.
Figure 15B:
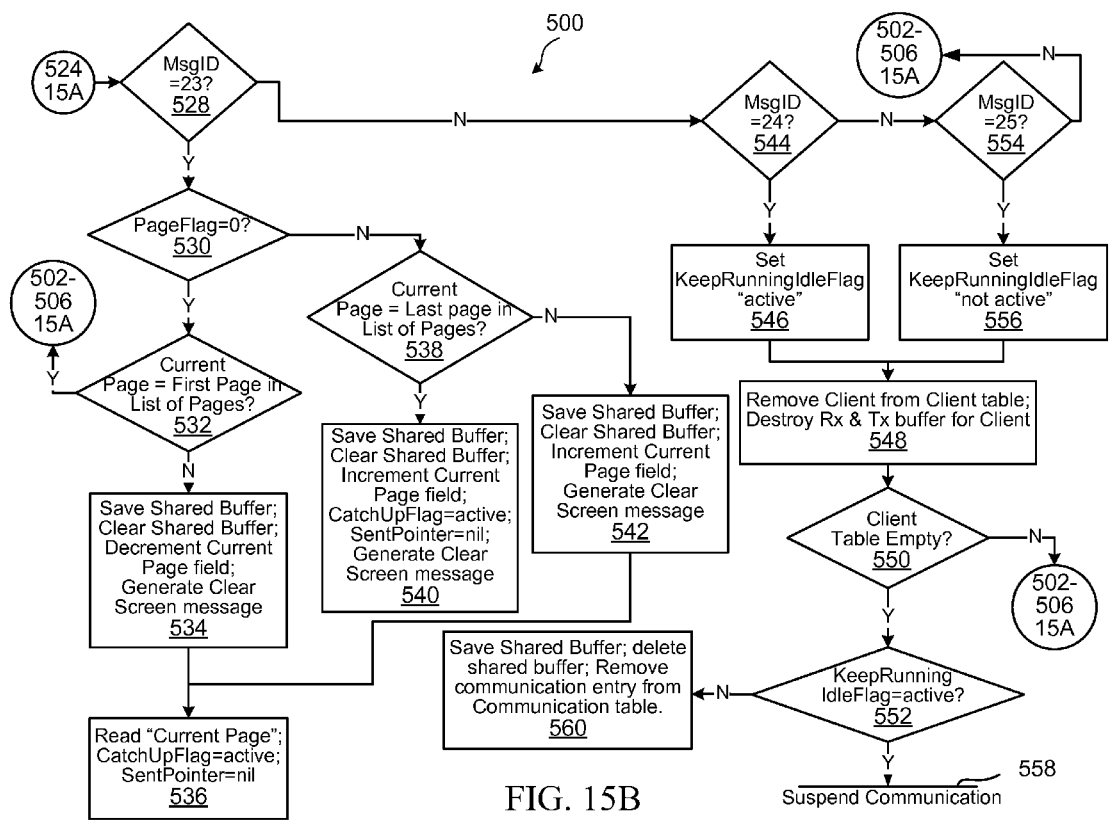

A flowchart of blocks of code for directing the processor circuit 50 (shown in FIG. 2) to receive input messages from each of the client computers 14,16 and 18 is shown in FIG. 15A and 15B generally at 500.

In general, client manager threads are executed for each of the client computers 14,16, and 18 to separately receive input messages in the respective server side Rx buffers for the client computers. Referring to FIG. 15A, the process begins at blocks 502, 504 and 506, which direct the microprocessor 52 wait for input messages to be received from any of the client computers 14, 16, and 18 at any of the server side Rx buffers 92 in the RAM 56.

The process then continues at block 508 when an input message is received at 502, 504, or 506. Block 508 then directs the microprocessor 52 append a timestamp to the input message (after byte 30, shown in FIG. 12).

Block 510 then directs the microprocessor 52 to produce an output message by inserting the message in the shared buffer 88 (shown in FIG. 3) at a next message store 120 after the message store referenced by the "CurrentPointer" 124. Block 510 further directs the microprocessor 52 to update the "CurrentPointer" 124 to reference the message store 120 in the shared buffer to which the output message was written, such that the "CurrentPointer" always points to the last message written to the shared buffer 88.

In this embodiment, the output messages are produced by copying the input message into the shared buffer. In other embodiments, output messages having different message identifiers or differing format to the input messages may be produced, as described above.

In this embodiment the input messages each represent one user input combination (for example a mouse drag or a character typed) and the output messages produced represent the same user input combination. However, in other embodiments, the input messages may represent several user input combinations and the output message produced by the server may represent the same user input combinations, or may combine user input combinations in a plurality of input messages into a singe output message.

Block 512 then directs the microprocessor 52 to determine the message type associated with the input message, by reading the message identifier. In this embodiment, since the output message is a copy of the corresponding input message the message type may be determined by reading the message identifier in either the input message or the output message.

The process then continues at block 514, which directs the microprocessor 52 to determine whether the message is a control type message (i.e. the message identifier $\geq 20$). If the message is not a control type message then it is either a persistent or non-persistent message type and the microprocessor 52 is directed back to 502, 504, and 506 to wait for the next message to be received in the respective Rx buffers.

In general, input messages of the persistent message type and the non-persistent message type do not require further processing by the server 12. For example, in this embodiment cursor messages received at the server representing "MouseDrag" and "MouseMove" user input signals are copied into the shared buffer 88 as pointer messages, which do not require execution of server functions other than transmitting to the client computers.

If at block 514 the message identifier is greater than or equal to 20, then the message is a control message which directs the server to execute a server function. The process then continues at block 516, which directs the microprocessor 52 to determine whether the message identifier is 20, which corresponds to the "ClearScreen" message (Shown in FIG. 12 at 348). If the message identifier is 20, then the process continues at block 518, which directs the microprocessor 52 to set the "StartPointer" 122 (shown in FIG. 3) to refer to a memory store 120 in the shared buffer 88 after the location at which the "ClearScreen" message was inserted.

Advantageously, by changing the "StartPointer" 122 to refer to the location after the "ClearScreen" message, client computers joining the multiple-party communication only receive messages subsequent to the last "ClearScreen" message, thus avoiding displaying a plurality of persistent messages in quick succession followed by a "ClearScreen" message, which may clear the screen before the user has had time to view the content on the display area 472.

Alternatively in other embodiments, the "StartPointer" 122, the "CurrentPointer" 124 and the "Client SentPointers" 126 may be set to nil, as they were when communication just started. This will have the effect of overwriting all messages in the shared buffer 88. Accordingly, in this alternative embodiment, the shared buffer 88 may be saved to persistent memory prior to overwriting any previous messages.

If at block 516 the message identifier is not 20, then the process continues at block 520, which directs the microprocessor 52 to determine whether the message identifier is 21, which corresponds to the "Save" message (Shown in FIG. 12 at 350). If the message identifier is 21, then the process continues at block 522, which directs the microprocessor 52 to copy all persistent messages (i.e. the messages having a message identifier <10) from the shared buffer 88 to the client saved content store 100 on the server hard drive 58. In this embodiment, only the persistent type messages are saved to the hard drive in response to the client save message. Client saved content may be saved in a server page storage format, described later herein.

If at block 520 the message identifier is not 21, then the process continues at block 524, which directs the microprocessor 52 to determine whether the message identifier is 22, which corresponds to the "Open" message (Shown in FIG. 12 at 352). If the message identifier is 22, then the process continues at block 526, which directs the microprocessor 52 to save the shared buffer 88 in the communication page store 104 of the server hard drive 58 and then to clear the shared buffer by setting both the "StartPointer" 122 and the "CurentPointer" 124 to nil, which has the effect of causing further messages to overwrite previously saved messages in the shared buffer 88.

Server Page Storage Format

In general, when one of the client computers transmits a control message such as the "ClearScreen", "Open", "PageChange", "Disconnect" or "Shutdown" control messages, messages in the shared buffer 88 representing content displayed on the display area 472 are written to the server hard drive 58 as pages under control of the page manager, which is instantiated by launching the program codes 74 in the sever processor circuit 50 shown in FIG. 2, as described earlier herein. The page manager handles paging requests by causing messages to be saved on and/or read from the communication page store 104 on the server hard drive 58, without the client computer users having to enter any filenames. In order to maintain a complete record of the multiple-party communication, all persistent, non-persistent and control messages are saved by the page manager when a page change request is received from one of the client computers.

A page thus generally includes a plurality of messages that define content on the display area (and which may be retransmitted to re-create the content, if desired).

In this embodiment, the communication page store 104 includes a dedicated sub-directory created in a directory structure that saves communication pages by date and time. For example, for a communication having a communication name "MyTravel" the communication pages are saved in a sub-directory "\2007-03-23\15-39-10My Travel\". Within the "MyTravel" directory each page has a corresponding sub-directory (for example "\2007-03-23\15-39-10\My Travel\Page1\ and/or "\2007-03-23\15-39-10\My Travel\Page2\").

For example, if the current page is Page 2, and a control message is received that will result in a new page being displayed (by an "Open", "PageChange" or "Quit" message, for example) messages are saved to the "\2007-03-23\15-39-10\My Travel\Page2\" sub-directory.

If during the communication Page 2 is again displayed, and content added to the page, then the original page is saved to a file in the "Page 2" subdirectory under a filename "Page 2-1", or "Page 2-2". Alternatively, in some communications memory allocated to the shared buffer 88 may be limited, and when the sheared buffer is overwritten, content is first written to a Page file such as "Page 2-3", for example.

Thus, in this case, the directory "\2007-03-23\15-39-10\My Travel\Page2\ will include files Page 2-1, Page 2-2, and Page 3-3.

Each of the files (e.g. Page 2-1, Page 2-2, and Page 3-3) includes one or more messages separated by the zero terminator (#0 or byte 30 of the messages shown in FIG. 12). Each file further includes a header including identifier information such as, when the file was created, the number of clients in the communication, the communication name & password, and other parameters associated with the communication. For example the file may include the following header in a text format:

```
FileCreated=14-34-23
NumberOfUsers=5
CommunicationName=My Travel
Password=travel
#0
<messages>
```

The "#0" zero terminator is followed by a plurality of messages, each being separated from the next message by the zero terminator.

Still referring to FIG. 15A, block 526 further directs the microprocessor 52 to generate a clear screen message (message 348 shown in FIG. 8) and to load the message into the shared buffer 88 for transmission to the client computers 14, 16 and 18. The clear screen message 348 causes content associated with messages previously transmitted to the respective client computers 14, 16, and 18 to be cleared, when the message is received at the respective client computers. Block 526 also directs the microprocessor 52 to read the number of pages from the "List of Pages" field 194 (shown in FIG. 6) and to set the "Current Page" field 196 to a next number in sequence, to update the "List of Pages" field 194, thus creating new page on the server as described above.

Block 526 further directs the microprocessor 52 to read the filename in the message and to load messages saved under the filename from the client saved content store 100 into the shared buffer 88, to set the "StartPointer" 122 to reference the first loaded message. As the shared buffer 88 is loaded with subsequent messages read from the page file, the "CurrentPointer" 124 is incremented to reference the last loaded message store 120. Block 526 also directs the microprocessor 52 to set the "CatchUpFlag" to active and the SentPointer to nil, so that all client computers catch up with the newly opened page.

If at block 524, the message identifier is not 22, then the process continues at block 528 on FIG. 15B. Referring to FIG. 15B, block 528 directs the microprocessor 52 to determine whether the message identifier is 23, in which case the control message is a "PageChange" Message (shown in FIG. 12 at 354). If the message is a "PageChange" message, then the process continues at block 530, which directs the microprocessor 52 to read the "PageFlag" in the message. If the "PageFlag" is "0" then the process continues at block 532, which directs the microprocessor 52 to determine whether the current displayed page (identified by the current page field 196 shown in FIG. 6) is the first page in the "List of Pages" field 194 in the communication table entry 180 (shown in FIG. 6). If the current displayed page is the first page then no action is taken and the microprocessor 52 is directed back to blocks 502, 504, and 506.

If at block 532 the current displayed page is not the first page then the process continues at block 534, which directs the microprocessor 52 to save the shared buffer 88 associated with the current displayed page in the communication page store 104 on the hard drive 58, clear the contents of the shared buffer 88 by setting both the "StartPointer" 122 and the "CurentPointer" 124 to nil, and then to decrement the "Current Page" field 196 to point to the new page to be displayed. Block 534 further directs the microprocessor 52 to generate a clear screen message (i.e. the message 348 shown in FIG. 8) and to load the message into the shared buffer 88 for transmission to the client computers 14, 16 and 18. The clear screen message 348 is operable to clear content associated with messages previously transmitted to the respective client computers 14, 16, and 18 when received at the respective client computers.

The process then continues at block 536, which directs the microprocessor 52 to read the saved page corresponding to the "Current Page" field 196 from the communication page store 104 on the server hard drive 58 into the shared buffer 88. Block 536 also directs the microprocessor 52 to set the "CatchUpFlag" to active and to set the "SentPointer" to "nil". This has the effect of transmitting all messages loaded in the shared buffer to each of the client computers 14, 16 and 18, since each user must "catch up" with the changed page.

If at block 530 the "PageFlag" is not "0" then the "PageFlag" is "1" and the process continues at block 538, which directs the microprocessor 52 to determine whether the current displayed page is the last page in the "List of Pages" field 194, in which case the process continues at block 540. Block 540 directs the microprocessor 52 to save the shared buffer 88 associated with the current page in the communication page store 104 on the hard drive 58 and clear the contents of the shared buffer 88 by setting both the "StartPointer" 122 and the "CurentPointer" 124 to nil. Block 540 also directs the microprocessor 52 to increment the "Current Page" field 196 to point to the new current page to be displayed, to set the "CatchUpFlag" to active, and to set the "SentPointer" to "nil". Block 540 further directs the microprocessor 52 to generate a clear screen message (i.e. the message 348 shown in FIG. 8) and to load the message into the shared buffer 88 for transmission to the client computers 14, 16 and 18. The clear screen message 348 is operable to clear content associated with messages previously transmitted to the respective client computers 14, 16, and 18 when received at the respective client computers. The codes in block 540 essentially cause the server to generate a new blank page.

If at block 538, the current displayed page is not the last page then the process continues at block 542, which directs the microprocessor 52 to save the shared buffer 88 associated with the current displayed page in the communication page store 104 on the hard drive 58, to clear the contents of the shared buffer 88 by setting both the "StartPointer" 122 and the "CurentPointer" 124 to nil, and then to increment the "Current Page" field 196 to point to the new page to be displayed. Block 542 further directs the microprocessor 52 to generate a clear screen message (i.e. the message 348 shown in FIG. 8) and to load the message into the shared buffer 88 for transmission to the client computers 14, 16 and 18. The clear screen message 348 is operable to clear content associated with messages previously transmitted to the respective client computers 14, 16, and 18 when received at the respective client computers. The process then continues at block 536 as described above.

If at block 528 the message identifier is not 23, then the process continues at block 544, which directs the microprocessor 52 to determine whether the message identifier is 24, in which case the message corresponds to the "Disconnect" message (shown in FIG. 12 at 356). If the message identifier is 24, then the process continues at block 546, which directs the microprocessor 52 to set the "KeepRunningIdleFlag" 188 in the communication table 80 to active.

The process then continues at block 548, which directs the microprocessor 52 to remove the client corresponding to the "UID" in the message from the client table 90 in the RAM 56 and to delete the Rx and Tx buffers for the client computer.

The process then continues at block 550, which directs the microprocessor 52 to determine whether the client table is empty (i.e. there are no more clients in the multiple-party communication). If the client table is empty then the process continues at block 552, which directs the microprocessor 52 to determine whether the "KeepRunningIdleFlag" flag 188 in the communication table 80 is active (which it will be in this case due to block 546 having been executed), in which case the process continues at block 558 and the multiple-party communication is suspended. However the communication table entry 180 (shown in FIG. 6) remains in the communication table 80 in the RAM 56, and client computer users may still join the multiple-party communication at a later time.

If at block 550 the client table is not empty, then the multiple-party communication should continue for other client computers still in the multiple-party communication, in which case the microprocessor 52 is directed back to blocks 502, 504, and 506 in FIG. 15A.

If at block 544 the message identifier is not 24, then the process continues at block 554, which directs the microprocessor 52 to determine whether the message identifier is 25, in which case the message is a "ShutDown" message (shown in FIG. 12 at 358). The process then continues at block 556, which directs the microprocessor 52 to set the "KeepRunningIdleFlag" flag to not active.

The process then continues at blocks 548 and 550, as described above. If at block 552, the "KeepRunningIdleFlag" flag 188 is not active (which it will be in this case due to block 556 having been executed), then the process continues at block 560. Block 560 directs the microprocessor 52 to save the shared buffer in the communication page store 104 on the server hard drive 58, to delete the shared buffer 88 from RAM 56, and to delete the communication table entry 180 from the communication table 80. This has the effect of shutting down the multiple-party communication. However a record of all multiple-party communication messages (persistent and non-persistent) remains saved in the communication page store 104 on the server hard drive 58.

Server Upload of Data

When one of the client computer users invokes either the "ImageShow" or the "Clipboard" functions by clicking on the function invocation buttons 474 or 488 and then actuating a pointing device actuator button while the cursor is within the display area 472, an upload of data is initiated by the client computer to the server 12. In general, upload data is received by the server 12 and stored in the upload data store 106 on the server hard drive 58. Alternatively the upload data may be stored in an upload data store (not shown) in the RAM 56.

In the embodiment shown, the user interface embodiment shown in FIG. 11 may not be capable of displaying certain types of data that may be uploaded from client computer clipboard memory to the server, such as formatted data from other application programs, for example. Accordingly when the server 12 receives upload data (for example as an HTTP POST request from a client computer), the server reads the data to determine whether the upload data requires conversion. If the upload data is already in a supported image format then no conversion is required and the data is stored in the upload data store 106 and associated with the data identifier. If the upload data is not of a supported image format, the server invokes a conversion function to convert the upload data into a supported image format. Accordingly, the server may be configured with a plurality of common conversion functions covering many commonly used formatted data types (for example Microsoft Word and Excel applications). Conversion function program codes for producing image data from many formatted data types are generally available for license by software vendors and third party vendors.

Server Transmit Process

Figure 16:
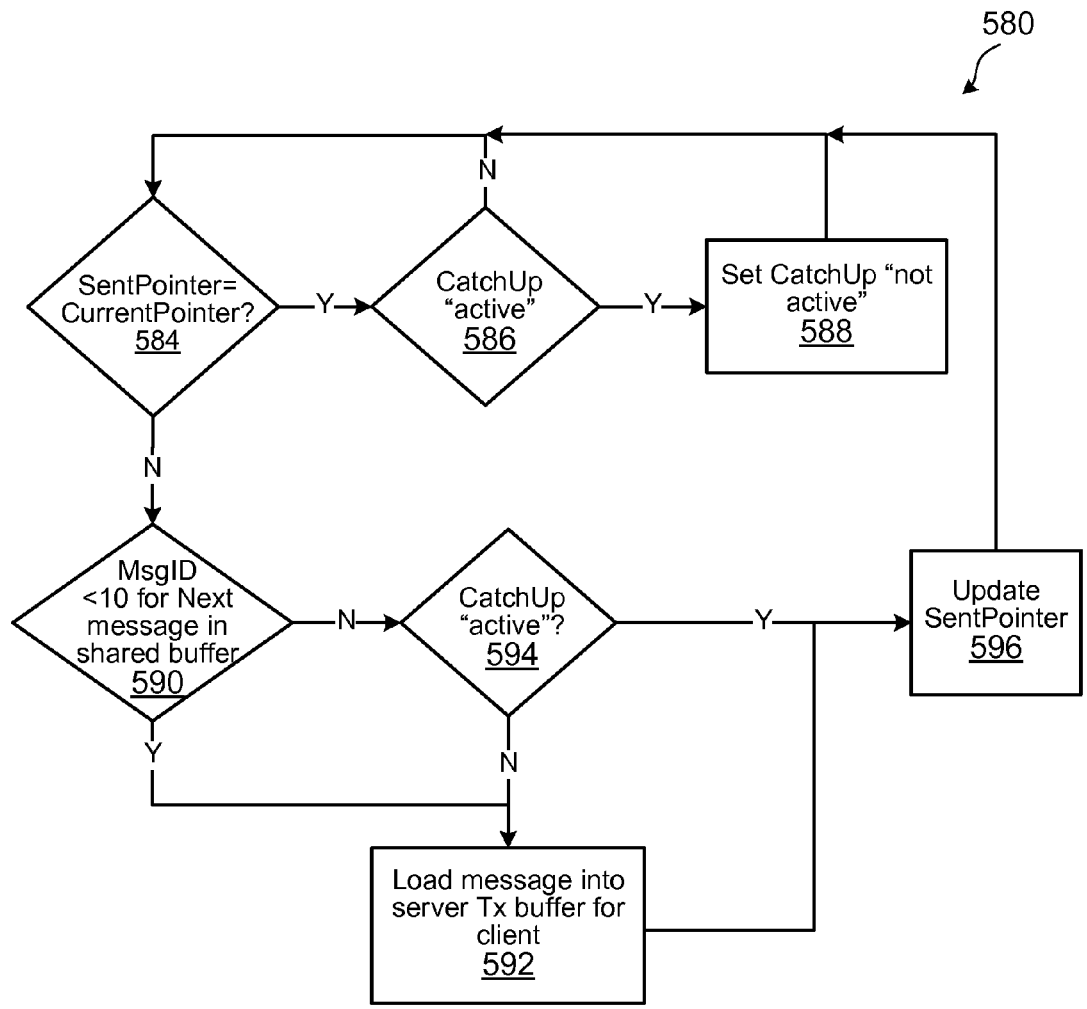
FIG. 16 is a flowchart representing blocks of codes for directing the processor circuit shown in FIG. 2 to process messages for transmission to respective client computers.

Referring to FIG. 16 a flowchart of blocks of code for directing the processor circuit 50 (shown in FIG. 2) to process messages in the shared buffer 88 for transmission to the client computers 14, 16 and 18 is shown generally at 580. The process 580 is executed by the microprocessor 52 for each of the client computers 14, 16, and 18 and messages are loaded into each of the respective Tx buffers 94 in the server RAM 56.

The process begins at block 584, which directs the microprocessor 52 to determine whether the "SentPointer" 126 (shown in FIG. 3) for the client computer is equal to the "CurrentPointer" 124. If the "SentPointer" 126 is equal to the "CurrentPointer" 124, then the process continues at block 586, which directs the microprocessor 52 to determine whether the "CatchUpFlag" 208 is active for the client computer. If the "CatchUpFlag" is active, then block 588 directs the microprocessor 52 to set the "CatchUpFlag" 208 to not active, since the client computer has "caught up" with the multiple-party communication. The microprocessor 52 is then directed back to block 584, and the process 580 is repeated.

If at block 584 the "SentPointer" 126 is not equal to the "CurrentPointer" 124 then the process continues at block 590, which directs the microprocessor 52 to determine whether the message identifier for the message in the next shared buffer store after the store indicated by the "SentPointer" is less than 10, indicating that the message is a persistent message. If the message identifier is less then 10, then the process continues at block 592, which directs the microprocessor 52 to load the message referenced by the "SentPointer" 210 (shown in FIG. 7) into the Tx buffer 94 corresponding to the client. Advantageously, in this embodiment, all client computers that have joined the multiple-party communication receive output messages that are associated with the persistent message type.

The process then continues at block 596, which directs the microprocessor 52 to update the "SentPointer" for the client to indicate that the message has been transmitted to the client computer. The microprocessor 52 is then directed back to block 584, and the process 580 is repeated.

If at block 590 the message identifier is greater than or equal to 10, then the message is a non-persistent or control message and the process continues at block 594, which directs the microprocessor 52 to determine whether the "CatchUpFlag" for the client computer is set active. If the "CatchUpFlag" is not active then the process continues at block 592 as described above the non-persistent and/or control message is transmitted to the client computer.

Advantageously, when the "CatchUpFlag" is set active for a client computer, the client computer does not meet the criterion for transmission of the message and the non-persistent and control message are not transmitted to the corresponding client computer. If at block 594 the "CatchUpFlag" is active, then the process continues at block 596, as described above.

Figure 17:
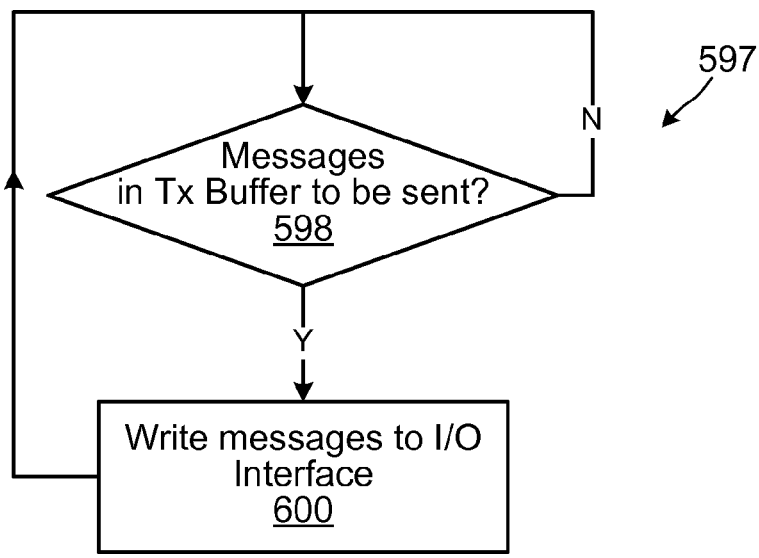
FIG. 17 is a flowchart representing blocks of codes for directing the processor circuit shown in FIG. 2 to transmit messages to the client computers.

Referring to FIG. 17 a flowchart of blocks of code for directing the processor circuit 50 (shown in FIG. 2) to transmit messages from the server side Tx buffers 94 (for each of the client computers 14, 16 and 18) is shown generally at 597. The process begins at block 598, which directs the microprocessor 52 to determine whether there are any messages in the Tx buffer. If there are messages in the Tx buffer to be sent, then the process continues at block 600, which directs the microprocessor 52 to write the messages to the network interface 62 of the I/O port 60. The process then continues at block 598, thus repeating blocks 598 and 600.

If at block 598 there are no further messages to be transmitted to the client then the process repeats block 598.

Advantageously, only clients that meet the criterion of being "caught up" with the multiple-party communication are transmitted the non-persistent messages in order to avoid sending generally confusing non-persistent mouse movements to clients who have joined the multiple-party communication late. Once the client has caught up with the multiple-party communication the client then receives all non-persistent messages representing their own pointer movements as well as pointer movements of other clients in the multiple-party communication.

In the embodiment shown in FIG. 16 control messages will also be transmitted to the client computers, since control messages are also stored in the shared buffer. As will be seen later, with the exception of the "ClearScreen" message, the control messages transmitted to the clients do not result in any changes to the client display area 472 and are generally ignored by the client computers.

Messages loaded into the Tx buffers 94 of the respective client computers are transmitted to the client computers through the network 20 in the order in which they are loaded into the buffer (i.e. on a first-in-first-out FIFO basis).

Client Receive Process

In general, the message receiver program codes stored in the store 284 of the program memory (shown in FIG. 9) direct the microprocessor 262 to receive and process messages transmitted to the client computer 14, 16, and 18 from the server 12.

Figure 18A:
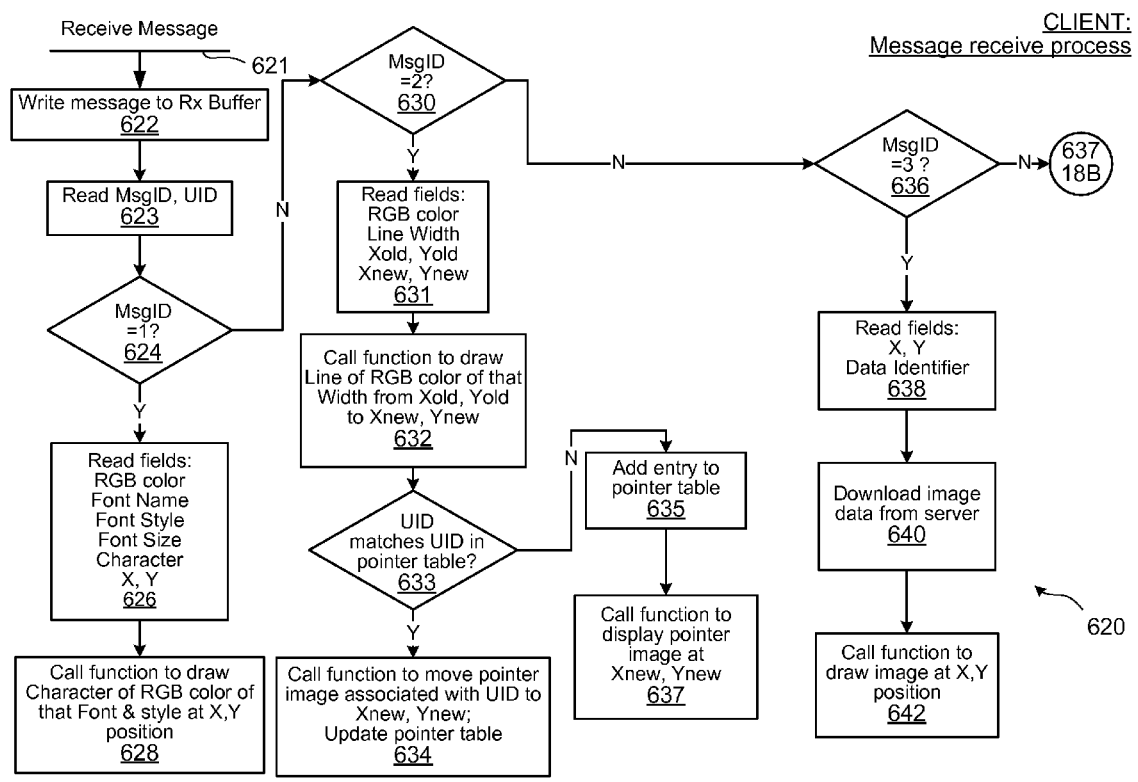
FIGS. 18A-18B are respective portions of a flowchart representing blocks of codes for directing the client computer processor circuit shown in FIG. 9 to receive messages from the server processor circuit shown in FIG. 2.

Referring to FIG. 18A a flowchart of blocks of code for directing the processor circuit 260 (shown in FIG. 9) to receive messages from the server 12 is shown generally at 620. The process 620 starts at block 621 when a message is received at the interface 272 of the I/O port 270.

Block 622 then directs the microprocessor 262 to write the message into the client side Rx buffer 290 (shown on FIG. 9). Block 623 then directs the microprocessor 262 to read the message identifier (MID) and client computer identifier (UID) included in the message.

The process continues at block 624, which directs the microprocessor 262 to determine whether the message identifier is 1. If the message identifier is 1, then the message corresponds to the "KeyTyped" message 338 (shown in FIG. 12), and the process continues at block 626, which directs the microprocessor 262 to read the bytes in the message corresponding to color, font identifier, font style identifier, font size, the character to be displayed, and the X and Y coordinates of the position at which to display the character. The process then continues at block 628, which directs the microprocessor 262 to call a function in the image display program codes 289 for drawing the character on the display area 472.

If at block 624, the message identifier is not 1, then the process continues at block 630, which directs the microprocessor 262 to determine whether the message identifier is 2. If the message identifier is 2, then the message corresponds to the "MouseDrag" message 340, which is a pointer message. Block 631 then directs the microprocessor 262 to read the bytes in the message corresponding to color, line width, starting coordinates Xold and Yold, and ending coordinates Xnew and Ynew.

Block 632 then directs the microprocessor 262 to call a function in the image display program codes 289 for drawing a line of specified color and width between the starting X and Y coordinates and the ending X and Y coordinates on the display area 472.

The process then continues at block 633 which directs the microprocessor 262 to determine whether the UID read in block 631 matches one of the UID's in the pointer table 295 stored in the RAM 266. The pointer table 295 includes an entry (not shown) for each client computer in the multiple-party communication and each entry includes the UID and the current X and Y coordinate position of the pointer associated with the UID. If none of the pointer table entries has a UID that matches the UID read at block 631, then the process continues at block 635, which directs the microprocessor 262 to add a new entry (i.e. UID, Xnew, Ynew) to the pointer table 295.

The process then continues at block 637, which directs the microprocessor 262 to call a function in the image display program codes 289 to cause a pointer associated with the UID to be displayed at the Xnew and Ynew coordinate position on the display area 472.

If at block 633 the UID read in block 631 matches one of the pointer table entries, then the process continues at block 634, which directs the microprocessor 262 to call a function in the image display program codes 289 for moving the image of the pointer from its current position (read from the pointer table) to the Xnew and Ynew coordinate position on the display area 472. Block 648 also directs the microprocessor 262 to update the coordinate position in the pointer table 295 for the pointer associated with the UID read at block 631 to the new coordinates Xnew and Ynew.

If at block 630, the message identifier is not 2, then the process continues at block 636, which directs the microprocessor 262 to determine whether the message identifier is 3. If the message identifier is 3 then the message corresponds to the "ImageShow" message format 342. Block 638 then directs the microprocessor 262 to read the bytes in the message corresponding to the data identifier of the image, and the X and Y coordinates at which an upper left hand corner of the image is to be positioned on the display area 472. Block 640 then directs the microprocessor 262 to download the data associated with the data identifier from the server 12. Downloading may be performed in accordance with any conventional file download protocol such as file transfer protocol (FTP), for example. Alternatively block 640 may direct the microprocessor 262 to initiate an HTTP GET request to cause the image file to be downloaded to the client computer from the server 12.

The process then continues at block 642, which directs the microprocessor 262 to call a function in the image display program codes 289 for displaying the image at the X and Y coordinates on the display area 472.

Figure 18B:
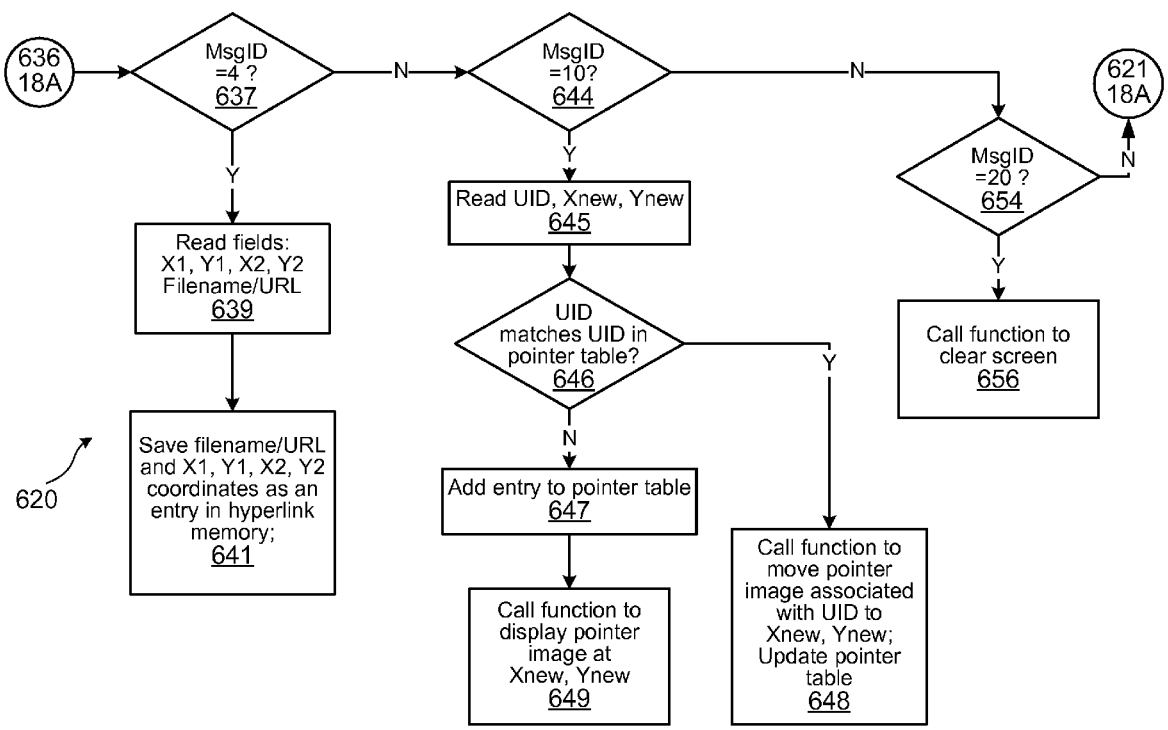

If at block 636, the message identifier is not 3, then the process continues at block 637 on FIG. 18B. Referring to FIG. 18B, block 637 directs the microprocessor 262 to determine whether the message identifier is 4. If the message identifier is 4, then the message corresponds to the "LinkCreate" message format 344, in which case block 639 then directs the microprocessor 262 to read the bytes in the message corresponding to the "UID", the X1, Y1, X2, and Y2 coordinates representing coordinate positions of corners of the linked area 497 (shown in FIG. 11), and the filename or internet address in the message 344.

The process then continues at block 641, which directs the microprocessor 262 to store the filename or internet address and coordinates X1, X2, Y1, and Y2 in the filename/URL store 296 in the RAM 266 (shown in FIG. 9). As described above in connection with block 388 (shown in FIG. 13A), a mouse click occurring within one of the linked areas defined by hyperlink information stored in the store 296 causes the associated filename or internet address to be opened in the display area 472.

If at block 637, the message identifier is not 4, then the process continues at block 644, which directs the microprocessor 262 to determine whether the message identifier is 10. If the message identifier is 10, then the message corresponds to the "MouseMove" message format 346, which is a pointer message. Block 645 then directs the microprocessor 262 to read the bytes in the message corresponding to the "UID", and the Xnew and Ynew coordinates representing the ending position of the mouse pointer.

The process then continues at block 646 which directs the microprocessor 262 to determine whether the UID read in block 645 matches one of the UID's in the pointer table 295 stored in the RAM 266. If none of the pointer table entries has a UID that matches the UID read at block 645, then the process continues at block 646, which directs the microprocessor 262 to add a new entry (i.e. UID, Xnew, Ynew) to the pointer table 295.

The process then continues at block 649, which directs the microprocessor 262 to call a function in the image display program codes 289 to cause a pointer associated with the UID to be displayed at the Xnew and Ynew coordinate position on the display area 472.

If at block 646 the UID read in block 645 matches one of the pointer table entries, then the process continues at block 648, which directs the microprocessor 262 to call a function in the image display program codes 289 for moving the image of the pointer from its current position (read from the pointer table 295) to the Xnew and Ynew coordinate position on the display area 472. Block 648 also directs the microprocessor 262 to update the coordinate position in the pointer table 295 for the pointer associated with the UID read at block 645 to the new coordinates Xnew and Ynew.

Advantageously, when the client computer receives its own "MouseMove" messages back from the server as pointer messages, the client computer displays a pointer corresponding to the pointer message. Accordingly, in this embodiment, the client computer may display a cursor representing a current (real time) position of the client computer pointing device and further displays the pointer corresponding to its own "Mouse-Move" messages, which represent the position of the client computer's pointing device as seen by the server 12 and the other client computers in the multiple-party communication. Each client computer is thus provided with feedback by receiving their own pointer message, which causes display of their own pointer on their display.

Furthermore, by displaying both the client computer cursor, the client computer's pointer, and the other client computer pointers on each of the client computer's respective display areas 472, an awareness of what other users are doing during the multiple-party communication is provided. For example the user of the client computer 14 may cause their cursor 496 to move to point to specific content displayed on the display area 472 and the users of other client computers 16 and 18 will see corresponding movements of the pointer 499 corresponding to the client computer 14 on their respective displays. The user of client computer 14 will also be able to view their own pointer in relation to their cursor, which may be useful for guiding the user's actions.

If at block 644, the message identifier is not 10, then the process continues at block 654, which directs the microprocessor 262 to determine whether the message identifier is 20. If the message identifier is 20, then the message corresponds to the "ClearScreen" message format 348. Block 656 then directs the microprocessor 262 to call a function in the image display program codes 289 for clearing the display area 472.

If at block 654 the message identifier is not 11, then the message is ignored and the microprocessor 262 is directed back to block 621 to wait for the next message to be received. It should be readily appreciated that control messages having a message identifier of ≧20 received by the client computer 14, 16, and 18 are ignored in the process 620, which only responds to persistent messages and non-persistent messages.

Publishing Content

In another embodiment, a user of one of the client computers 14, 16, or 18 may wish to publish content created during a multiple-party communication to facilitate viewing by other computers in communication with the network 20. For example, a client computer user may wish to record a page that may be later viewed by another user, who may not have joined the multiple-party communication. Alternatively a client computer user may wish to record content created in a single client communication and then make the page(s) publicly available for viewing in similar fashion to that provided by web sites on the internet.

Referring to FIG. 11, when a client computer user clicks on the "Publish" function invocation button 493 on the user interface 470, a dialogue window is displayed (not shown), which prompts the user to enter a filename under which the multiple-party communication will be published (for example "travel.web"). The dialogue window may additionally prompt the user to enter a description for the published page, such as "My European Vacation", for example. When the user enters the filename the server processor circuit 50 (shown in FIG. 2) causes all persistent messages representing content in a currently displayed page to be written to the published communication store 108 on the server hard drive 58.

The "Publish" function invocation button 493 generally launches a similar process to the process launched by the "Save" button 477 (i.e. blocks 410, 412, and 414 in FIG. 13B) except that the persistent messages are saved to the published communication store 108 rather than the client saved content store 100. However, published content in the published communication store 108 are generally made available to anyone who wishes to view the pages, while saved content in the client saved content store 100 is generally only available to client computer users who have joined a multiple-party communication that caused the respective pages to be saved. In other embodiments, non-persistent messages may also be saved to the published pages store to facilitate replaying non-persistent mouse movements to the public access computer.

Viewing Published Multiple-Party Communications

Any user of a computer such as the public access computer 40 shown in FIG. 1, which has a connection to the network 20, may view a published multiple-party communication. In general, the user connects to the server 12 and transmits a request for a web page listing published multiple-party communications (not shown) saved in the published communication store 108. The web page generally includes a published pages table that includes information similar to the information listed in table 140 on the web page 130 (shown in FIG. 4), except that each entry corresponds to a published page rather than an active multiple-party communication.

Alternatively, if a user knows or has been otherwise made aware of the URL under which the page was published, the user may type URL of the published page (for example www-.freemeeting.com/travel.web) into an address field of an internet browser application such as Microsoft Internet Explorer.

Figure 19:
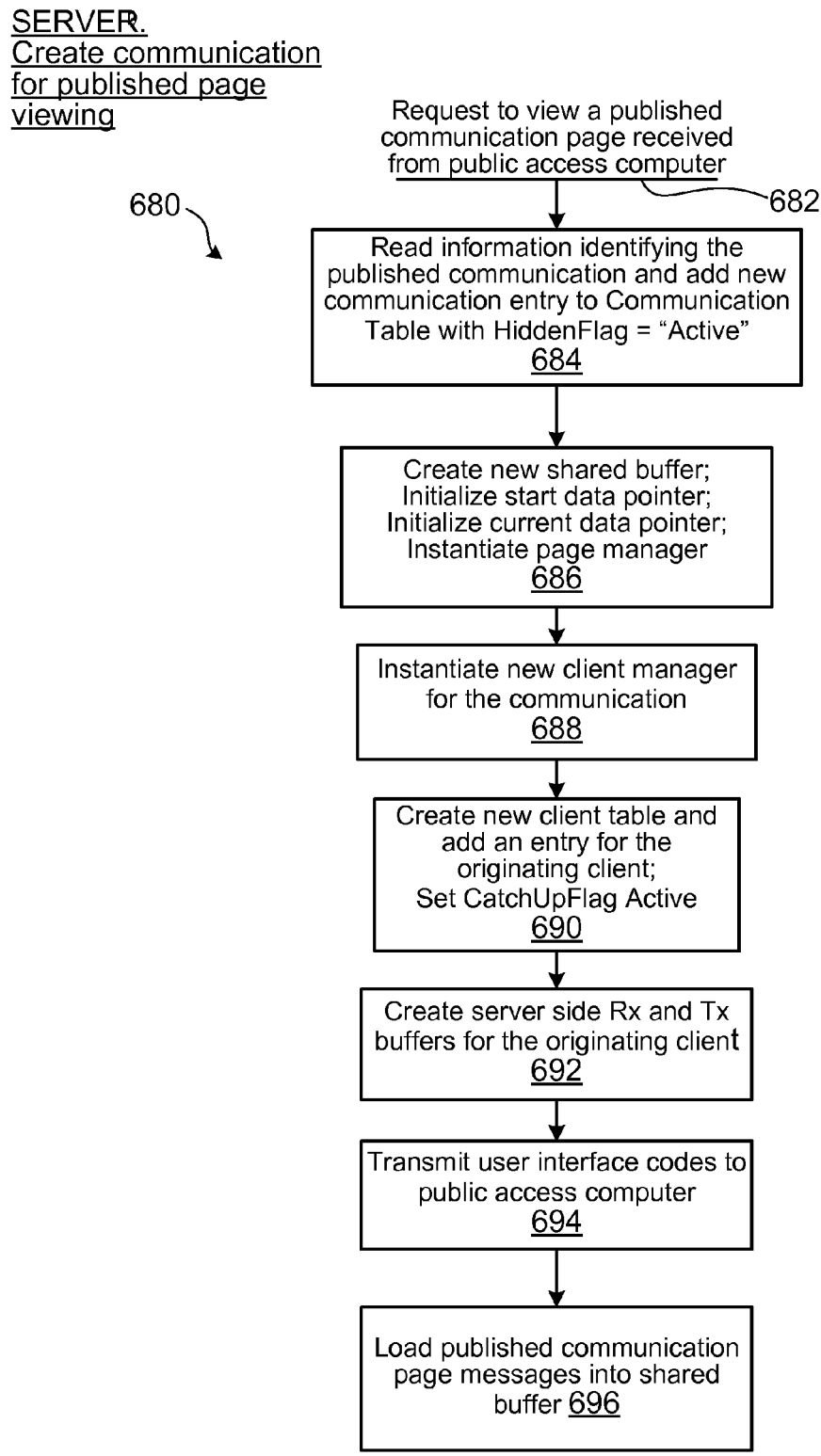
FIG. 19 is a flowchart representing blocks of codes for directing the processor circuit shown in FIG. 2 to transmit a published multiple-party communication page to the client computers.

Referring to FIG. 19, a flowchart representing blocks of codes for directing the microprocessor 52 to create a communication for viewing published pages is shown generally at 680. The process 680 is similar to the process 150 shown in FIG. 5, in that a communication is created for the public access computer user, thus providing various communication functions generally as described above. However the communication for viewing published content may only have single computer user as a participant. Furthermore certain functions generally available in active multiple-party communications are not necessary for viewing a published multiple-party communication and such functions may be disabled, as described below.

In general the server responds to a request from a public access computer including an identifier identifying published content associated with a previous communication. The server then reads saved messages associated with the identifier from persistent memory storage on the server and produces respective output messages representing the content in the saved messages. The output messages are then transmitted to the computer.

The process 680 begins at 682 when a public access computer user clicks on a hyperlink to a published multiple-party communication in the web page listing available published communication content, which causes a HTTP request message including identifier identifying the selected published multiple-party communication to be transmitted to the server 12. In one embodiment the identifier includes the filename under which the multiple-party communication was published and/or the description provided by the client computer user when the content was published.

Block 684 then directs the microprocessor 52 to read the HTTP message to extract the identifier. Block 684 also directs the microprocessor 52 to create a communication for viewing the content by adding a new communication entry to the communication table 80 (shown in FIG. 2). In this embodiment, communications created for viewing of published pages are created with the "HiddenFlag" 198 set to active, such that the communication is not listed when the web page 130 is displayed to client computer users who request information on active multiple-party communications as per previously described embodiments. Accordingly, since the communication name will not be displayed, the "CommunicationName" field 184 in the communication table entry 180 may be populated with the filename or the description read from the HTTP message, or may be set to a default value. A new unique communication identifier (CID) is also generated for the communication and stored in the CID field 182 in the communication table 80 in the RAM 56.

Block 686 then directs the microprocessor 52 to create a new shared buffer 88 (shown in FIG. 2) for the communication, and to initialize the "StartPointer" 122 and the "CurrentPointer" 124 to both refer to a first store in the shared buffer 88. Block 686 also directs the microprocessor 52 to instantiate a page manager for the communication by launching the page manager program codes in the store 74 of the program memory 54.

Block 688 then directs the microprocessor 52 to instantiate a new client manager for the communication by launching the client manager program codes in the store 72 of the program memory 54.

Block 690 then directs the microprocessor 52 to generate a new client table 90 in the RAM 56, to add an entry to the client table for the public access computer. In this embodiment block 690 also directs the microprocessor 52 to set the "CatchUpFlag" to active, such that only persistent type messages are transmitted to the public access computer 40. In other embodiments, persistent, non-persistent, and control type messages may be transmitted to the public access computer 40.

Block 692 then directs the microprocessor 52 to create server side Rx and Tx buffers 92 and 94 for the originating client.

Block 694 then directs the microprocessor 52 to cause the network interface 62 of the I/O PORT 60 to transmit published pages user interface codes through the network 20 to the public access computer. Alternatively, the public access computer may launch program codes (not shown) for instantiating a stand-alone published pages user interface application.

Block 696 then directs the microprocessor 52 to read messages from the published page identified by the filename read from the HTTP message in block 684 and to load the messages into the shared buffer. The "StartPointer" 122 is set to reference the message store 120 in the shared buffer 88 to which the first message was loaded. As the message stores 120 of the shared buffer 88 are loaded with subsequent messages read from the published page file, the "CurrentPointer" 124 is incremented to reference the last loaded message store.

The published pages user interface may be generally similar to the user interface 470, except that user interface function invocation buttons 474, 476, 477, 495, 488, 493, and 491, the line formatting controls 484, and the character formatting controls 486, may be disabled or not displayed in the user interface. Accordingly, only the "Open" function invocation button 494, the "PageBack" function invocation button 478, the "PageForward" function invocation button 480, and the "Quit" function invocation button 482 are still active when viewing a published content. The aforementioned function invocation buttons generally operate as described above in connection with FIG. 13A-FIG. 13C.

The persistent messages associated with the published page in the published communication store 108 are then processed generally in accordance with the process 580 shown in FIG. 16. The output messages are then transmitted to the public access computer in accordance with the process 597 shown in FIG. 17.

When a public access computer user views a published multiple-party communication all persistent saved content and any linked areas 497 are displayed in accordance with the process 620 shown in FIGS. 18A and 18B. When the "CatchUpFlag" is set to not active, non-persistent content is also displayed on the public access computer 40.

The public access client computer 40 may cause user input signals to be produced but only certain user input signal and function invocation combinations will be processed in accordance with the process 360 shown in FIG. 13A-FIG. 13C. For example, in this embodiment, only blocks 416, 418 and 420 ("Open" function invocation), block 388, and 389 (link area clicked), block 422 and 424 ("PageBack" and "PageForward" function invocations), and/or block 426-434 ("Quit" function invocation buttons) are processed by the public access computer.

If the published page includes a linked area (such as the linked area 497 shown in FIG. 11), pointing device user input signals causing interrupt event signals within the linked area cause blocks 388, 389, and 384, shown in FIG. 13A to be launched. Block 389 directs the microprocessor 262 to generate the "Open" message 352 with a message identifier value of 22, and a "UID" corresponding to the user identifier for the public access computer, and a filename or internet address associated with the linked area 497. The filename may be a filename of other published messages in the published communication store 108. The process then continues at block 384, which directs the microprocessor 262 to write the message 352 into the client side Tx buffer 292. The linked areas 497 thus facilitate providing published content with functioning hyperlink areas to other saved messages and/or other content available elsewhere on the network 20.

When the "Open" function invocation button 494 is clicked, then the blocks 416, 418 and 420 in the process 360 are launched. Block 418 launches a dialog (not shown) for user to enter the filename of other published content in the published communication store 108, for example "inLondon.web". Block 420 then directs the microprocessor 262 to generate the "Open" message 352 with a message identifier value of 22, and a "UID" corresponding to the user identifier for the public access computer, and a filename entered by user in dialog box at block 418. The process then continues at block 384, which directs the microprocessor 262 to write the message 352 into the client side Tx buffer 292.

When either the "PageBack" function invocation button 478 or the "PageForward" function invocation button 480 is clicked, the blocks 422 and 424 are launched causing a page change message to be transmitted to the server 12. Advantageously, if more than one published page has been viewed by the public access computer user by clicking on a linked area 497, then the user is permitted to page back and forward through these pages in accordance with the blocks 528-542 in the process 500 shown in FIG. 15B.

When the "Quit" function invocation button 482 is clicked, block 426 in the process 360 is launched. However blocks 428, 430 and 432 are not launched for public access computers. When facilitating viewing published pages, the server 12 determines whether the communication is to keep running or be shut down.

In one embodiment, the communication created for the public access computer 40 to view a published page may be shut down in accordance with blocks 548-560 shown in FIG. 15B after the published page has been transmitted to the computer user. The published page view will remain displayed on the public computer display, but the communication that facilitated transmitting the page will be closed. Accordingly, each time the user of the public access computer 40 requests another page by clicking on a linked area 497 on the published page, for example, a new communication is created to serve the requested page to the user.

In other embodiments the communication may be kept running, transmitting different content files from published communication store 108 in response to the public access computer user requests, until the user disconnects from the communication by clicking on the quit button, as described earlier herein. This communication will only have a single participant since the Hidden flag 198 is set to active so that other client computers cannot join the communication.

In yet another embodiment, the published multiple-party communication content may be transmitted to public computer user one message at a time with a time interval between messages corresponding to the timestamp appended to the messages at block 508 in FIG. 15A as described later herein with reference to FIG. 32. This permits the public access computer user to view the published multiple-party communication content at a rate that matches the rate at which the content was created in the original multiple-party communication. In this embodiment a new communication may be created for each public access computer user that wishes to view the published page at the original content creation rate, thus facilitating delayed transmission of messages from a shared buffer associated with the communication.

In other embodiment the server may share the communication for the same published content between multiple public access computers, in which case the same communication (having the same CID) may be used to serve the published pages to second and subsequent public access computers. When the last user disconnects from the communication, the communication may then be shut down. Although in such shared public communications, when any user clicks on linked areas 497, "Open", "PageBack" or "PageForward" buttons, all users of public client computers will be transmitted messages associated with the new page. This type of multiple-party communication is suitable when the published content does not have Link areas, and server also repeatedly transmits the same content over and over again in a repeating looped presentation.

Advantageously a public access computer user who is not capable of producing web pages by conventional methods (for example using Microsoft FrontPage® or using hypertext markup language) may record content in a communication and publish the content, thus making the pages available to the public in general. Publishing such pages does not require any specialized knowledge, while providing a simple interface (i.e. the user interface 470) for producing content including images, lines and character annotations and links to other content. Accordingly, in this embodiment, the server 12 is generally configured to act as a content recorder, facilitating subsequent playback of the recorded content to any computer user who is connected to the network 20. The published pages may be browsed by a user in the user interface in a similar manner to browsing web pages in a web browser.

Game Piece Image Movement

In another embodiment the system for supporting multiple-party communications may further facilitate playing of a game between parties who have joined a multiple-party communication.

Display of game piece images is initiated when a user of one client computer user clicks on the "Game" function invocation button 491 on the user interface 470. Image data representing the game piece images and initial position coordinates for displaying the game piece images are stored in the store 298 of the client computer RAM 266.

Figure 20:
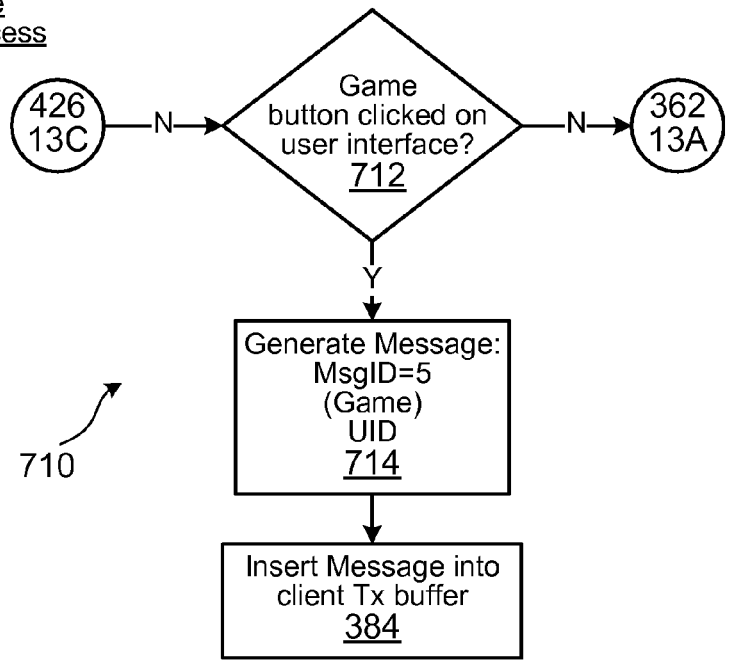
FIG. 20 is a flowchart representing blocks of codes for directing the processor circuit shown in FIG. 9 to transmit a game message to the server.

Referring to FIG. 20, a flowchart of blocks of code for directing the processor circuit 260 (shown in FIG. 9) to generate the game message 359 is shown generally at 710. The blocks in the process 710 generally represent a modification to the process 360 shown in FIG. 13.

The process begins at 712, which directs the microprocessor 262 to determine whether the "Game" function invocation button 491 has been clicked, in which case the process continues at block 714. Block 714 directs the microprocessor 262 to generate the "Game" message 359 with a message identifier value of 5 and a "UID" corresponding to the user identifier of the client computer that invoked the game function.

The process then continues at block 384, which directs the microprocessor 262 to write the message 350 into the client side Tx buffer 292. The message 359 is then transmitted to the server 12 in accordance with the process 440 shown in FIG. 14.

The server 12 receives the "Game" message 359 from the client computer in accordance with blocks 508-512 of the process 500 shown in FIG. 15 as described above. Once inserted into the shared buffer at block 510 the "Game" message 359 is then processed for transmission in accordance with the process 580 shown in FIG. 16, and transmitted to all client computers in accordance with the process 597 shown in FIG. 17, as described above.

Figure 21:
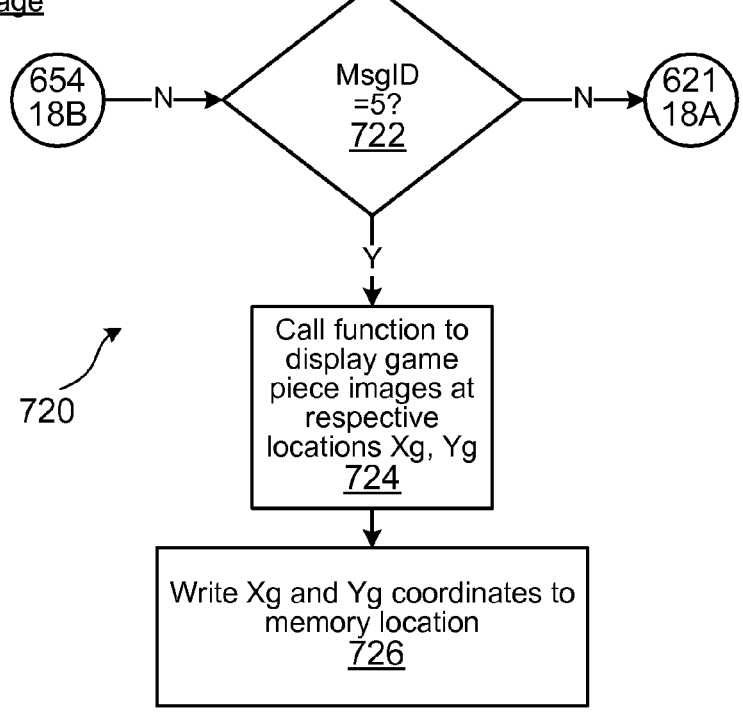
FIG. 21 is a flowchart representing blocks of codes for directing the processor circuit shown in FIG. 9 to display game piece images on respective client computers.

Referring to FIG. 21, a flowchart representing blocks of code for directing each client computer processor circuit 262 to display the game piece images is shown generally at 720. The blocks in the process 720 generally represent a modification to the process 620 shown in FIG. 18B.

The process 720 begins at block 722, which directs the microprocessor 262 to determine whether the message received at block 621 in FIG. 18A has a message identifier of 5. If the message identifier is 5, then the process continues at block 724, which directs the microprocessor 262 to read game piece image data and respective position coordinates from the store 298 and to call a function in the image display program codes 289 (shown in FIG. 9) for displaying each game piece image on the display area 472 at positions corresponding to the respective position coordinates for each game piece image.

Figure 22:
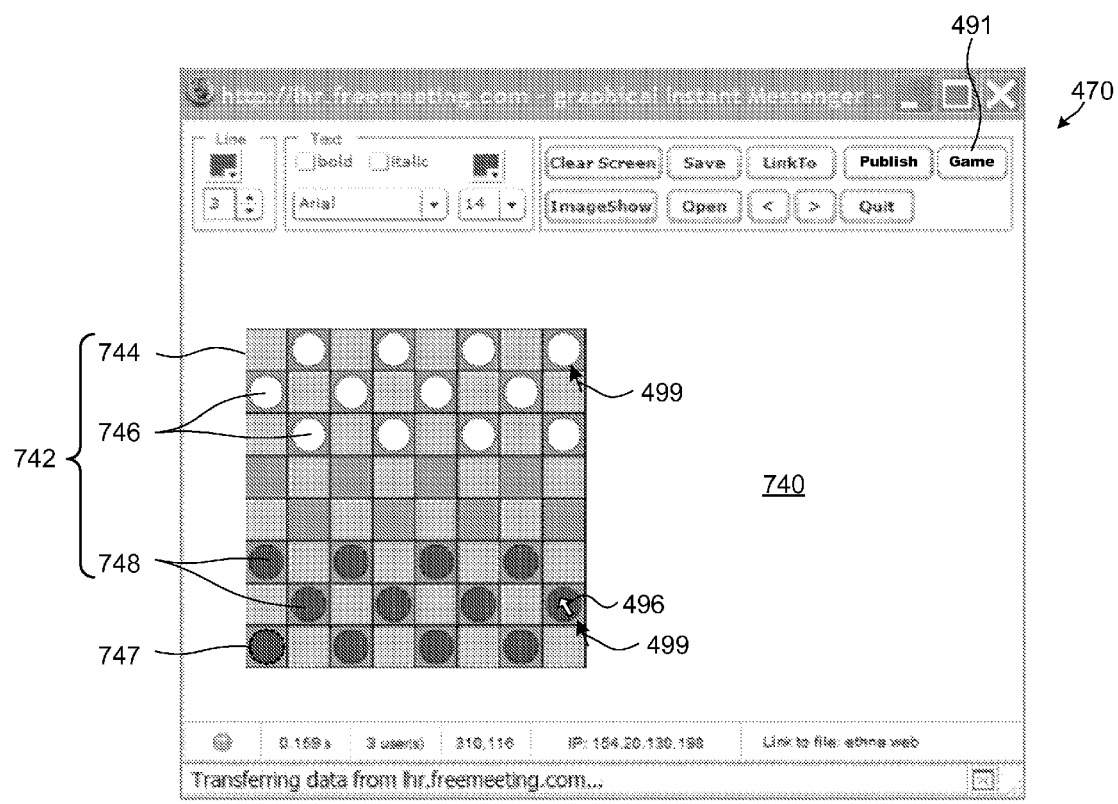
FIG. 22 is a screenshot of an alternate embodiment of a user interface displayed on the client computers shown in FIG. 1.

Referring to FIG. 22, a screenshot of the user interface 470 (shown in FIG. 11) is shown having a display area 740 that includes game piece images 742 displayed thereon. The game piece images 742 include a game board image 744, a plurality of white game piece images 746 and a plurality of black game piece images 748. Each of the game piece images 742 are displayed at initial position coordinates read from the store 298 of the client computer RAM 266. Each game piece image 746 and 748 includes an image boundary 747 (shown in broken outline), which defines the image extent of the respective game piece.

Referring back to FIG. 21, the process then continues at block 726, which directs the microprocessor 262 to write the respective position coordinates to the game piece coordinates store 299 in the client computer RAM 266, such that subsequent movements of the game pieces by the client computer users may be tracked in position coordinate values stored in the game piece coordinates store 299.

Game Piece Movements

In general, the game board image 744 is displayed at a fixed coordinate position on the display area 740, while the game piece images 746 and 748 may be moved in response to user input signals received at the respective client computers.

Figure 23:
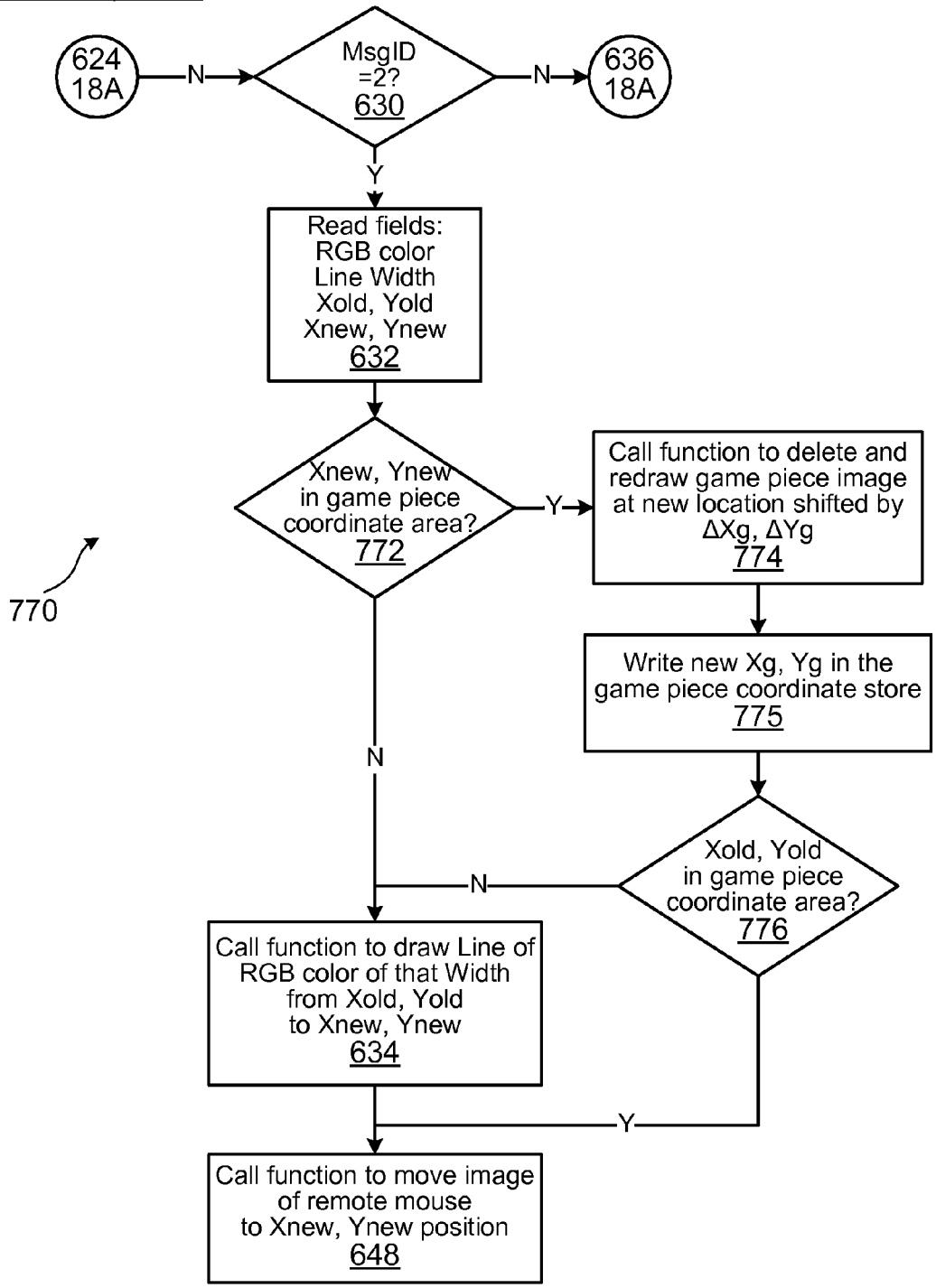
FIG. 23 is a flowchart representing blocks of codes for directing the processor circuit shown in FIG. 9 to move game piece images on respective display areas of the client computers shown in FIG. 1.

Referring to FIG. 23, a flowchart representing blocks of code for directing the microprocessor 262 to move the game piece images on the display area 740 is shown generally at 770. The process 770 shown in FIG. 23 is a modification of the process 620 shown in FIG. 18A.

In this embodiment, game piece images 746 and 748 are moved in response to cursor messages representing "MouseDragged" user input signal combinations. In other embodiments the game piece images may be moved in response to cursor movement signals in combination with character input signals produced at the keyboard (for example, when the user presses a "Ctrl" key while simultaneously moving the pointing device.

If at block 630 the message identifier is 2, then the message corresponds to the "MouseDrag" cursor message 340. The process continues at block 632, which directs the microprocessor 262 to read the bytes in the cursor message corresponding to color, line width, starting coordinates Xold and Yold, and ending coordinates Xnew and Ynew.

Block 772 then directs the microprocessor 262 to determine whether the position coordinates Xnew and Ynew represent a position on the display area 740 that is inside the boundary 747 of one of the game piece images represented by coordinates stored in the game piece coordinates store 299 in the RAM 266, in which case the process continues at block 774.

Block 774 then directs the microprocessor 262 to call a function in the image display program codes 289 to delete the game piece image at and redraw the game piece image at a new location Xg, Yg on the display area. The coordinates Xg, Yg are shifted by $\Delta X$ and $\Delta Y$ from a previous location of the game piece image, where $\Delta X$ and $\Delta Y$ are calculated according to the relation:

$$\Delta X = X_{new} - X_{old}$$

$$\Delta Y = Y_{new} - Y_{old} \qquad \text{Eqn 1}$$

Block 775 then directs the microprocessor 262 to write the new game piece position coordinates into the game piece coordinate store 299 in the RAM 266.

Block 776 then directs the microprocessor 262 to determine whether the position coordinates Xold and Yold define a position on the display area 740 that is inside one of the game piece coordinate areas stored in the game piece coordinates store in the RAM 266, in which case the process continues at block 648.

Block 648 then directs the microprocessor 262 to call a function in the image display program codes 289 for moving the image of the pointer from its current position on the display area 740 to the Xnew and Ynew coordinate position on the display area 740.

If at block 776, the coordinates Xold and Yold define a position that is not inside the boundary 747 of one of the game piece images 746 and 748 on the display area 740 then the process continues at block 634. Block 634 directs the microprocessor 262 to call a function in the image display program codes 289 for drawing a line of specified color and width on the user display area 740 between the starting coordinates Xold and Yold, and ending coordinates Xnew and Ynew.

If at block 772 the coordinates Xnew and Ynew define a position that is not inside the boundary 747 of one of the game piece images 746 and 748 on the display area 740 then the process continues at block 634 and 648, as described above.

In this embodiment when the user input signals cause the client computer's pointer 499 to be dragged across the boundary 747 of one of the game piece images 746 or 748 the pointer "pushes" the game piece image to a new location, while simultaneously drawing a line on the display area. When the user input signals cause client computer's pointer 499 to be dragged inside the boundary 747, the game piece image is moved without drawing a line on the display area 740. In other embodiments the line may be discontinued when the pointer crosses the boundary 747 or the line may be drawn behind the game piece image and game board 744.

Advantageously, the game piece images are moved in response to pointer messages received at the client computers, and not in response to the corresponding client computer cursor 496, thus facilitating some server arbitration of game piece movements in accordance with the timestamp of the messages representing game piece movements received from the client computers. Should two client computer users simultaneously wish to move the same game piece image, a first received message will receive priority of movement. Furthermore, in this embodiment the server 12 only receives cursor messages and produces pointer messages which are transmitted to the client computers. When the client computers receive the pointer messages, the pointer messages are interpreted by the client computer processor circuit 260 to cause corresponding game piece image movements on each of the respective display areas 740, such that each user receives a common view of the game piece images 742. By causing game piece movements in response to pointer messages rather than the client computers real time cursor 496, the users are able to adjust their activity to account for any network latency when moving the game piece images.

Referring to FIG. 24, in an alternative embodiment, desired game piece movements may be represented by a game piece movement request message shown generally at 780. The piece movement request messages 780 are transmitted by the client computers 14, 16, and 18 to the server 12 in response to user input signals representing movements that cross the boundary 747 or are within the boundary.

The piece movement request message 780 is a persistent message having a message identifier of 6. The piece movement request message 780 represents a "MouseDrag" combination of user input signals between starting X and Y coordinates (Xold, Yold) and ending X and Y coordinates (Xnew, Ynew) held in bytes 5-12 of the message.

The piece movement request message 780 further includes an "Owner UID" field held in bytes 13-14 of the message. The "Owner UID" field holds a UID corresponding to the UID of the client computer that owns the game piece that it is desired to move. For example, in a game of checkers between a first client computer and a second client computer, the white game pieces 746 may be assigned to the first client computer user and the white game piece coordinates stored in the store 299 of the client computer RAM 266 include an associated "Owner UID" corresponding to the UID of the first client computer. Similarly the black game pieces 748 may be assigned to the second client computer and the black game piece coordinates stored in the store 299 of the client computer RAM 266 include an associated "Owner UID" corresponding to the UID of the second client computer.

The piece movement request message 780 further includes an identifier field held in bytes 15-16 of the message. The identifier identifies a particular game piece image that the client computer user wishes to move. For example, in a game of checkers, the white checkers may be assigned number indices of 1-12 and the black game pieces may be assigned indices of 13-24.

When a user of one of the client computers 14, 16, or 18 attempts to move one of the game pieces by producing user input signals within the boundary 747 of one of the game piece images 746 and 748, a piece movement request message 780 is produced and transmitted to the server 12. The server 12 receives the message 780 generally in accordance with the process shown in FIG. 15A.

In this embodiment, when the server receives a "Game" message 359 requesting display of game piece images for playing a game, the server launches the game criteria program codes 78, which direct the microprocessor 52 to wait for piece movement request messages 780 to be received from the client computers playing the game. The game criteria program codes 78 additionally directs the microprocessor 52 to store game piece position coordinates in the game data store 109 for keeping track of the game piece image position coordinates. When the game is initiated by the "Game" message 359, the game data store is loaded with initial position coordinates of the game piece images.

When the server 12 receives piece movement request messages 780, the game criteria program codes direct the microprocessor 52 to determine whether the piece movement request message meets a criterion associated with rules of the game being played. For example, if the server receives a piece movement request message 780 having an Owner UID held in bytes 13-14 that does not correspond to the UID held in bytes 3-4 of the message, then the message represents an attempt by a client computer user to move a game piece that has been assigned to another client computer user, and the server ignores the piece movement request message.

The server 12 may also compute a desired move magnitude represented by the X and Y coordinates held in the bytes 5-8 of the message 780 and determine whether the piece movement request meets a movement criterion associated with the game being played. Similarly, the server 12 may enforce other game rules by determining whether the piece movement request message represents a move that meets a criterion for the game piece identified by the identifier held in bytes 15-16 of the message 780.

When the piece movement message 780 meets the criterion, the game criteria program codes 78 directs the microprocessor 52 to produce a game piece movement message, which in this embodiment has the same format as the message 780. The piece movement message is then loaded into the shared buffer 88 and transmitted to the client computers in accordance with the processes 580 and 597 shown in FIG. 16 and FIG. 17 respectively.

Still referring to FIG. 24, in another embodiment, desired game piece actions may be represented by a game piece action message shown generally at 782. The piece action messages 782 are transmitted by the client computers 14, 16, and 18 to the server 12 in response to user input signals representing desired game piece actions. For example, actuation of a mouse actuator button (e.g. a right mouse button) may present the user with a list of options associated with the game piece. In a card game, for example, the options may include flipping the card to show the face or the back of the card, making the card private such that other users are prevented from viewing flipping the card etc. In a game of chess, the options may include a selection of a piece when promoting a pawn that has reached the eighth rank of the chessboard, for example.

The piece action request message 782 is a persistent message having a message identifier of 7. The piece action request message 782 represents a requested action and includes an "Owner UID" field held in bytes 5-6 of the message. The "Owner UID" field holds a UID corresponding to the UID of the client computer that owns the game piece that it is desired to act upon. The game piece action request message 782 further includes the identifier field held in bytes 7-8 of the message, which identifies a particular game piece image that the client computer user wishes to act upon.

The piece action request message 782 also includes an action type field held in byte 9 of the message. The action type field holds an action indicator index, for example, "flip", "private" or "public" for a game of cards.

The game criteria program codes 78 on the server processor circuit 50 direct the microprocessor 52 to determine whether the piece action request message 782 meets a criterion associated with rules of the game being played. For example if a game piece action request to flip a card includes a UID and Owner UID that are different, and the game piece has previously been designated as "private" by the owner, then the action request will not be processed by the server and not transmitted to client computers.

When the piece action request message 782 received at the server meets the criteria, the game criteria program codes 78 directs the microprocessor 52 to produce a piece action message representing the action. In this embodiment the piece action message has the same format as the message 782 and is transmitted to the client computers as described above.

Intercepting Communications

Figure 25:
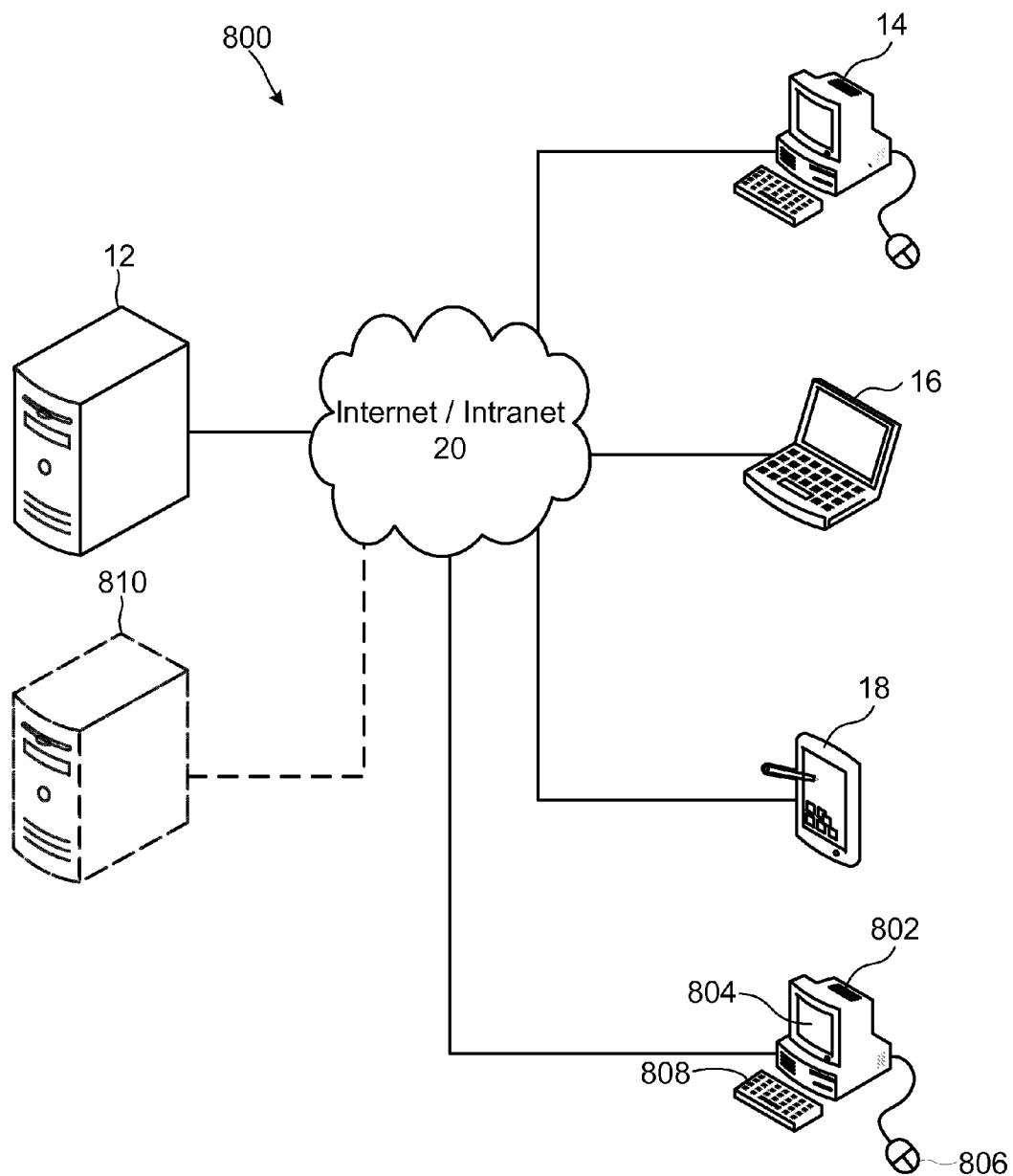
FIG. 25 is a schematic view of a system for supporting multiple-party communications in accordance with a second embodiment of the invention.

Referring to FIG. 25, a system for intercepting multiple-party communications in accordance with an embodiment of the invention is shown generally at 800. The system 800 includes the server 12 and a plurality of client computers 14, 16, and 18, such as those shown in FIG. 1.

In this embodiment, the system 800 further includes a designated client computer 802, which has a display 804 for displaying content. The designated client computer 802 communicates with the server 12 through the network 20. The designated client computer 802 also has a pointing device 806 and a character input device 808 for producing user input signals.

In one embodiment the designated client computer 802 is used by a lawful intercept authority to access and/or intercept multiple-party communications. In general, when permitting lawful intercept or access to private communications, it is important to only authorize such access to a lawful intercept authority. Authorizing the designated client computer 802 may involve authenticating a user of the designated client computer. Accordingly the system 800 may optionally include an authentication server 810 for authenticating a user of the designated client computer 802. The authentication server 810 generally stores usernames, passwords, and/or other user information and provides an authentication indicator to the server 12 when credentials supplied by a user have been validated by the authentication server. The authentication server 810 may implement a Remote Authentication Dial-In User Service (RADIUS) protocol, for example. Alternatively the server 12 may provide such authentication functions. In some embodiments the authentication server 810 may further provide authentication services for authenticating users of the client computers 14, 16, and/or 18.

In other embodiments the designated client computer 802 may be located in a secure controlled environment and the client computer may be authorized for access by users who have access to the secure controlled environment.

In general, the designated client computer 802 may be implemented using the processor circuit 260 shown in FIG. 9 and the user interface 470 shown in FIG. 11. The designated client computer 802 generally operates in essentially the same way as the other client computers 14, 16 and 18. The designated client computers in a multiple-party communication are identified by the "SilentFlag" 212 in the client table entry 200 shown in FIG. 7.

Intercept Web Page

Figure 26:
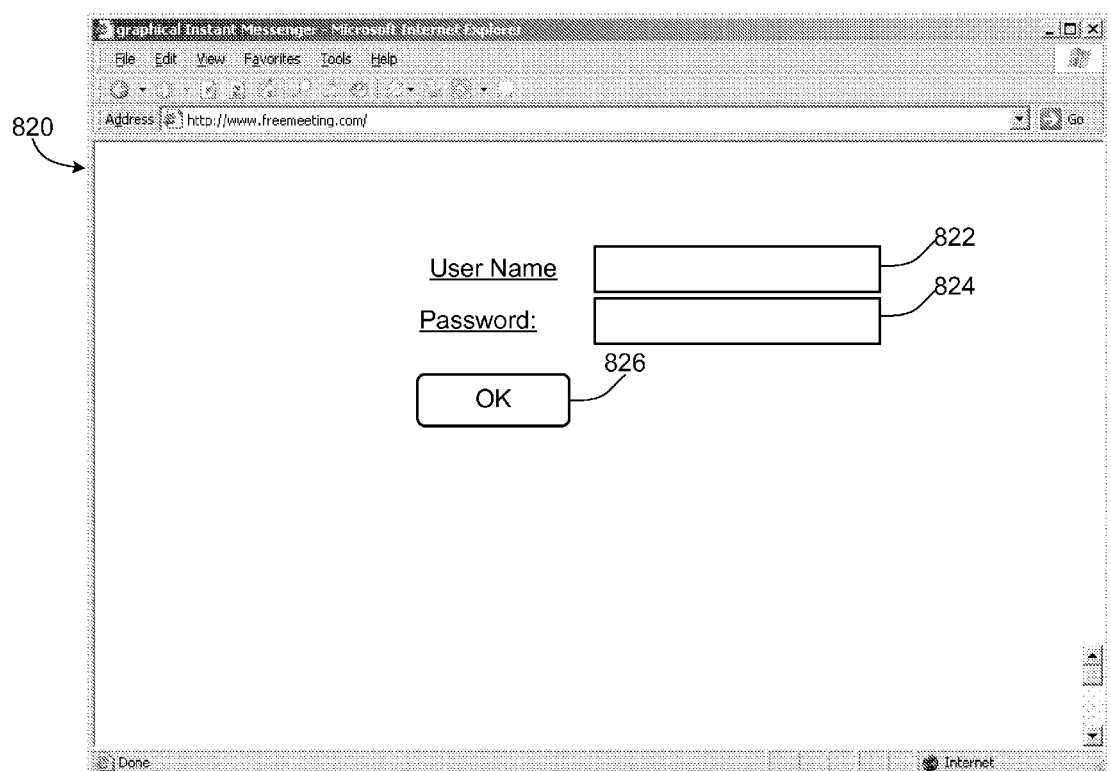
FIG. 26 is a screenshot of a web page transmitted by a server shown in FIG. 25.

Referring to FIG. 26, a screenshot of a web page displayed on the designated client computer 802 when the designated client computer first connects to the server 12 is shown generally at 820. When the designated client computer 802 transmits a request for the web page 820 to the server 12, the communication manager program codes 70 direct the microprocessor 52 of the server processor circuit 50 shown in FIG. 2 to read data representing a web page from the web page store 102 of the server processor circuit hard drive 58 and to transmit the data through the network 20 to the designated client computer. In general, the request from the designated client computer 802 is generated by an internet browser application running on the designated client computer 802 and when web page data is received the web page 820 is displayed in an internet browser window on the display 804.

The web page 820 includes a "username" field 822, a "password" field 824, and an "OK" button 826. When a user of the designated client computer 802 enters their username in the "username" field 822, enters their password in the "password" field 824, and clicks on the "OK" button 826, a message including the username and password credentials is transmitted to the server 12 (or to the authentication server 810, if provided). If the user credentials are authenticated by the server 12 (or the authentication server 810), then the designated client computer is permitted access to communication manager functions provided for users of the designated client computer 802. The communication manager program codes 70 then direct the microprocessor 52 to read data representing a saved communication pages web page from the web page store 102 and to transmit the data to the designated client computer 802.

Figure 27:
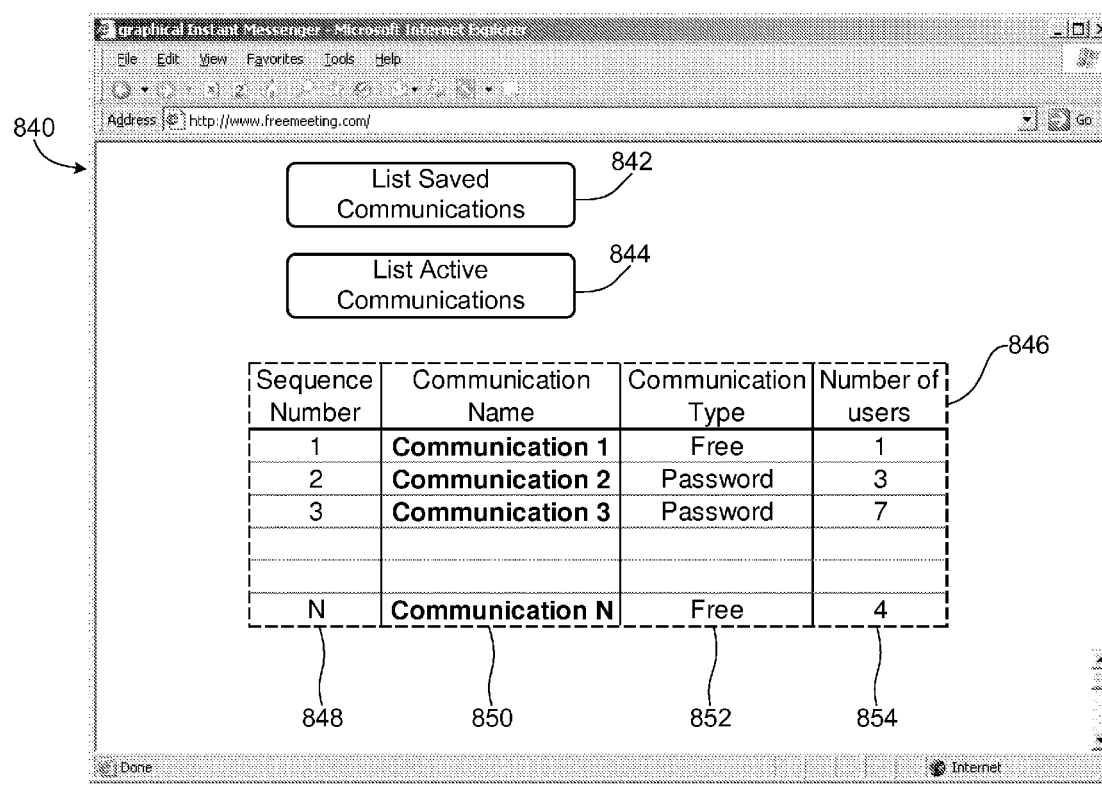
FIG. 27 is a screenshot of another web page transmitted by the server shown in FIG. 25.

Referring to FIG. 27, a screenshot of the saved communication pages web page is shown generally at 840. The web page 840 includes a "list saved communications" button 842, and a "list active communications" button 844.

Intercept of Active Multiple-Party Communications

When the user of the designated client computer 802 clicks on the "list active communications" button 844, the blocks of code 232, 234, 235 and 236, shown in FIG. 8 are executed as described earlier, causing the microprocessor 52 to read entries from the communication table 80 and to display certain fields in a table 846 on the saved communication pages web page 840. The table 846 includes a first column 848 listing a multiple-party communication sequence number (1, 2, 3 for example), a second column 850 listing the communication name from the "CommunicationName" field 184, and a third column 852 listing the communication type. In this embodiment the third column 852 is included to indicate to a user whether multiple-party communications are "free" or "password" type communications, however the user is able to join "password" type communications whether or not they are in possession of the communication password.

The table 846 also includes a fourth column 854, listing a number of client computer users involved in each respective multiple-party communication. In general, fields in at least one of the columns in the table 846 have associated hyperlink properties, which facilitate selection of a particular multiple-party communication listed in the display table by the user clicking on, for example, a hyperlinked communication name. When the user clicks on a hyperlink, an HTTP message identifying the multiple-party communication is generated and transmitted to the server processor circuit 50.

Figure 28:
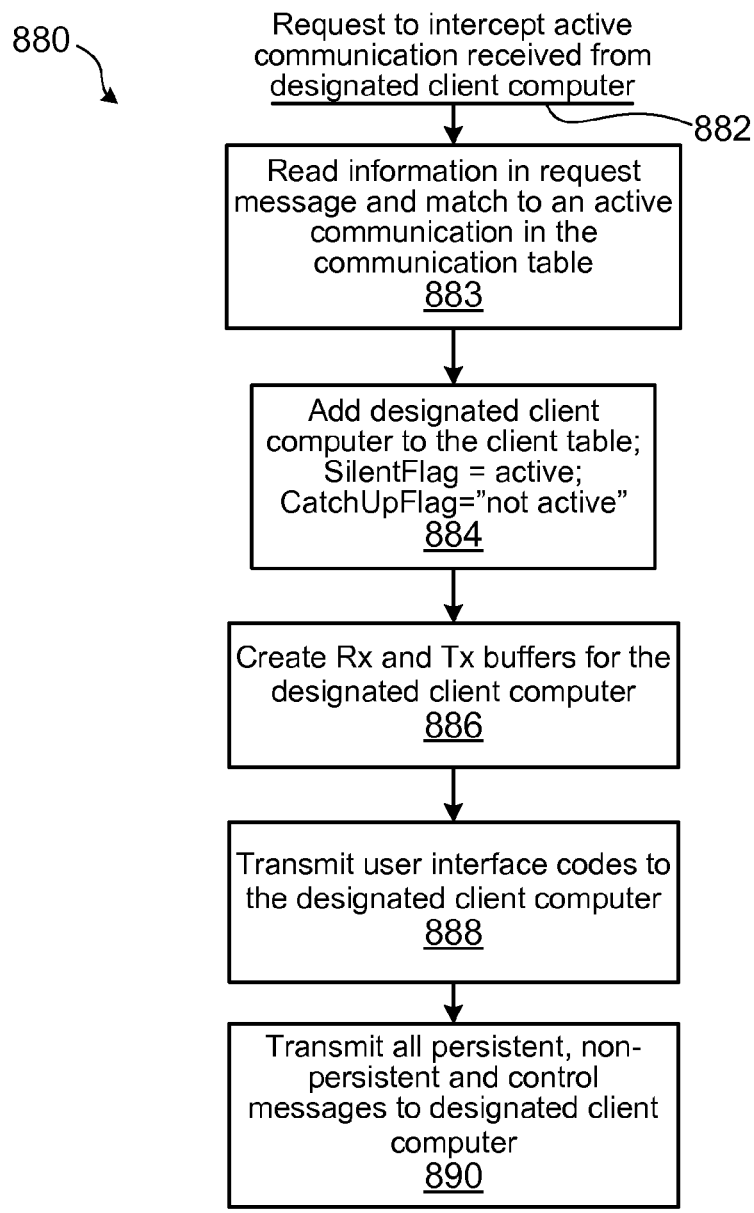
FIG. 28 is a flowchart representing blocks of codes for directing the processor circuit shown in FIG. 2 to add a designated client computer to an active multiple-party communication.

Referring to FIG. 28, a flowchart of blocks of code for directing the processor circuit 50 (shown in FIG. 2) to permit the designated client computer 802 to intercept messages being communicated in an active multiple-party communication is shown generally at 880.

The process begins at 882 when a HTTP message is received from the designated client computer 802 identifying a multiple-party communication selected for intercept by the user of the designated client computer 802. The HTTP message includes the communication identifier ("CID"), and/or other associated information identifying the multiple-party communication, such as the communication name, for example.

Block 883 directs the microprocessor 52 to read the information in the HTTP message received from the designated client computer and to match the information to a multiple-party communication in the communication table 80. For example, if the HTTP message includes a communication identifier, the "CID" is read from the HTTP message and compared with the values in the "CID" field 182 in the communication table entries 180 find the corresponding multiple-party communication. Alternatively, if the HTTP message includes a communication name, the communication name is compared with the values in the "CommunicationName" field 184 in the communication table entry 180 to find the corresponding multiple-party communication.

Block 884 then directs the microprocessor 52 to generate a new client table entry for the designated client computer 802 in the communication table 80 corresponding to the CID. Block 884 also directs the microprocessor 52 to add the new client table entry to the client table 90 stored in the RAM 56. In this embodiment the "SilentFlag" 212 shown in FIG. 7 is set to active to identify the client computer as a designated client computer user (for example a lawful intercept authority).

When the designated client computer user joins an already active multiple-party communication, the "CatchUpFlag" 208 in the client table entry 200 (shown in FIG. 7) is set to not active, such that the user will be able to view the effect of non-persistent message types (such as pointer movements) in addition to ant persistent changes to the displayed content. The client "SentPointer" field 210 is initially set to "nil" and will be set equal to the "StartPointer" 122 once the first message is sent.

Block 886 then directs the microprocessor 52 create server side Rx and Tx buffers 92 and 94 for the designated client computer 802. Block 888 then directs the microprocessor 52 to cause the network interface 62 of the I/O PORT 60 to transmit data representing the user interface 470 (shown in FIG. 11) through the network 20 to the designated client computer.

Block 888 then directs the microprocessor 52 to read the user interface codes from the user interface store 101 and to cause the network interface 62 of the I/O PORT 60 to transmit the user interface codes through the network 20 to the designated client computer 802. In this embodiment, the designated client computer 802 receives the same user interface program codes as any other client computer user, and operates in the same manner as any other of the client computers 14, 16, or 18. Accordingly, the designated client computer displays the same user interface 470 as shown in FIG. 11. However, when the "SilentFlag" 212 is active, the number of client computers displayed in the field 492 of the status bar 490 does not include the designated client computer 802. Accordingly, if for example, a lawful intercept authority has intercepted the multiple-party communication, the field 492 reflects only the number of client computers other than the designated client computer 802 that are in the multiple-party communication, thus providing anonymity for the lawful intercept authority. Similarly the column 148 in the table 140 shown in FIG. 4, and the column 854 in the table 846 shown in FIG. 27 do not reflect any designated client computers that may be intercepting the multiple-party communication.

Block 890 then directs the microprocessor 52 to cause all messages in the shared buffer (including the persistent messages 332, the non-persistent messages 334, and control messages 336 shown in FIG. 12) to be transmitted through the network interface 62 of the I/O PORT 60 to the designated client computer 802.

The designated client computer 802 is also able to produce messages in accordance with the process shown in FIGS. 13A-13C and to transmit the messages in accordance with the process shown in FIG. 14. However, as will be described later herein, some messages received in response to user input from the designated client computer user may be ignored by the server.

Figure 29:
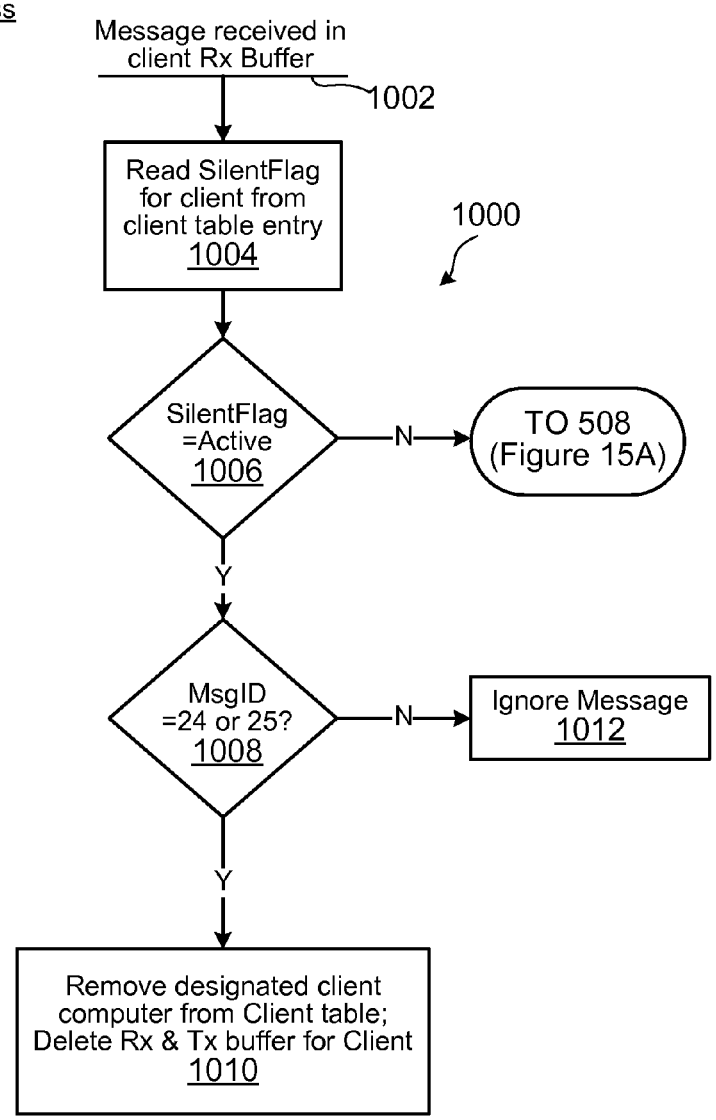
FIG. 29 is a flowchart representing blocks of codes for directing the processor circuit shown in FIG. 2 to receive messages from the client computers and the designated client computer shown in FIG. 25.

Referring to FIG. 29, a flowchart of blocks of code for directing the server processor circuit 50 (shown in FIG. 2) to receive messages from the designated client computer 802 and each of the client computers 14, 16 and 18 is shown generally at 1000. In general, the process 1000 includes modifications to the process shown in FIGS. 15A and 15B to handle messages from the designated client computer 802.

The process begins at 1002 when a message is received at any of the Rx buffers 92 in the RAM 56. When a message is received, block 1004 directs the microprocessor 52 to read the "SilentFlag" 212 in the client table entry corresponding to the Rx buffer. The process continues at block 1006, which directs the microprocessor 52 to determine whether the "SilentFlag" 212 for the client is active.

If the "SilentFlag" 212 is active, then the corresponding client computer is a designated client computer (such as a lawful intercept authority), and the process continues at block 1008. Block 1008 directs the microprocessor 52 to determine whether the message identifier of the received message is 23 or 24, indicating that the lawful intercept authority wishes to discontinue intercepting the multiple-party communication. If the message identifier is 23 or 24, then the process continues at block 1010, which directs the microprocessor 52 to remove the designated client computer entry 200 from the client table 90 (shown in FIG. 2) and to delete the Rx and Tx buffers 92 and 94 for the designated client computer.

If at block 1008, the message identifier is not 23 or 24, then the process continues at block 1012, which directs the microprocessor 52 to ignore the message.

If at block 1006, the "SilentFlag" is not active, then the message was not from a designated client computer, and the process continues at block 508 of FIG. 15A, as described above.

Advantageously, the process 1000 shown in FIG. 29 ignores all messages received from the designated client computer that would cause the user interface 470 (shown in FIG. 11) to reflect user input from the designated client computer user. Accordingly, no pointer corresponding to the designated client computer mouse movements will be displayed on any of the client computers and the designated client computer will also not be able to cause characters or images to be displayed in the user interface 470 on any of the client computers.

Advantageously access to active multiple-party communications by a designated client computer user is facilitated using the same messages and client computer interface 470 used by the client computers 14, 16 and 18. The "SilentFlag" 212 is used at the server 12 to differentiate between ordinary users of client computers (e.g. the client computers 14, 16, and 18) and designated client computer users.

In general, the intercept functions described above facilitate intercept of active multiple-party communications to facilitate viewing in real-time of content created by the client computers 14, 16, and 18, including but not limited to images displayed on the display area 472, lines drawn, characters typed, non-persistent pointer movements, and game piece display and movement.

Designated Client Computer Access to Saved Communications

As described earlier herein, the communication pages are saved in the communication page store 104. For intercept purposes, when pages are saved and then subsequently loaded and content added, subsequent versions of the same page are stored in separate files (i.e. "Page 2-1", "Page 2-2" etc as described above). Accordingly, the server communication page store 104 facilitates storing, and subsequent replay of meeting content in a sequence corresponding to a sequence in which the content was created during the communication. Consequently, a lawful intercept authority, for example, will have access to all content created in the multiple-party communication, even when the content was subsequently cleared and/or or hidden by display of subsequent content.

Similarly, in embodiments where the shared buffer 88 is implemented as circular buffer, when buffer reaches a predetermined limit, older messages will be overwritten by the new messages. Accordingly, at a time when the "CurrentPointer 124 is about to wrap around in the circular buffer, the page manager 74 directs the microprocessor 52 to save the contents of the shared buffer 88 to the communication page store 104. Thus for intercept purposes, no any content will be lost due to overwriting of old messages in the shared buffer 88.

Figure 30:
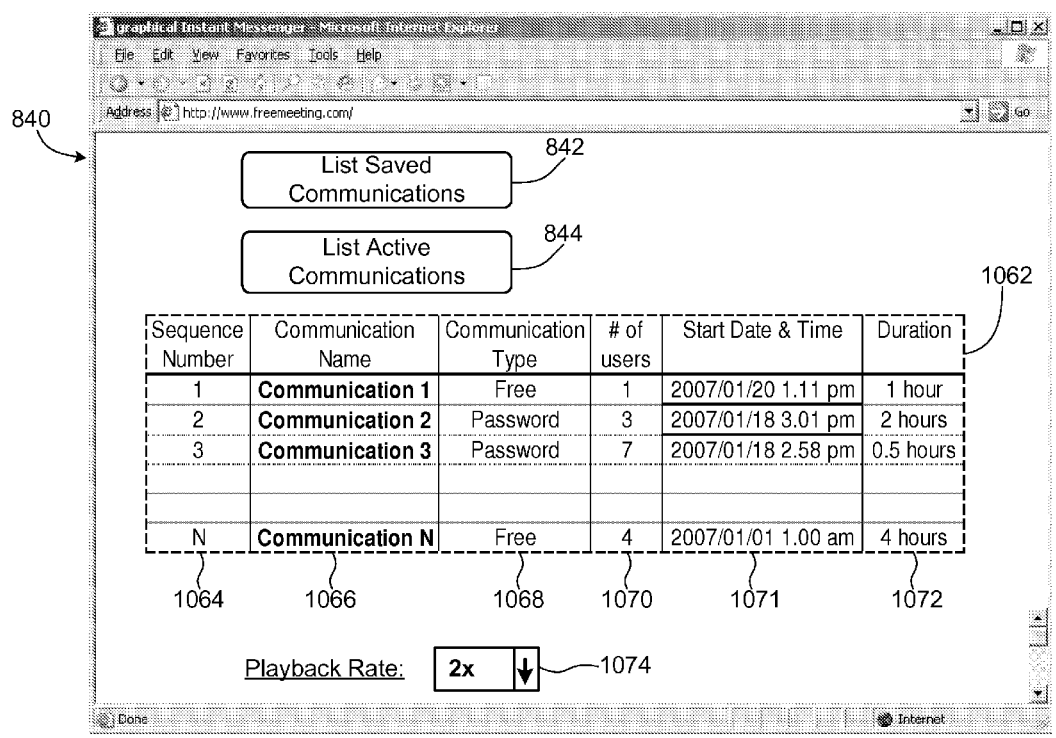
FIG. 30 is a screenshot of a web page listing saved multiple-party communications transmitted to the designated client computer by the server shown in FIG. 25.

Referring to FIG. 30, when the user of the designated client computer 802 clicks on the "list saved communications" button 842, the blocks of code similar to 232, 234, 235 and 236, shown in FIG. 8 are executed as described earlier, causing the microprocessor 52 to read data from the communication page store 104 and to display certain fields in a table 1062 on the saved communication pages web page 840. The table 1062 includes a first column 1064 listing a multiple-party communication sequence number (1, 2, 3 for example), a second column 1066 listing the communication name read from the communication page store 104, and a third column 1068 listing the communication type "Free" or "Password".

The table 1062 also includes a fourth column 1070, listing a maximum number of client computer users involved in each respective multiple-party communication, a fifth column 1071 including a start date and time associated with the communication, and a sixth column 1072 listing a duration of the respective multiple-party communications.

Fields in at least one of the columns in the table 1062 have associated hyperlink properties, which facilitate selection of a particular multiple-party communication listed in the display table by the user clicking on, for example, a hyperlinked communication name. The hyperlinked field causes a message including information identifying the saved multiple-party communication (for example a communication name and/or filename) to be transmitted to the server 12.

The saved communication pages web page 840 shown in FIG. 30 further includes a playback rate field 1074 for entering a desired playback rate for saved messages. In this embodiment the playback rate field 1074 is implemented as a dropdown list, which permits the user to select a playback rate, such as "2×", for setting a rate at which messages will be transmitted to the designated client computer 802.

Figure 31:
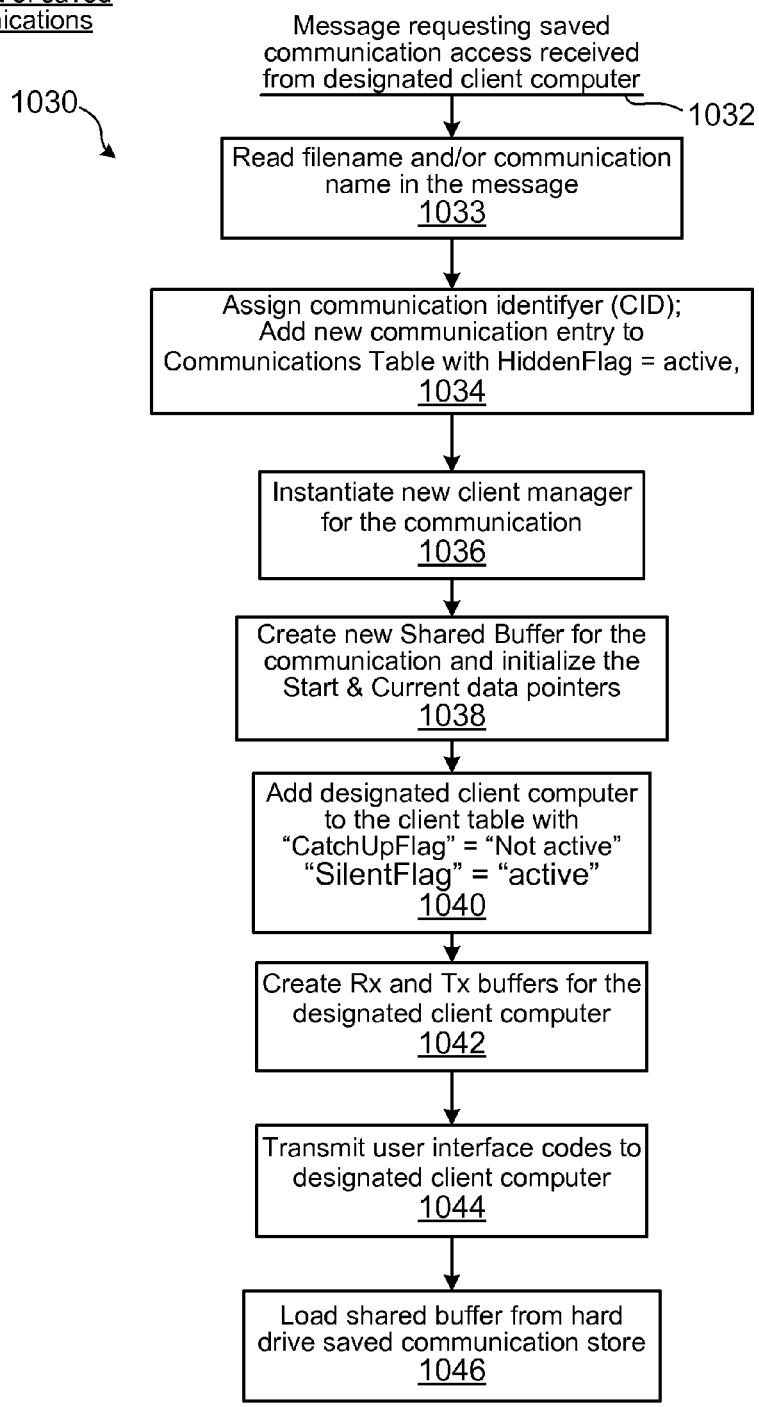
FIG. 31 is a flowchart representing blocks of codes for directing the processor circuit shown in FIG. 2 to respond to a request by a designated client computer to view saved multiple-party communication content.

Referring to FIG. 31, a flowchart of blocks of code for directing the processor circuit 50 (shown in FIG. 2) to create a communication for the designated client computer 802 to view a saved multiple-party communication is shown generally at 1030.

The process begins at 1032 when a message requesting access to a saved multiple-party communication is received from the designated client computer 802. Block 1033 directs the microprocessor 52 to read the communication name and/or associated filename included in the request message.

Block 1034 then directs the microprocessor 52 to add a new communication entry to the communication table 80 and generate a new unique CID for this communication. Block 1034 also directs the microprocessor 52 to set the "HiddenFlag" 198 (shown in FIG. 6) to be active, so as to cause the communication to be hidden from the client computers 14, 16, and 18. Referring to FIG. 4, multiple-party communications that have their corresponding "HiddenFlag" 198 set to active are not listed in the table 140 when the process 230 (shown in FIG. 8) is initiated. Since the communication is hidden, the "CommunicationName" field 184 in the communication table entry 180 may be populated with the filename, the communication name or a default value.

Referring back to FIG. 31, the process continues at block 1036, which directs the microprocessor 52 to instantiate a new client manager for the communication.

Block 1038 then directs the microprocessor 52 to create a new shared buffer 88 (shown in FIG. 2) for the communication and to initialize the "StartPointer" 122 and the "CurrentPointer" 124 (stored in fields 190 and 192 respectively of the communication table entry 180) to nil.

Block 1040 then directs the microprocessor 52 to add the designated client computer to the client table 90 stored in the RAM 56. The "CatchUpFlag" 208 is set to not active to allow a lawful authority user to see all content created during the multiple-party communication. The "SilentFlag" 212 is also set to active at this point, but since the communication is hidden this is not absolutely necessary, but may provide additional security against a computer hackers seeking to view a saved multiple-party communication, for example.

The process 1030 continues at block 1042, which directs the microprocessor 52 to create server side Rx and Tx buffers 92 and 94 for the designated client computer.

Block 1044 then directs the microprocessor 52 to read web page data from the web page store 102 of the hard drive 58, and cause the network interface 62 of the I/O PORT 60 to transmit the data representing the saved communication pages web page 840 through the network 20 to the client computers.

Block 1046 then directs the microprocessor 52 to read messages corresponding to a first page of the multiple-party communication from a file having a filename read in block 1033 from the saved communication page store 104 on the server hard drive 58 (shown in FIG. 2). Block 1046 also directs the microprocessor 52 to load the messages into the shared buffer 88 for the communication. The "StartPointer" 122 is set to reference the message store 120 in the shared buffer 88 to which the first message was loaded. As the message stores 120 of the shared buffer 88 are loaded with subsequent messages read from the page file, the "CurrentPointer" 124 is incremented to reference the last loaded message store.

The "StartPointer" 122 is set to reference the first message and subsequently updated to reference later messages loaded into the shared buffer 88.

As described above, the saved communication page store 104 may include a plurality of files for each page created during the multiple-party communication. The files represent different and sequential versions of the messages in the shared buffer 88 and the files are created the page manager 74 when:

the user changes the current page to the next or previous page;
the user opens content from client saved content store 100;
the user invokes the ClearScreen function;
a last client computer user disconnects from the communication; and
the shared buffer wraps around.

Accordingly, when the designated client computer 802 accesses a saved communication the communication content is replayed in sequence starting at the first version of the first page (i.e. "Page 1-1") through all subsequent versions of the page in sequence. Accordingly, no communication content is lost or overwritten, which would cause played back content to differ from actual content displayed during the communication.

Figure 32:
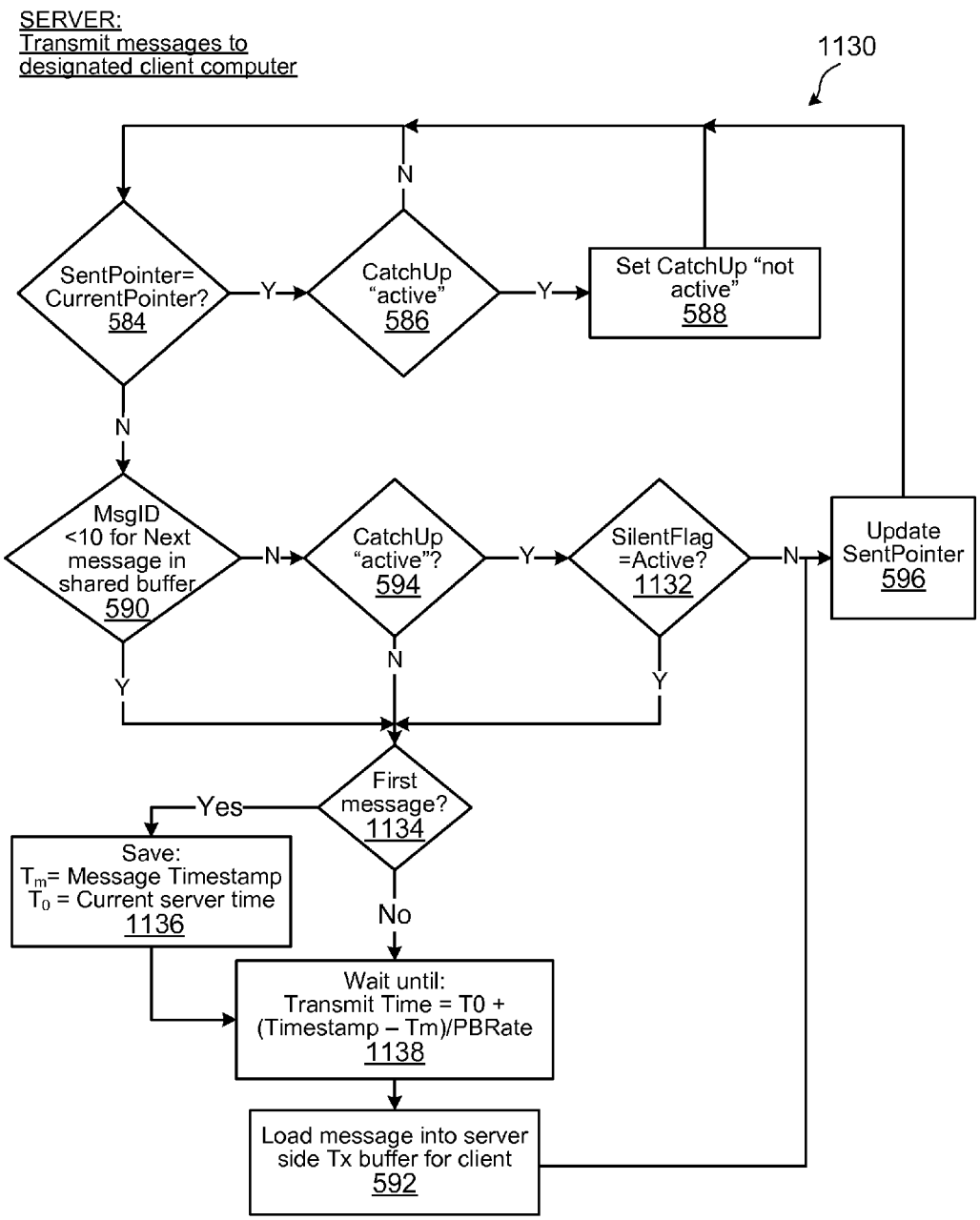
FIG. 32 is a flowchart representing blocks of codes for directing the processor circuit shown in FIG. 2 to transmit output messages to client computers and the designated client computer shown in FIG. 25.

Referring to FIG. 32, a flowchart of blocks of code for directing the processor circuit 50 (shown in FIG. 2) to transmit messages from the saved multiple-party communication is shown generally at 1130. The transmit messages process is essentially similar to the process 580 shown in FIG. 16, except for the inclusion of blocks 1132 to 1138.

If at block 594, the "CatchUpFlag" is active then the process 1130 continues at block 1132, which directs the microprocessor 52 to determine whether the "SilentFlag" 212 is set to active. If the "SilentFlag" 212 is set to active, then the client is a designated client computer, and the process continues at block 1134.

Block 1134 directs the microprocessor 52 to determine whether the message is the first message transmitted to the designated client computer, in which case the process continues at block 1136. Block 1136 directs the microprocessor 52 to save the message timestamp for the first message as $T_m$, and the current server time as $T_o$, in locations (not shown) in the RAM 56.

The process then continues at block 1138, which directs the microprocessor 52 to wait until the current server time matches a "Transmit Time" calculated according to the relation:

$$\text{Transmit Time} = T_0 + \frac{\text{Timestamp} - T_m}{PBRate} \qquad \text{Eqn 2}$$

where "PBRate" is the playback rate selected by the user at field 1074 in FIG. 30.

If at block 1134, the message was the first message then no wait time will be incurred at block 1138, since the timestamp of the first message is equal to $T_m$. The process then continues at block 592, which directs the microprocessor 52 to read a message in the shared buffer 88 referenced by the "SentPointer" 126 and to load the message into the Tx buffer 94 corresponding to the designated client computer 802.

If at block 1134, the message was not the first message then the process continues at block 1138, which directs the microprocessor 52 to wait for a period of time calculated from Eqn 2, before the process continues at block 592, as described above.

Since the "CatchUp" flag 208 for the designated client computer 802 is set to not active at block 1040 in FIG. 31 and the "SilentFlag" 212 is active, all persistent, non-persistent, and control messages will be processed in accordance with the codes includes in block 1134-1138 and then loaded into the server side Tx buffer for transmission to the designated client computer 802.

Advantageously, the timestamp associated with each message received from the client computers facilitates viewing messages at a playback rate, which matches the rate at which content was created in the original multiple-party communication. Furthermore the designated client computer user may also select a playback rate at the playback rate field 1074 of the web page 840 shown in FIG. 30 to cause messages to be displayed at an increased or reduced rate (for example twice the content creation rate), as desired by the designated client computer user.

Advantageously, the user of the designated client computer 802 receives all persistent and non-persistent messages allowing the user to view all mouse movements by the client computer users in the multiple-party communication.

Multiple Server System

Figure 33:
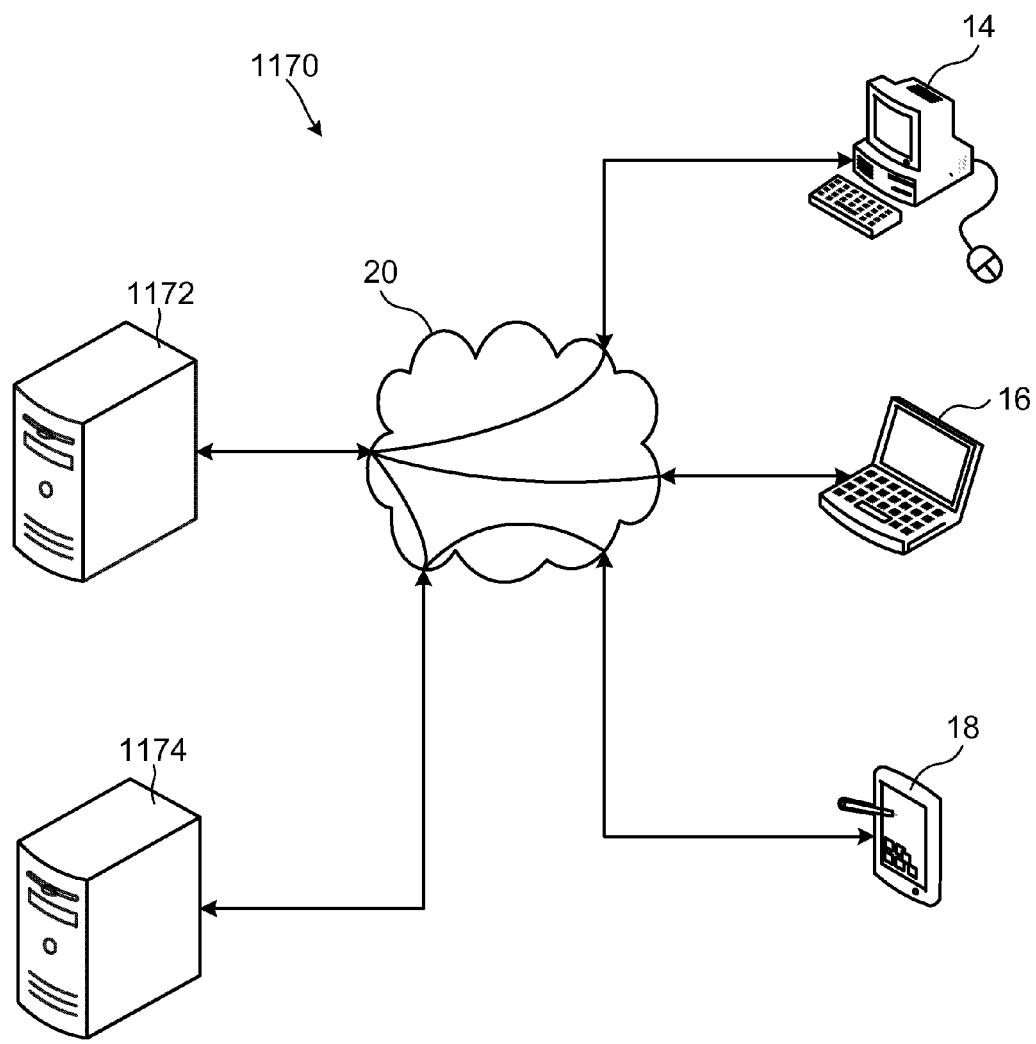
FIG. 33 is a schematic view of a system for supporting multiple-party communications in accordance with a multiple-server embodiment of the invention.

Referring to FIG. 33, a system for supporting multiple-party communications in accordance with a multiple-server embodiment of the invention is shown generally at 1170. The system 1170 includes a first server 1172, such as the server 12 shown in FIG. 1, and may also include a plurality of client computers 14, 16, and 18, such as those shown in FIG. 1. The system 1170 further includes a second server 1174. In the embodiment shown the first and second servers 1172 and 1174 are both implemented using the processor circuit 50 shown in FIG. 2. The first server 1172 and the second server 1174 are both in communication with the network 20.

In general, the first and second servers 1172 and 1174 are configured to provide server functions as described above in connection with the server 12 and the server processor circuit 50.

The first and second servers 1172 and 1174 may be located to provide multiple-party communications in specific geographic regions. For example, the first server 1172 my be located in Vancouver, Canada for serving North American clients such as the client computers 14 and 16, while the second server 1174 may be located in London, England for serving European clients such as the client computer 18.

In other embodiments the first and second servers 1172 and 1174 may be members of a server farm used to provide multiple-party communications to a large plurality of clients, and accordingly the first and second servers may be located proximate a virtual server (not shown) that provides load balancing functions. In such embodiments, the server may comprise a plurality of servers, such as the servers 1172 and 1174.

Multiple Server Operation

In one embodiment, when the process 150 (shown in FIG. 5) is launched to create a new multiple-party communication on the first server 1172, the first server automatically transmits the communication name, password (if used) to the second server 1174. The first server 1174 also adds the second server 1174 to the client table 90 stored in the server RAM 56, and sets the "CatchUpFlag" 208 to not active, which results in the second server being transmitted all persistent, non-persistent, and control messages.

In this embodiment, block 164 of the process 150, which transmits the user interface web page to the client computers, is omitted when adding the second server 1174 to the multiple-party communication.

When the second server 1174 receives the communication name and password from the first server 1172, the second server creates a new multiple-party communication to mirror the multiple-party communication created on the first server.

Figure 34:
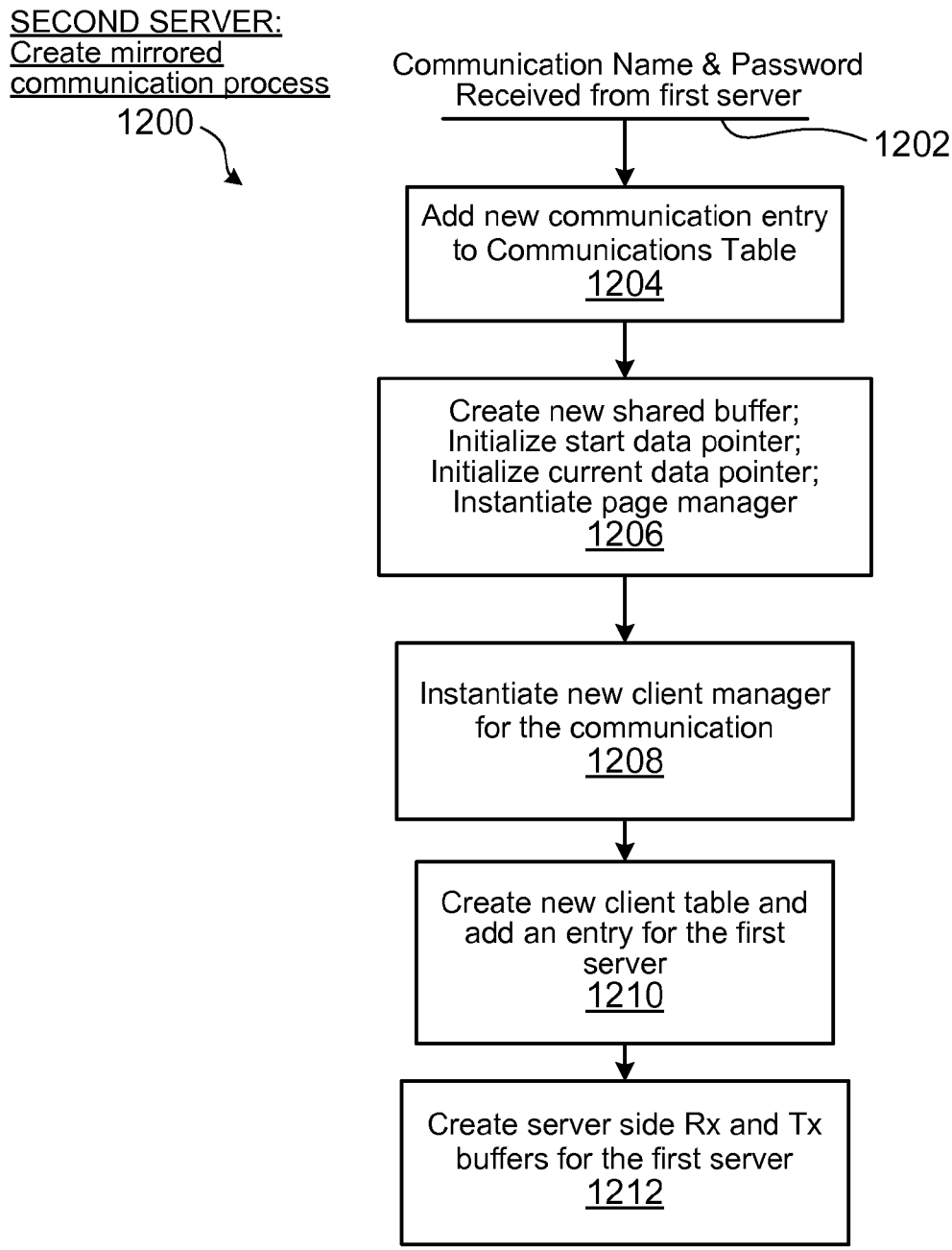
FIG. 34 is a flowchart representing blocks of codes for directing a processor circuit to create a new multiple-party communication in the multiple-server system shown in FIG. 33.

Referring to FIG. 34, a flowchart of blocks of code for directing the second server processor circuit 50 (shown in FIG. 2) to create a mirrored multiple-party communication is shown generally at 1200. The process begins at 1202 when a message including a communication name and optional password is received from the first server 1172. In general, each server 1172 and 1174 maintains a list of other servers in the system 1170 and is thus able to distinguish between communications from the client computers 14, 16, and/or 18 and communications from other servers 1172 or 1176 respectively.

Block 1204 then directs the microprocessor 52 to add a new communication entry 180 (shown in FIG. 6) to the communication table 80 in the RAM 56. The communication identifier ("CID") field 182 in the communication table 80 is set to the unique number assigned by the first server 1172, the "CommunicationName" field 184 is set to the communication name received from the first server, the "CommunicationPassword" field 186 is set to the password received from the first server (if provided).

The process continues at block 1206, which directs the microprocessor 52 to create a new shared buffer 88 (shown in FIG. 2) for the multiple-party communication, and to initialize the "StartPointer" 122 and the "CurrentPointer" 124 (stored in fields 190 and 192 respectively of the communication table entry 180) to nil. Block 1206 also directs the microprocessor 52 to instantiate a page manager for the multiple-party communication by launching the page manager program codes in the store 74 of the program memory 54.

Block 1208 then directs the microprocessor 52 to instantiate a new client manager for the multiple-party communication by launching the client manager program codes in the store 72 of the program memory 54.

The process continues at block 1210, which directs the microprocessor 52 to generate a new client table 90 in the RAM 56, and to add an entry 200 to the client table for the first server 1172. The client user identifier field ("UID") 202 is set to a unique number identifying the first server 1172. The client IP address field 204 and the client port field 206 are set to values corresponding to the IP address and port for the first server 1172. The "CatchUpFlag" 208 is set to not active, which causes all persistent, non-persistent, and control messages received by the second server 1174 to be transmitted to the first server 1172.

The process 1200 then continues at block 1212, which directs the microprocessor 52 to create server side Rx and Tx buffers 92 and 94 for the first server 1172.

Advantageously, by causing each of the first and second servers 1172 and 1174 to be included as clients in the respective client tables, all persistent, non-persistent, and control messages received at the first server from the client computers 14 and 16 are automatically transmitted to the second server by the process 580 shown in FIG. 16. The second server 1174 is essentially treated as any other client computer, in this respect.

Similarly, the second server 1174 essentially treats the first server 1172 as any other client computer, and inserts the messages received from the first server into the shared buffer on the second server (in accordance with the process 500 shown in FIG. 15A).

Similarly, all persistent, non-persistent, and control messages received at the second server 1174 from the client computer 18 are transmitted to the first server 1172. The first server 1172 inserts the messages received from the second server 1174 into the shared buffer on the first server. Accordingly the shared buffer on the first server 1172 is continuously updated with messages received at the second server 1174 and the shared buffer on the second server 1174 is continuously updated with messages received at the first server 1172.

Messages received from the first server 1172 at the second server 1174 only differ from messages received directly from the client computer 18, in that all messages received from the client computer 18 will have the same UID 202, while messages received from the first server 1172 may have a UID corresponding to either the client computer 14, or the client computer 16.

Client computers, such as the client computer 18, which is in a geographical region that is closer to the second server 1174, connect to the second server to join the multiple-party communication by launching the process 230 shown in FIG. 8 on the second server 1174. Since the second server 1174 has created an instance of the multiple-party communication, the client computer 18 should be generally unaware that they connected to the second server 1174, while the client computers 14 and 16 are connected to the first server 1172.

Advantageously, the second server 1174 should be able to provide a faster response to messages received from the client computer 18 than the first server 1172. In one embodiment the web page 130 shown in FIG. 4 may include server buttons allowing clients select either the first server 1172 or the second server 1174 when joining a multiple-party communication. In this case the selection of the server is left up to the user of the client computer 14,16, or 18.

In other embodiments, the system 1170 may further include a central server or a virtual server (not shown) that implements load balancing to redirect a connection from a client computer 14, 16, or 18 to either the first server 1172 or the second server 1174, depending on which is able to provide a faster response. Load balancing techniques are well known in the art, and may involve evaluating round trip times for each of the servers 1172 and 1174, before selecting a server having the quickest response to the client.

Referring back to FIG. 15A, when messages are received from the client computers 14, 16, or 18 in any of the client Rx buffers, block 506 causes the messages to be time stamped. In the embodiment shown in FIG. 15, the timestamp is appended to the end of the messages (shown in FIG. 12). Accordingly, messages transmitted by the second server 1174 to the first server 1172 will thus already been time stamped at the second server.

Messages received at the first server 1172 from client computers 14 and 16 are also time stamped when received at the first server. Consequently, all messages received at the first server 1172 from the second server 1174 will include a first timestamp appended by the second server and a second timestamp appended by the first server.

In this embodiment, messages received at the first server 1172 are inserted into the shared buffer in ordered time sequence according to the first timestamp appended to the message by the second server 1174. The second timestamp appended by the first server 1172 when receiving the message is ignored by the first server, when determining the time order in which to insert the messages in the shared buffer.

Similarly, messages from the client computers 14 and 16 received by the first server 1172 that are transmitted to the second server 1174 have a timestamp appended to the message, which facilitates determining a time order in which these messages should be inserted into the shared buffer on the second server.

Messages transmitted from the first server 1172 to the second server 1174 are similarly inserted into the shared buffer on the second server in time order. The first and second servers 1172 and 1174 may be time synchronized, for example through a Network Time Protocol, accounting for any time zone differences that may exist between the geographic locations of the servers.

Advantageously, inserting messages into the shared buffers in time order causes persistent and non-persistent messages from the client computers 14, 16, and 18 to be displayed in a time-sequenced order when received at the client computers from the first and second servers 1172 and 1174, thus at least partially compensating for network latency between the first and second servers. In some embodiments, messages received at each of the server 1172 and 1174 may be pre-buffered before being inserted into the respective shared buffers, to compensate for varying network delay. For example, when the network latency between the first server 1172 and the second server 1174 is approximately 160 miliseconds, a pre-buffer memory in the RAM 56 may be configured to have a buffer window of approximately 160 miliseconds. When inserting messages into the shared buffer, the oldest message in the 160 millisecond buffer window is copied from the pre-buffer into the shared buffer first.

In yet another embodiment the non-persistent messages from the client computers 14, 16, and 18 may be inserted into the shared buffer as soon as they arrive, while persistent and control messages may be inserted in time ordered sequence, in accordance with their respective timestamps. As will be readily appreciated persistent and control messages that cause lines, characters and images to be displayed are more important to have in correct time order than non-persistent messages that only indicated relative pointer positions of the client computers 14, 16, and 18.

Advantageously, each client computer 14, 16, or 18 generally connects to a server having the quickest round-trip time for transmitting a message from the client and receiving the message back from the server, which may be typically about 60 millliseconds. This creates the impression for the client that the latency between their cursor position and the received pointer position is reduced compared to a single-server system, while the same view is provided on the respective displays 15, 17, and 19. For example, if the client computer 18 in London connected directly to the first server 1172 located in Vancouver, then the round-trip time would be about 160 miliseconds for this client.

Media Relay

In one embodiment the server processor circuit 50 shown in FIG. 2 includes codes 76 for causing the processor circuit to effect media relay functions.

Figure 35:
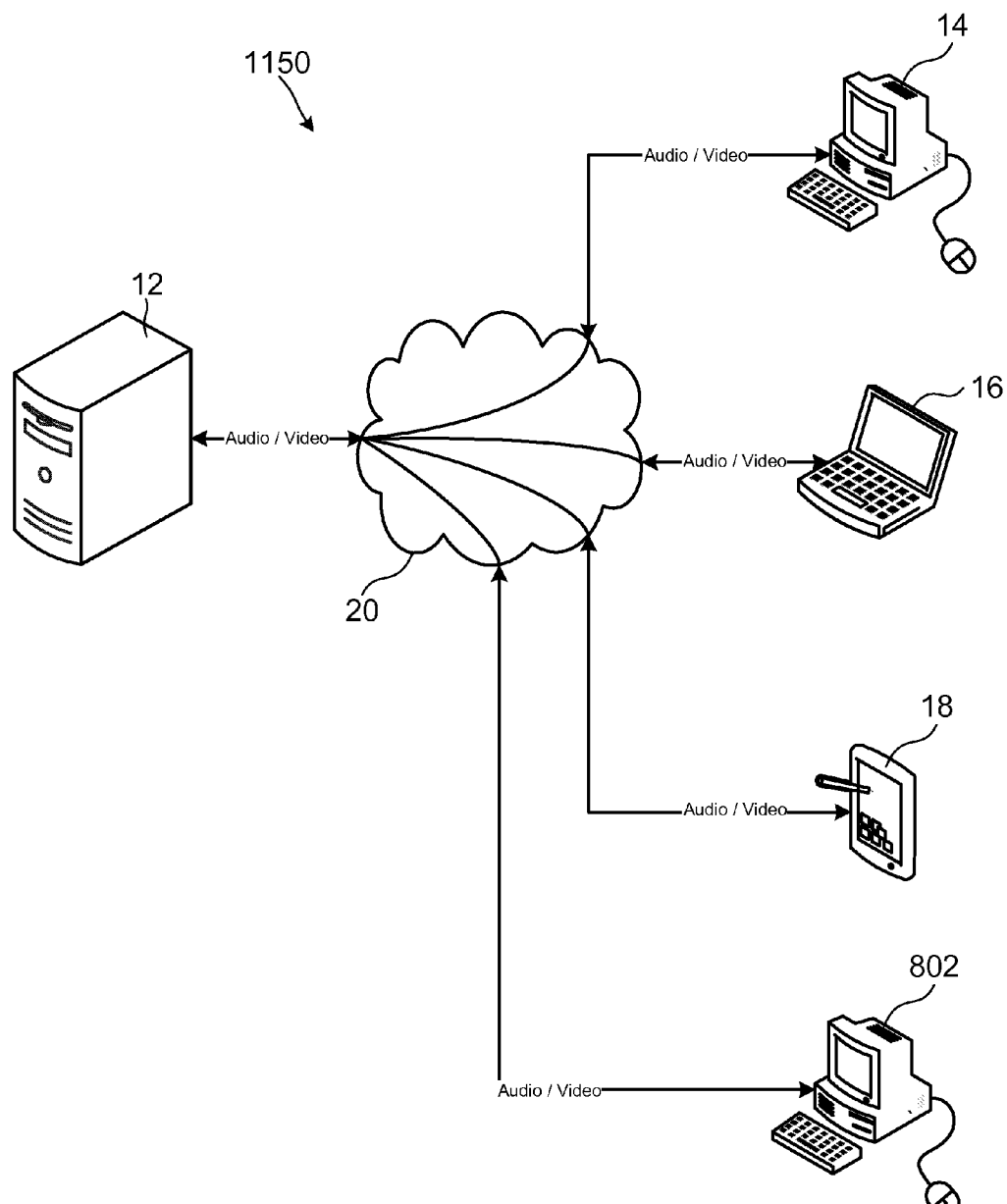
FIG. 35 is a schematic view of a system for supporting multiple-party communications in accordance with another embodiment of the invention.

Referring to FIG. 35, when any of the users of the client computers 14, 16, or 18 wishes to communicate with each other via audio and/or video links, the server 12 may provide a media relay function. The media relay receives data representing audio and/or video information from one of the client computers (e.g. the client computer 14) and retransmits the audio/video data to one of the other client computers (e.g. the client computer 16). The audio data may be produced by a voice over internet protocol (VOIP) software implemented telephone, for example, and the video data may be produced by a webcam, for example. The audio/video data may be formatted to comply with User Datagram Protocol (UDP), or any other suitable network transmission protocol.

Advantageously, the when the server 12 provides media relay functions for relaying communications between users, the server transmits the video/audio data to the designated client computer 802, thereby allowing a lawful intercept authority to monitor such communications for lawful intercept purposes. The lawful intercept monitoring may involve receiving audio or video data representing speech or video images of the communication between the users. Alternatively, the lawful intercept authority may only view intercept related information (IRI) information indicating that a communications connection was established between certain client computers, at a certain time, for example.

While specific embodiments of the invention have been described and illustrated, such embodiments should be considered illustrative of the invention only and not as limiting the invention as construed in accordance with the accompanying claims.

What is claimed is:

1. A method for publishing content created during a previous communication hosted by a server, the content being represented by a first plurality of saved messages saved in a persistent memory on the server, each saved message including data representing a portion of the content, the server being in communication with a computer network, the method comprising:

receiving a request at a network interface input of the server from a first computer in the computer network to view the content, said request including an identifier identifying the first plurality of saved messages;

reading the first plurality of saved messages associated with the identifier from the persistent memory;

reading a transmission time associated with each respective saved message in the first plurality of saved messages;

causing a processor circuit of the server to produce first output messages including data representing the content in respective saved messages in the first plurality of saved messages; and causing a network interface output of the server to transmit each of said first output messages to the first computer at time intervals corresponding to time intervals between transmissions of said saved messages during the previous communication.

2. The method of claim 1 further comprising causing said network interface output of the server to transmit at least one identifier to the first computer, said at least one identifier identifying a plurality of saved messages associated with at least one previous communication.

3. The method of claim 2 wherein causing said network interface output of the server to transmit said at least one identifier comprises causing said network interface output of the server to transmit one of a filename and a communication name associated with said at least one previous communication.

4. The method of claim 1 wherein causing said network interface output of the server to transmit said first output messages comprises causing said processor circuit of the server to:

create a communication in response to receiving said request from the first computer;

associate a client table with the communication; and store a client identification of said first computer in said client table, said client identification being operable to cause the server to transmit said first output messages to said first computer.

5. The method of claim 1 further comprising causing said network interface output of the server to transmit user interface program codes to said first computer, said program codes being operable to direct a processor circuit of said first computer to display a user interface for viewing the content associated with said first output messages.

6. The method of claim 1 further comprising:

receiving a request at said network interface input of the server from a second computer in the computer network to view the content, said request including an identifier identifying the first plurality of saved messages; and causing said processor circuit of the server to store a client identification of said second computer in said client table, said client identification being operable to cause the server to transmit said first output messages to said second computer.

7. The method of claim 1 further comprising causing said communication to be discontinued after transmitting said first output messages to said first computer.

8. The method of claim 1 wherein at least one of the saved messages includes link data and wherein causing said processor circuit of the server to produce said first output messages comprises causing said processor circuit of the server to produce an output message corresponding to said at least one saved message, said output message including said link data, said link data identifying a location of one of:

content represented in a second plurality of saved messages associated with the previous communication and saved in the persistent memory on the serve;

content represented by data in at least one a file stored on another server in the computer network; and web content available on a web site accessible through the computer network; and wherein said output message is operable to cause said link to be displayed on said first computer.

9. The method of claim 8 further comprising:

receiving a request at said network interface input of the server from said first computer to view said content represented by said second plurality of saved messages in response to a user of said first computer actuating said link, said request including an identifier identifying the second plurality of saved messages;

causing said processor circuit of the server to produce second output messages representing said content in respective saved messages in said second plurality of saved messages; and causing said network interface output of the server to transmit said second output messages to the first computer.

10. The method of claim 1 wherein causing said processor circuit of the server to produce said first output messages comprises causing said processor circuit of the server to copy each respective saved message in the first plurality of saved messages into a transmit buffer associated with the first computer to facilitate said transmitting.

11. The method of claim 1 wherein causing said network interface output of the server to transmit said first output messages at said time intervals corresponding to time intervals between transmissions of said saved messages comprises causing said network interface output of the server to transmit said first output messages at modified time intervals to cause one of an increased transmission rate and a decreased transmission rate of said first output messages to the first computer.

12. The method of claim 1 wherein causing said network interface output of the server to transmit said first output messages comprises:

causing said processor circuit of the server to determine a message type associated with each respective saved message in the first plurality of saved messages; and causing said network interface output of the server to transmit respective first output messages to the first computer when said respective saved message is associated with a persistent message type, said persistent message type being associated with saved messages that are operable to produce a persistent change to the content.

13. The method of claim 12 wherein causing said network interface output of the server to transmit said first output messages comprises causing said network interface output of the server to transmit at least one of:

first output messages corresponding to saved messages that are associated with a non-persistent message type, said non-persistent message type being associated with saved messages that are not operable to produce a persistent change to the content;

first output messages corresponding to saved messages that are associated with a control message type, said control message type being associated with messages that are operable to cause a server action to be performed.

14. An apparatus for publishing content created during a previous communication hosted by a server, the content being represented by a first plurality of saved messages saved in a persistent memory on the server, each saved message including data representing a portion of the content, the server being in communication with a computer network, the apparatus comprising:

means for receiving a request from a first computer in the computer network to view the content, said request including an identifier identifying the first plurality of saved messages;

means for reading the first plurality of saved messages associated with the identifier from the persistent memory;

means for reading a transmission time associated with each respective saved message in the first plurality of saved messages;

means for producing first output messages including data representing the content in respective saved messages in the first plurality of saved messages; and means for transmitting each of said first output messages to the first computer at time intervals corresponding to time intervals between transmissions of said saved messages during the previous communication.

15. The apparatus of claim 14 further comprising means for transmitting at least one identifier to the first computer, said at least one identifier identifying a plurality of saved messages associated with at least one previous communication.

16. The apparatus of claim 15 wherein said means for transmitting said at least one identifier comprises means for transmitting one of a filename and a communication name associated with said at least one previous communication.

17. The apparatus of claim 14 wherein said means for transmitting said first output messages comprises:

means for creating a communication in response to receiving said request from the first computer;

means for associating a client table with the communication; and means for storing a client identification of said first computer in said client table, said client identification being operable to cause the server to transmit said first output messages to said first computer.

18. The apparatus of claim 14 further comprising means for transmitting user interface program codes to said first computer, said program codes being operable to direct a processor circuit of said first computer to display a user interface for viewing the content associated with said first output messages.

19. The apparatus of claim 14 further comprising:

means for receiving a request from a second computer in the computer network to view the content, said request including an identifier identifying the first plurality of saved messages; and means for storing a client identification of said second computer in said client table, said client identification being operable to cause the server to transmit said first output messages to said second computer.

20. The apparatus of claim 14 further comprising means for causing said communication to be discontinued after transmitting said first output messages to said first computer.

21. The apparatus of claim 14 wherein at least one of the saved messages includes link data and wherein said means for producing said first output messages comprises means for producing an output message corresponding to said at least one saved message, said output message including said link data, said link data identifying a location of one of:

further content represented by a second plurality of saved messages associated with the previous communication and saved in the persistent memory on the server;

further content represented by data in at least one file stored on another server in the computer network; and web content available on a web site accessible through the computer network; and wherein said output message is operable to cause said link to be displayed on said first computer.

22. The apparatus of claim 21 further comprising:

means for receiving a request from said first computer to view said content represented by said second plurality of saved messages in response to a user of said first computer actuating said link, said request including an identifier identifying the second plurality of saved messages;

means for producing second output messages representing said content in respective saved messages in said second plurality of saved messages; and means for transmitting said second output messages to the first computer.

23. The apparatus of claim 14 wherein said means for producing said first output messages comprises means for copying each respective saved message in the first plurality of saved messages into a transmit buffer associated with the first computer to facilitate said transmitting.

24. The apparatus of claim 14 wherein said means for transmitting said first output messages at said time intervals corresponding to time intervals between transmissions of said saved messages comprises means for transmitting said first output messages at modified transmission time intervals to cause one of an increased transmission rate and a decreased transmission rate of said first output messages to the first computer.

25. The apparatus of claim 14 wherein said means for transmitting said first output messages comprises:

means for determining a message type associated with each respective saved message in the first plurality of saved messages; and means for transmitting respective first output messages to the first computer when said respective saved message is associated with a persistent message type, said persistent message type being associated with saved messages that are operable to produce a persistent change to the content.

26. The apparatus of claim 25 wherein said means for transmitting said first output messages comprises means for transmitting at least one of:

first output messages corresponding to saved messages that are associated with a non-persistent message type, said non-persistent message type being associated with saved messages that are not operable to produce a persistent change to the content;

first output messages corresponding to saved messages that are associated with a control message type, said control message type being associated with messages that are operable to cause a server action to be performed.

27. An apparatus for publishing content created during a previous communication hosted by a server, the content being represented by a first plurality of saved messages saved in a persistent memory on the server, each saved message including data representing a portion of the content, the server being in communication with a computer network, the apparatus comprising a processor circuit operably configured to:

receive a request from a first computer in the computer network to view the content, said request including an identifier identifying the first plurality of saved messages;

read the first plurality of saved messages associated with the identifier from the persistent memory;

read a transmission time associated with each respective saved message in the first plurality of saved messages;

produce first output messages including data representing the content in respective saved messages in the first plurality of saved messages; and transmit each of said first output messages to the first computer at time intervals corresponding to time intervals between transmissions of said saved messages during the previous communication.

28. The apparatus of claim 27 wherein said processor circuit is operably configured to transmit at least one identifier to the first computer, said at least one identifier identifying a plurality of saved messages associated with at least one previous communication.

29. The apparatus of claim 28 wherein said processor circuit is operably configured to transmit one of a filename and a communication name associated with said at least one previous communication.

30. The apparatus of claim 27 wherein said processor circuit is operably configured to transmit said first output messages by:

creating a communication in response to receiving said request from the first computer;

associating a client table with the communication; and storing a client identification of said first computer in said client table, said client identification being operable to cause the server to transmit said first output messages to said first computer.

31. The apparatus of claim 27 wherein said processor circuit is operably configured to transmit user interface program codes to said first computer, said program codes being operable to direct a processor circuit of said first computer to display a user interface for viewing the content associated with said first output messages.

32. The apparatus of claim 27 wherein said processor circuit is operably configured to:

receive a request from a second computer in the computer network to view the content, said request including an identifier identifying the first plurality of saved messages; and store a client identification of said second computer in said client table, said client identification being operable to cause the server to transmit said first output messages to said second computer.

33. The apparatus of claim 27 wherein said processor circuit is operably configured to cause said communication to be discontinued after transmitting said first output messages to said first computer.

34. The apparatus of claim 27 wherein at least one of the saved messages includes link data and wherein said processor circuit is operably configured to produce said first output messages by producing an output message corresponding to said at least one saved message, said output message including said link data, said link data identifying a location of one of:

further content represented by a second plurality of saved messages associated with the previous communication and saved in the persistent memory on the server;

further content represented by data in at least one file stored on another server in the computer network; and web content available on a web site accessible through the computer network; and said output message being operable to cause said link to be displayed on the first computer.

35. The apparatus of claim 34 wherein said processor circuit is operably configured to:

receive a request from said first computer to view said content represented by said second plurality of saved messages in response to a user of said first computer actuating said link, said request including an identifier identifying the second plurality of saved messages;

produce second output messages representing said content in respective saved messages in said second plurality of saved messages; and transmit said second output messages to the first computer.

36. The apparatus of claim 27 wherein said processor circuit is operably configured to produce said first output messages by copying each respective saved message in the first plurality of saved messages into a transmit buffer associated with the first computer to facilitate said transmitting.

37. The apparatus of claim 27 wherein said processor circuit is operably configured to transmit said first output messages at modified time intervals to cause one of an increased transmission rate and a decreased transmission rate of said first output messages to the first computer.

38. The apparatus of claim 27 wherein said processor circuit is operably configured to transmit said first output messages by:

determining a message type associated with each respective saved message in the first plurality of saved messages; and transmitting respective first output messages to the first computer when said respective saved message is associated with a persistent message type, said persistent message type being associated with saved messages that are operable to produce a persistent change to the content.

39. The apparatus of claim 38 wherein said processor circuit is operably configured to transmit at least one of:

first output messages corresponding to saved messages that are associated with a non-persistent message type, said non-persistent message type being associated with saved messages that are not operable to produce a persistent change to the content;

first output messages corresponding to saved messages that are associated with a control message type, said control message type being associated with messages that are operable to cause a server action to be performed.

40. A computer readable medium encoded with codes for directing a processor circuit of a server to publish content created during a previous communication hosted by the server, the content being represented by a first plurality of saved messages saved in a persistent memory on the server, each saved message including data representing a portion of the content, the server being in communication with a computer network, said codes directing the processor circuit to:

receive a request from a first computer in the computer network to view the content, said request including an identifier identifying the first plurality of saved messages;

read the first plurality of saved messages associated with the identifier from the persistent memory;

read a transmission time associated with each respective saved message in the first plurality of saved messages;

produce first output messages including data representing the content in respective saved messages in the first plurality of saved messages; and transmit each of said first output messages to the first computer at time intervals corresponding to time intervals between transmissions of said saved messages during the previous communication.

41. A system for publishing content created during a previous communication hosted by a server, the content being represented by a first plurality of saved messages saved in a persistent memory on the server, each saved message including data representing a portion of the content, the server being in communication with a computer network, the system comprising:

a server processor circuit operably configured to:

receive a request from a first computer in the computer network to view the content, said request including an identifier identifying the first plurality of saved messages;

read the first plurality of saved messages associated with the identifier from the persistent memory;

read a transmission time associated with each respective saved message in the first plurality of saved messages;

produce first output messages representing the content in respective saved messages in the first plurality of saved messages;

transmit each of said first output messages to the first computer at time intervals corresponding to time intervals between transmissions of said saved messages during the previous communication;

a first computer processor circuit operably configured to:

receive said first output messages; and display a user interface for viewing content associated with said first output messages.

42. The system of claim 41 further comprising a communications network through which communications are conducted between the server and the first computer.

* * * * *